United States Patent
Davis et al.

(10) Patent No.: US 10,192,087 B2
(45) Date of Patent: Jan. 29, 2019

(54) METHODS AND ARRANGEMENTS FOR IDENTIFYING OBJECTS

(71) Applicant: Digimarc Corporation, Beaverton, OR (US)

(72) Inventors: Bruce L. Davis, Lake Oswego, OR (US); Tony F. Rodriguez, Portland, OR (US); Geoffrey B. Rhoads, West Linn, OR (US); John D. Lord, West Linn, OR (US); Eric D. Evans, Portland, OR (US); Rebecca L. Gerlach, Beaverton, OR (US); Yang Bai, Beaverton, OR (US); John Stach, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 69 days.

(21) Appl. No.: 15/175,997

(22) Filed: Jun. 7, 2016

(65) Prior Publication Data

US 2016/0364634 A1    Dec. 15, 2016

Related U.S. Application Data

(60) Division of application No. 13/750,752, filed on Jan. 25, 2013, now Pat. No. 9,367,770, which is a
(Continued)

(51) Int. Cl.
*G06K 7/10* (2006.01)
*G06K 9/78* (2006.01)
(Continued)

(52) U.S. Cl.
CPC ....... *G06K 7/10861* (2013.01); *G06K 7/1456* (2013.01); *G06K 9/78* (2013.01);
(Continued)

(58) Field of Classification Search
CPC .... G06Q 10/087; G06Q 10/08; G06Q 20/208; G06Q 20/203; G06Q 20/20;
(Continued)

(56) References Cited

U.S. PATENT DOCUMENTS 4,656,463 A * 4/1987 Anders ............... G01S 13/78
                                                  340/10.34
5,497,314 A    3/1996 Novak
(Continued)

FOREIGN PATENT DOCUMENTS

WO    WO2013033442    3/2013

OTHER PUBLICATIONS

International Preliminary Report on Patentability, dated Mar. 4, 2014, PCT application PCT/US2012/053201 (published as WO2013033442).

(Continued)

*Primary Examiner* — Christopher Stanford
(74) *Attorney, Agent, or Firm* — Digimarc Corporation

(57) ABSTRACT

In some arrangements, product packaging is digitally watermarked over most of its extent to facilitate high-throughput item identification at retail checkouts. Imagery captured by conventional or plenoptic cameras can be processed (e.g., by GPUs) to derive several different perspective-transformed views—further minimizing the need to manually reposition items for identification. Crinkles and other deformations in product packaging can be optically sensed, allowing such surfaces to be virtually flattened to aid identification. Piles of items can be 3D-modelled and virtually segmented into geometric primitives to aid identification, and to discover locations of obscured items. Other data (e.g., including data from sensors in aisles, shelves and carts, and gaze tracking for clues about visual saliency) can be used in assessing
(Continued)

identification hypotheses about an item. A great variety of other features and arrangements are also detailed.

20 Claims, 27 Drawing Sheets

Related U.S. Application Data continuation-in-part of application No. PCT/US2012/053201, filed on Aug. 30, 2012, which is a continuation-in-part of application No. 13/231,893, filed on Sep. 13, 2011, now Pat. No. 9,033,238, application No. 13/750,752, which is a continuation-in-part of application No. 13/231,893.

(60) Provisional application No. 61/724,854, filed on Nov. 9, 2012, provisional application No. 61/716,591, filed on Oct. 21, 2012, provisional application No. 61/716,223, filed on Oct. 19, 2012, provisional application No. 61/693,225, filed on Aug. 24, 2012, provisional application No. 61/544,996, filed on Oct. 7, 2011, provisional application No. 61/540,455, filed on Sep. 28, 2011, provisional application No. 61/537,523, filed on Sep. 21, 2011, provisional application No. 61/533,079, filed on Sep. 9, 2011, provisional application No. 61/531,525, filed on Sep. 6, 2011, provisional application No. 61/529,214, filed on Aug. 30, 2011.

(51) Int. Cl.
*G06Q 30/00* (2012.01)
*G06K 7/14* (2006.01)
*G06Q 20/20* (2012.01)
*G07G 1/00* (2006.01)
*G06K 17/00* (2006.01)
*G06F 3/147* (2006.01)
*G06Q 10/08* (2012.01)
*G06Q 30/06* (2012.01)

(52) U.S. Cl.
CPC ......... *G06Q 10/087* (2013.01); *G06Q 20/201* (2013.01); *G06Q 20/208* (2013.01); *G06Q 30/00* (2013.01); *G07G 1/0045* (2013.01); *G06F 3/147* (2013.01); *G06K 2017/0051* (2013.01); *G06K 2017/0093* (2013.01); *G06Q 10/08* (2013.01); *G06Q 30/0601* (2013.01)

(58) Field of Classification Search
CPC ........... G06K 7/10861; G06K 17/0022; G06K 2017/0051; G06K 9/78
See application file for complete search history.

(56) References Cited

U.S. PATENT DOCUMENTS

| | | | |
|---|---|---|---|
| 5,546,475 | A | 8/1996 | Bolle et al. |
| 6,409,085 | B1* | 6/2002 | Gu .................. G07G 1/0054 235/383 |
| 7,100,824 | B2 | 9/2006 | Ostrowski et al. |
| 7,537,170 | B2 | 5/2009 | Reed |
| 7,909,248 | B1 | 3/2011 | Goncalves |
| 8,117,071 | B1 | 2/2012 | Fitch et al. |
| 9,064,161 | B1 | 6/2015 | Boman et al. |
| 2003/0102373 | A1 | 6/2003 | Swartz et al. |
| 2005/0171854 | A1* | 8/2005 | Lyon .................. G01G 19/4144 705/24 |
| 2006/0032915 | A1 | 2/2006 | Schwartz |
| 2007/0086679 | A1 | 4/2007 | Kudo et al. |
| 2007/0158417 | A1 | 7/2007 | Brewington |
| 2008/0249859 | A1 | 10/2008 | Angell et al. |
| 2008/0296392 | A1 | 12/2008 | Connell, II et al. |
| 2009/0152348 | A1 | 6/2009 | Ostrowski |
| 2009/0212102 | A1 | 8/2009 | Connell, II et al. |
| 2010/0059589 | A1 | 3/2010 | Goncalves et al. |
| 2010/0114623 | A1 | 5/2010 | Bobbitt et al. |
| 2010/0158310 | A1* | 6/2010 | McQueen .............. G06K 9/00 382/100 |
| 2010/0217678 | A1 | 8/2010 | Goncalves |
| 2010/0287057 | A1 | 11/2010 | Aihara et al. |
| 2011/0064298 | A1 | 3/2011 | Schlosser et al. |
| 2011/0320322 | A1* | 12/2011 | Roslak ............... G06K 17/0022 705/28 |
| 2012/0087547 | A1 | 4/2012 | He et al. |
| 2013/0044942 | A1 | 2/2013 | Fan et al. |
| 2014/0036630 | A1 | 2/2014 | Herwig |
| 2015/0029339 | A1 | 1/2015 | Kobres et al. |

OTHER PUBLICATIONS

International Search Report, dated Feb. 1, 2013, PCT application PCT/US2012/053201 (published as WO2013033442).
Supplementary Partial European Search Report, Application EP 12 82 8080, dated Jan. 22, 2016.
Amended claims filed in European Application EP 12 82 8080 (European counterpart to WO2013033442), dated Apr. 28, 2014.
Further excerpts from prosecution of European Application EP 12 82 8080 (European counterpart to WO2013033442), including claims filed Apr. 2014, Supplementary Partial European Search Report dated Feb. 1 2016, Supplementary European Search Report and European Search Opinion dated May 19 2016, Amended claims and letter filed Dec. 8 2016, Communication from the Examining Division dated Mar. 22, 2017, Amended Claims and Letter dated Aug. 1 2017, and Communication from the Examining Division dated Oct. 25, 2017.
Bayesian Inference article, Wikipedia, Sep. 8, 2011.
Further excerpts from prosecution of European Application EP 12 82 8080 (European counterpart to WO2013033442), namely letter and amended claims dated Feb. 14, 2018.

* cited by examiner

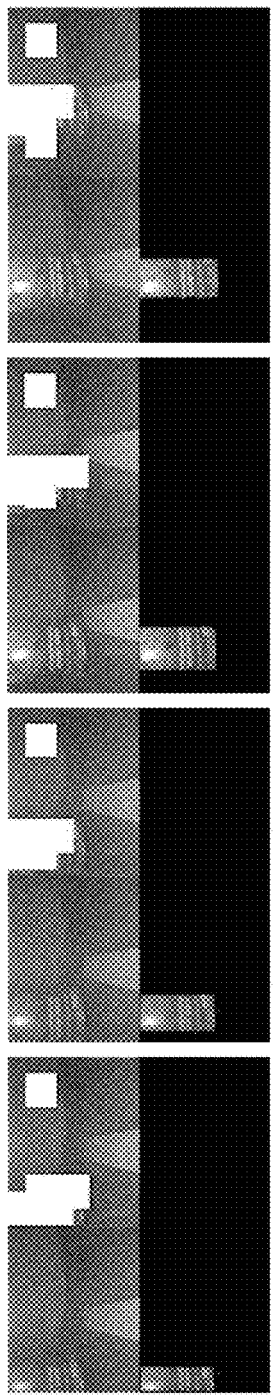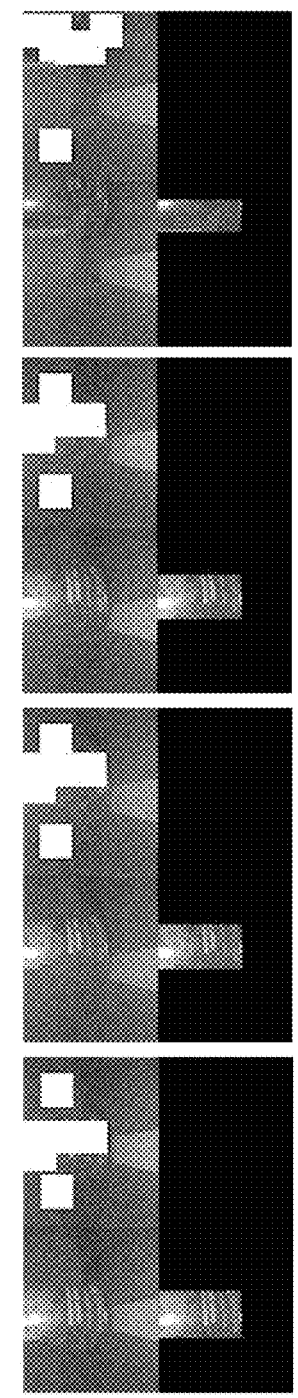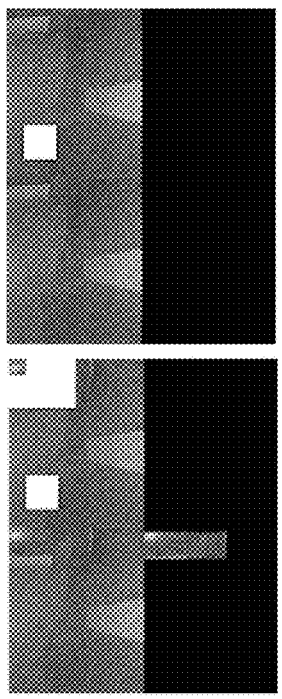

METHODS AND ARRANGEMENTS FOR IDENTIFYING OBJECTS

RELATED APPLICATION DATA

This application is a division of application Ser. No. 13/750,752, filed Jan. 25, 2013 (now U.S. Pat. No. 9,367, 770), which claims priority from provisional applications 61/693,225, filed Aug. 24, 2012; 61/716,223, filed Oct. 19, 2012; 61/716,591, filed Oct. 21, 2012; and 61/724,854, filed Nov. 9, 2012. Application Ser. No. 13/750,752 is also a continuation-in-part of application Ser. No. 13/231,893, filed Sep. 13, 2011 (now U.S. Pat. No. 9,033,238), which claims priority to the following provisional applications 61/529,214, filed Aug. 30, 2011; 61/531,525, filed Sep. 6, 2011; and 61/533,079, filed Sep. 9, 2011. Application Ser. No. 13/750,752 is also a continuation-in-part of PCT application PCT/US12/53201, filed Oct. 30, 2012 (published as WO2013033442), which claims priority to the following applications 61/529,214, filed Aug. 30, 2011; 61/531,525, filed Sep. 6, 2011; 61/533,079, filed Sep. 9, 2011; Ser. No. 13/231,893, filed Sep. 13, 2011 (now U.S. Pat. No. 9,033, 238); 61/537,523, filed Sep. 21, 2011; 61/540,455, filed Sep. 28, 2011; 61/544,996, filed Oct. 7, 2011; and 61/693,225, filed Aug. 24, 2012.

TECHNICAL FIELD

The present technology concerns technologies useful in retail stores, such as for speeding customer checkout.

BACKGROUND AND SUMMARY

The widespread use of barcodes has greatly simplified supermarket checkout. However, many problems persist, causing both inconvenience for shoppers, and added costs for retailers.

One of the difficulties is finding a barcode on a package. While experienced supermarket clerks eventually learn barcode locations for popular products, even the best clerks sometimes have difficulty with less common products. For shoppers who use self-service checkout stations, any product can be confounding.

Another issue concerns re-orienting a package so that its barcode is in position for reading. Many items are straightforward. However, particularly with large items (e.g., a carton of diapers, or a heavy bag of dog food), it can be a physical challenge to manipulate the product so that the barcode is exposed to the reading device. Often in self-service checkout stations, the physical constraints of the checkout station compound the difficulty, as these stations commonly don't have the handheld scanning capability with which conventional checkouts are equipped—forcing the shopper to manipulate the product so that barcode faces a glass scanning platen on the counter. (When properly positioned, the shopper may be unable to view either the platen or the barcode—exacerbating the difficulty.) Moreover, it is not enough for the barcode to be visible to the scanner; it must also be presented so as to roughly face the scanner (i.e., its surface normal must generally be within about 40-50 degrees of facing the scanning device in order to be read).

Sometimes a product is flipped and turned in search of a barcode, only to find there is none. Bottles of wine, for example, commonly lack barcodes.

Yet another issue is occasional difficulty in getting the scanning equipment to successfully read the barcode, after the barcode has been found and correctly positioned. This is a particular problem with malleable items (e.g., a package of frozen peas), in which the barcoded surface is crinkled or otherwise physically irregular.

To redress such issues, some have proposed identifying products with passive tags that can be sensed by radio (e.g., RFID and NFC chips). However, the costs of these tags are an obstacle in the low-margin grocery business. And it can be difficult to distinguish the responses from several different items on a checkout counter. Moreover, certain materials in the check-out queue may be radio-opaque—preventing some identifiers from being read. Privacy issues raise yet further concerns.

Other checkout technologies have also been tried. For example, in patent publication 20040081799, Kodak describes how a marking can be applied to supermarket packaging by adding a polymer layer that defines scannable information in the form of matte and glossy areas. The matte/glossy areas can form indicia such as barcodes, or digital watermarks. However, this technology requires applying a polymer layer to the packaging—a further expense, and an additional processing step that packagers are not equipped to provide.

Other identification technologies have been proposed for use in conjunction with barcode-based product identification. For example, patent application 20040199427 proposes capturing 2D imagery of products, and checking their color histograms against histograms associated with products identified by sensed barcode data, to ensure correct product identification. The same publication similarly proposes weighing articles on the conveyor—again checking for consistency with the barcode-indicated product. Publications 20040223663 and 20090060259 teach related arrangements, in which imagery of products is used to check for possibly switched barcodes.

Applicant's U.S. Pat. No. 7,044,395 teaches that a watermark can replace a barcode, such as a UPC symbol or other standard product code, in a retail point of sale application. A reader unit at a checkout counter extracts a product identifier from the watermark, and uses it to look up the product and its price.

U.S. Pat. No. 4,654,872 describes a system employing two video cameras, which captures images of a 3D article, and uses the imagery to recognize the article. U.S. Pat. No. 7,398,927 teaches another two-camera system, this one to read product codes from articles despite specular reflections. U.S. Pat. No. 7,909,248 details a self-service checkout terminal in which captured imagery is compared against a database of reference imagery to try to identify a matching product.

In accordance with various embodiments of the present technology, certain drawbacks of the prior art are overcome, and new capabilities are provided.

For example, in one aspect, the present technology involves marking product packaging with a digital watermark that encodes related information (e.g., Universal Product Codes, such as UPC-A or UPC-E; Electronic Product Codes—EPC, European Article Number Codes—EAN, a URI or web address, etc.). The marking spans a substantial part of the packaging surface area, so that it can be sensed from one or more fixed cameras at a checkout station without repositioning of the item. The watermark indicia is applied to the packaging along with other printing—integrated in the other packaging artwork.

In one such embodiment, a variety of recognition technologies are used at a checkout station—looking for different indicia of product identification (watermark, barcode, color histogram, weight, temperature, etc.). The system applies a set of rules to the collected evidence, and outputs a product identification based on the available information.

In another aspect, crinkles and other deformations in malleable product packaging are optically sensed, and are used in decoding an identifier from the distorted surface (e.g., the crinkled surface can be virtually flattened prior to decoding the identifier). In one particular arrangement, the crinkled configuration is sensed by structure-from-motion techniques. In another, the product configuration is sensed by a structured light scanner (e.g., of the sort popularized by the Microsoft Kinect sensor).

In yet another aspect, a checkout station comprises a conveyor belt that includes markings that are optically sensed, and which are used to increase check-out speed and accuracy.

In still another aspect, imagery captured from an item that is being conveyor-transported at a checkout station is processed to compensate for motion blur, prior to applying a product recognition technology.

In yet another aspect, a plenoptic camera system senses information at a checkout station. The collected light field data is then processed to yield multiple different planes of focused imagery, to which product recognition technologies are applied. In some embodiments, these planes include a variety of non-parallel planes.

In still another aspect, 2D imagery that is acquired at a checkout station is applied to a GPU, which computes multiple perspective-transformed versions of the imagery. These different versions of the imagery are then analyzed for product recognition purposes. The GPU can process input imagery of several different focal lengths, e.g., captured by plural fixed-focus cameras, or by a camera that cyclically changes its focal plane, or by plenoptic sensing.

In yet another aspect, piled items presented for checkout are volumetrically modeled and segmented to identify component items in the pile.

In still another aspect, the location of an item that is too obscured to be identified within a pile, is determined, so that a clerk or a mechanical system can expose it for identification.

In yet a further aspect, a confidence score is computed that indicates the certainty of an identification hypothesis about an item. This hypothesis is tested against collected evidence, until the confidence score exceeds a threshold (or until the process concludes with an ambiguous determination).

In still another aspect, data acquired away from the checkout station (e.g., in a store aisle) is used in identifying items at checkout. This data can include, e.g., sensor data evidencing removal of a product from a shelf, location data indicating that the shopper paused near certain merchandise, etc. Such data may be accorded a weight that varies with a time elapsed between its sensing and item checkout.

In yet another aspect, a clerk's or shopper's interaction with an item is sensed to aid in identification of the item. For example, a clerk's gaze may be tracked to identify the location of a salient feature on the item, or a shopper's particular hand pose in grasping the item when putting it into a cart or onto a checkout conveyor may provide some clue about the item's identity.

In still another aspect, a system provides guidance to a clerk or shopper concerning a manner of packing items into bags, e.g., based on the shapes, weights and temperatures of the purchased items.

In yet a further aspect, different items at a checkout station are illuminated with light of different colors, e.g., to indicate items that have been successfully identified (or not), to indicate which items should be placed in which bags, etc.

The foregoing and a great number of other features and advantages of the present technology will be more readily apparent from the following detailed description, which proceeds with reference to the accompanying drawings.

BRIEF DESCRIPTION OF THE DRAWINGS

FIGS. 42A-J are illustrations based on a sequence of image captures while a coffee can was passed in front of a camera.

DETAILED DESCRIPTION

Figure 1A:
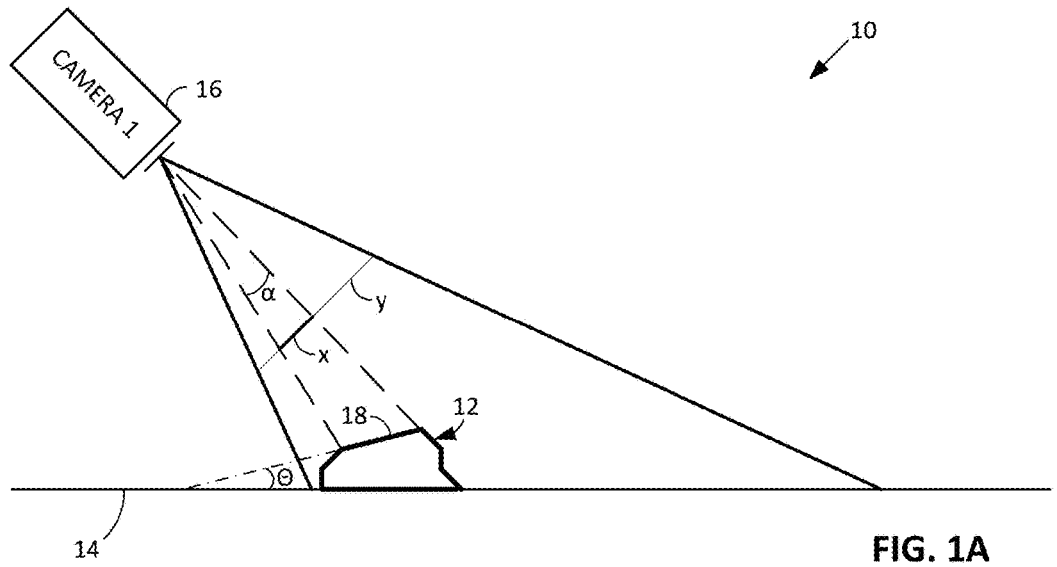
FIGS. 1A and 1B show a malleable item at two positions along a supermarket conveyor, being imaged by a camera.

The present technology has broad applicability, but necessarily is described by reference to a limited number of embodiments and applications. The reader should understand that the technology can be employed in various other forms—many quite different than the arrangements detailed in the following discussion.

In accordance with one particular aspect, the present technology concerns a method for identifying items, e.g., by a supermarket checkout system. A first such method involves moving an item to be purchased along a path, such as by a conveyor. A first camera arrangement captures first 2D image data depicting the item when the item is at a first position along the path. Second 2D image data is captured when the item is at a second position along the path. A programmed computer, or other device, processes the captured image data—in conjunction with geometrical information about the path and the camera—to discern 3D spatial orientation information for a first patch on the item. By reference to this 3D spatial orientation information, the system determines object-identifying information from the camera's depiction of at least the first patch.

In a variant embodiment, the second 2D image data is captured by a second camera arrangement—either when the item is at its first position or its second position along the path.

The object-identifying information can be a machine-readable identifier, such as a barcode or a steganographic digital watermark, either of which can convey a plural-bit payload. This information can additionally or alternatively comprise text—recognized by an optical character recognition engine. Still further, the product can be identified by other markings, such as by image fingerprint information that is matched to reference fingerprint information in a product database.

In some embodiments, the system processes the first and second 2D image data—in conjunction with geometrical information about the path and the camera—to discern second 3D spatial orientation information—this time for a second patch on the item. This second 3D spatial orientation information is typically different than the first 3D spatial orientation information. That is, the second patch is not coplanar with the first patch (e.g., the patches may depict different sides of a carton, or the surface may be deformed or wrinkled). By reference to the discerned first and second 3D spatial orientation information, the system determines identification information for the item. In such arrangement, the identification information is typically based on at least a portion of the first patch and a portion of the second patch. In the case of a barcode, for example, it may span both patches.

In like fashion, the system can determine the 3D pose of an arbitrary number of non-parallel patches on the item, and identify the item based on information from plural such patches.

In some embodiments, the item is moved by a conveyor belt that is provided with markings (e.g., printed or otherwise applied to its surface). These markings can be steganographic or overt. The imagery captured by the camera arrangement(s) includes at least some of these markings. The system analyzes the markings in the captured imagery in connection with the product identification. For example, the system can employ such markings to sense the speed of the conveyor, or to sense the distance to a point on an item resting on the conveyor, or to sense a size of the item on the conveyor, or to calibrate color information in the image(s) (e.g., white balance), or to provide an "image prior" useful in determining a deblurring kernel for motion blur compensation or for other image enhancement processing, etc.

One illustrative marking is a pattern of white "+" indicia, of known dimensions, arrayed uniformly across a black conveyor. Another is a 2D barcode symbology (e.g., a QR code), again printed white-on-black. The same symbology may be regularly repeated, or different symbologies can be used at different locations on the belt (e.g., at different distances from a reading window; the barcode can encode information related to its position on the belt).

In some instances, the markings are visible and promotional (e.g., text markings), yet can still serve one or more of the purposes detailed herein.

The foregoing will be made clearer by a particular example:

FIG. 1A shows a supermarket checkout station 10 in which an item 12 to be purchased is transported by a conveyor belt 14. A first camera 16 captures image data depicting the item.

Item 12 may be irregular in shape, such as a package of frozen peas. Its configuration can be regarded as a collection of adjoining surface patches (e.g., patch 18), each oriented at a different angle. (The orientation of a patch may be characterized by two angles. One is the angle (theta) relative to the lengthwise axis of the conveyor, i.e., the angle at which the plane of the patch intersects that lengthwise axis. The second is the angle (phi, not depicted in FIG. 1A) relative to the crosswise axis of the conveyor, i.e., the angle at which the plane of the patch intersects that cross-wise axis. Other geometries can of course be substituted.)

Camera 16 generates imagery in which each patch is depicted with a particular size, shape and position within the image frame, based on (1) the two orientation angles for the patch, (2) the 2D position of the item on the conveyor, i.e., both along its length and width; (3) the height of the patch relative to the conveyor; (4) the lens function of the camera; and (5) the patch geometry itself.

In FIG. 1A, the patch 18 subtends an angle alpha ($\alpha$). In the depicted representation, this patch spans a distance "x" across the camera sensor's field of view "y"—corresponding to a particular range of sensing elements in the camera's sensor (typically CCD or CMOS).

Figure 1B:
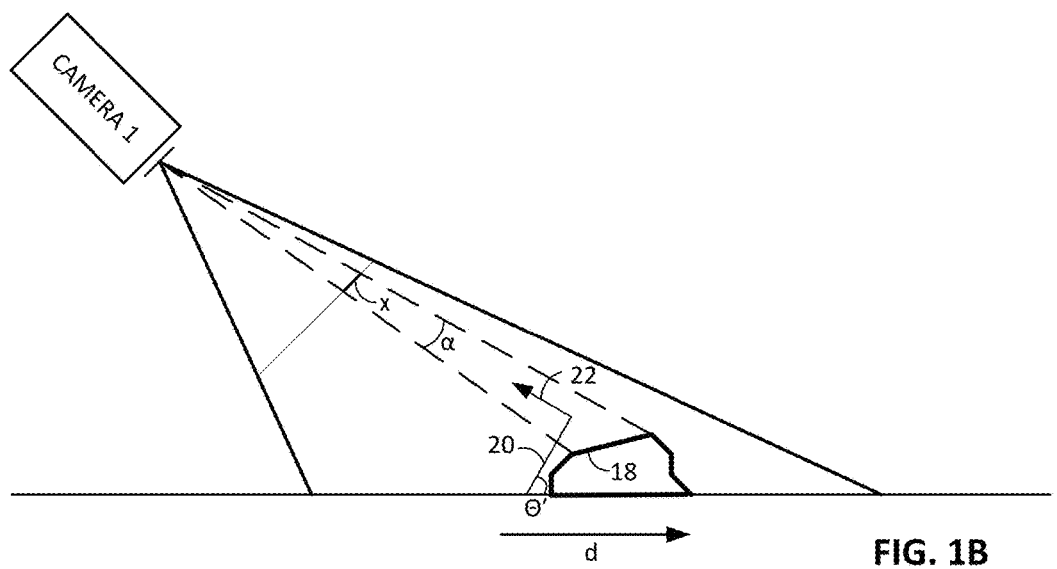

A moment later, the package of peas 12 has moved a distance "d" along the conveyor, as shown in FIG. 1B. The angle alpha has changed, as has the span "x" of the patch across the sensor's field of view.

By reference to known parameters, e.g., the conveyed distance d, the change in pixels spanned by the patch (which correlates with the angle alpha), and the camera lens function, the system determines the angle theta in FIG. 1B (and also in FIG. 1A).

Once the angle theta has been determined, an exemplary system performs a perspective-transform (e.g., an affine-transform) on the depiction of the patch 18 in the FIG. 1B captured imagery, to yield transformed imagery that compensates for the angle theta. That is, a transformed patch of imagery is produced in which the patch appears as if it lies in plane 20, with an angle $\theta'$ that is perpendicular to a ray 22 from the patch to the camera lens.

In like fashion, the angle phi (not shown in FIG. 1B, due to the side view) can be determined. Again, the depiction of the patch 18 can be correspondingly transformed to compensate for this angle phi, to yield a virtually reoriented patch that lies in a plane perpendicular to ray 22.

Techniques for deriving the 3D geometry of patch 18 from the captured imagery are familiar to those skilled in the art, and include "structure from motion" and "simultaneous localization and mapping"(SLAM) methods. These techniques commonly rely on identification of distinctive features (salient points) in one image, and identifying corresponding features in another image. The difference in relative positions of the features between the two images indicates the geometry of the surface on which they lie. (One class of distinctive feature suitable for such analysis is the class of "corner points." Corner points include features such as the ends of lines on contrasting backgrounds. It will be recognized that barcodes have multiple such features—two for each line in the barcode. Another such distinctive feature is the robust local identifier, e.g., as used in SIFT and SURF techniques.)

All of the other patches comprising item 12, which are viewable by the camera in both FIG. 1A and FIG. 1B, are similarly transformed. Such transformations desirably also transform the scale of the depicted patches so that each appears—after transformation—to lie the same distance from the camera sensor, perpendicular to the camera axis.

By such processing, the system renders a virtually flattened package of peas (or other 3D shape)—presented as if its component face patches are coplanar and facing the camera.

Figure 2A:
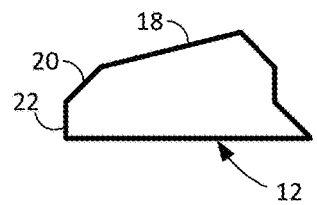
FIGS. 2A and 2B shows how an item with several component planar surfaces can be virtually "flattened" to aid in item identification.
Figure 2B:
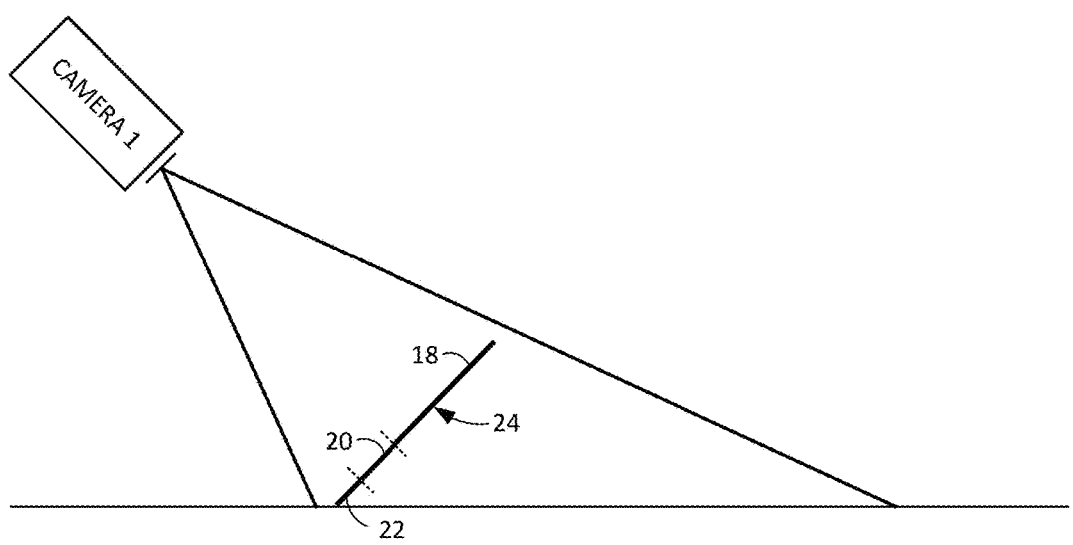

FIGS. 2A and 2B schematically illustrate this virtual flattening. Item 12 includes three component patches 18, 20 and 22, lying in different planes. These patches are imaged by camera 16, from two (or more) different perspectives (e.g., as the item is moved along the conveyor). Based on such information, the system determines the location of the three patches in 3D space. It then re-projects the three patches to lie in a common plane 24, as if facing the camera, i.e., parallel to the camera's image sensor. (Dashed lines separate the three component re-projected surfaces in FIG. 2B. Of course, this illustration only shows virtual flattening of the surface along one dimension. A preferred implementation also virtually flattens the surface along the crosswise dimension of the conveyor, i.e., into the page.)

To this set of re-mapped image data, an extraction process is applied to generate identification data corresponding to the item. The preferred embodiment applies a digital watermark decoding algorithm, but other identification technologies (e.g., barcode decoding, image fingerprinting, OCR, etc.) alternatively can be used.

If a watermark or barcode is present on item 12, it can likely be decoded, regardless of the irregular configuration or presentation of the item on the conveyor. Such marking may be found within a single patch, or it may span two or more patches. In a preferred embodiment, the digital watermarking spans a substantial portion of the packaging extent. In regions where there is no printing (e.g., white space), a yellow or other unobtrusive watermark tint can be applied. (Yellow watermarking is particularly discussed, e.g., in published application 20110274310 and U.S. Pat. No. 6,345,104.)

In some embodiments, it is not necessary to virtually reorient the patch(es) to compensate for both angles theta and phi. Because many decoders are tolerant of some angular skew, a partial angular compensation of the patch (es), in theta and/or phi, is often sufficient for reliable decoding. For example, the patches may be remapped so they all have the same theta angle, but various phi angles. Or a partial correction in either or both of those dimensions can be applied. (A partial correction may be effected through use of affine transforms, whereas a perfect correction may require non-affine, perspective transforms.)

Image fingerprinting techniques (e.g., SIFT, SURF and ORB) that are used for object identification are also somewhat robust to non-plan views of the object. Yet some virtual remapping of the imagery to re-project it to a more flattened state is helpful to assure best results.

The distance along the conveyor can be determined by reference to the difference in times at which the images of FIGS. 1A and 1B are captured, if the conveyor velocity is uniform and known. As noted, the belt may be provided with markings by which its movement alternatively can be determined (The markings can be promotional in nature, e.g., Tony the Tiger, sponsored by Kellogg's.) In still other embodiments, a conveyor is not used. Instead, the item is moved past the camera by hand. In such case, the distance and other path parameters can be estimated by feature tracking, from features in the captured imagery. Alternatively, a structured light scanning arrangement can be employed.

In some implementations, the speed of the conveyor varies in accordance with signals from a control unit, e.g., operated by a cashier's foot. The speed can be sensed by an electro-mechanical arrangement (e.g., a roller wheel and an optical chopper) or from analysis of the captured imagery. Such knowledge of the conveyor speed can be used in extracting identification information relating to objects on the conveyor (e.g., re mitigating motion blur before extracting identification information, etc.).

Figure 3C:
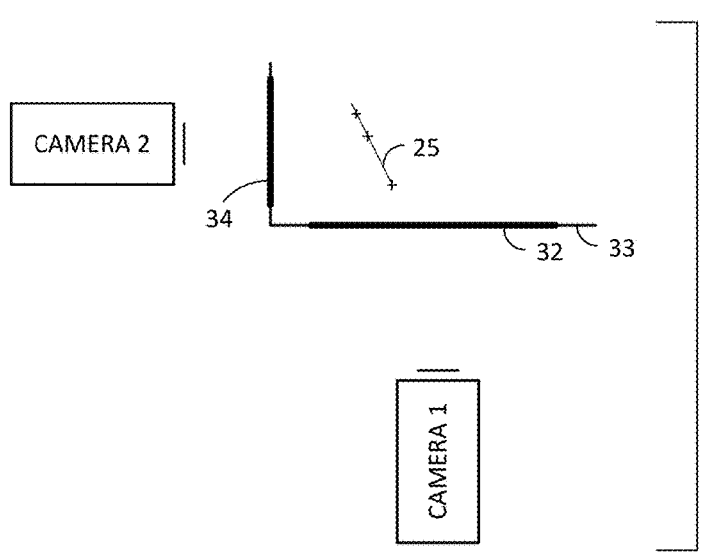
FIG. 3C shows another embodiment employing two cameras.
Figure 3A:
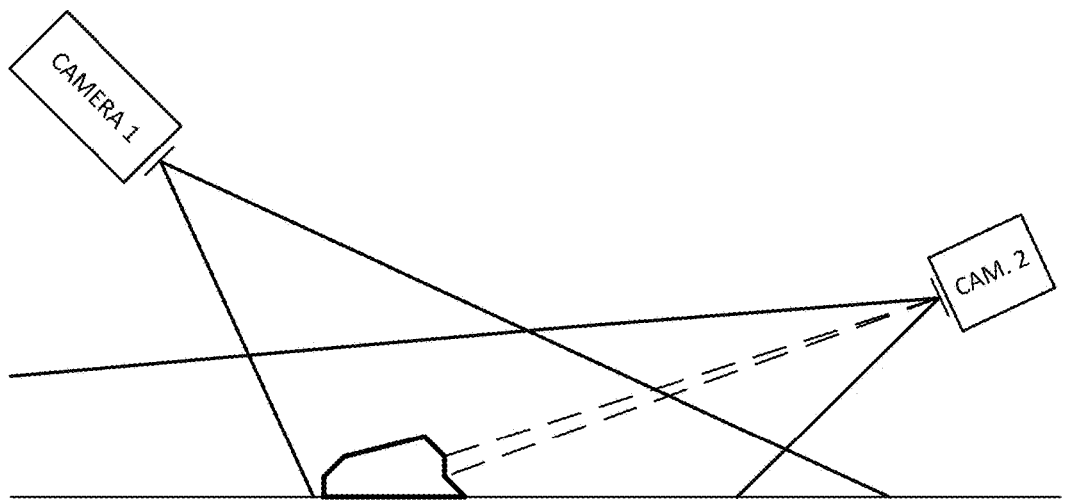
FIGS. 3A and 3B are similar to FIGS. 1A and 1B, but show the item being imaged by two cameras.
Figure 3B:
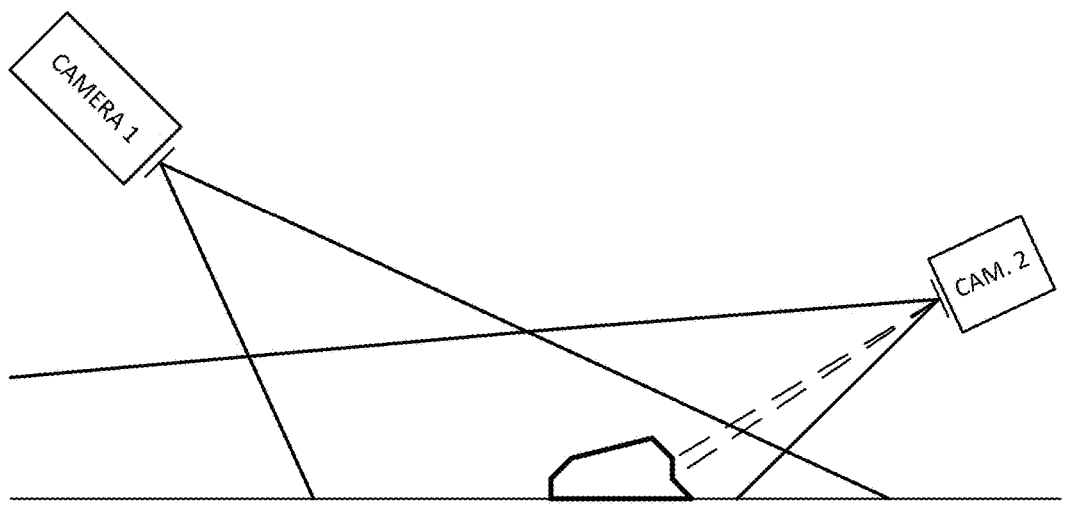

FIGS. 3A and 3B show a further arrangement in which two cameras are used. Such arrangement allows image capture from patches of the item that may not be visible to a single camera. In such embodiment, the cameras may be at different elevations relative to the conveyor (including below, e.g., looking up through a glass platen). They may also be oriented at different angles (theta and/or phi) relative to the conveyor. They can also be spaced at different positions along the length of the conveyor, so that the time intervals that the item is viewed by the two cameras are not co-extensive. That is, the first camera captures imagery of the item during a first period, and the second camera captures imagery of the item during later period (which may, or may not, overlap with the first period). If a patch is visible to both cameras, the additional captured imagery allows more accurate virtual transformation of the depicted image patches to facilitate identifier discernment. A virtual planar reconstruction of the package surface is desirably generated using imagery from the two cameras.

FIG. 3C shows another two-camera arrangement. This arrangement includes a first camera looking up through a glass window 32 in a checkout counter 33, and a second camera looking across the checkout counter through a window 34 in a vertical housing. The two cameras are positioned so that their camera axes intersect at right angles.

Segmentation techniques are used to identify different items within imagery captured by the two cameras. Feature points found in one camera's imagery within a segmented shape are matched with corresponding points in the second camera's imagery. If three or more such points are found in both images (e.g., as indicated by the "+" symbols in FIG. 3C), the orientation of the plane defined by such points can be determined by the positions of the three points in the two different images. (E.g., in the two-dimensional depiction of FIG. 3C, the orientation of the line 25 containing the three points causes the points to appear closer together in the imagery of camera 1 than in the imagery of camera 2.) With this clue as to the orientation of a product surface, imagery of the surface can be processed to remove associated perspective distortion (i.e., image rectification), prior to applying a watermark decoding algorithm to the imagery.

In other embodiments, three or more camera arrangements can be used.

In accordance with another aspect of the present technology, the checkout station captures imagery of different colors, e.g., by illuminating the area with different colors of light. The different colors of imagery can be captured simultaneously (e.g., by different cameras) or serially. The different frames of information can be processed to generate different information, or to serve different purposes.

One particular implementation illuminates the items with a repeating sequence of three colors: white, infrared, and ultraviolet. Each color is suited for different purposes. For example, the white light can capture an overt product identification symbology; the ultraviolet light can excite anti-counterfeiting markings on genuine products; and the infrared light can be used to sense markings associated with couponing and other marketing initiatives.

Different frames of captured imagery can be utilized to synthesize enhanced frames of imagery for use as described above (e.g., product identification, anti-counterfeiting, and marketing).

Other aspects of the present technology make use of one or more plenoptic cameras (sometimes termed multi-aperture sensors, radiance cameras, or light field cameras). Some such cameras employ an array of plural component cameras, typically formed on a common substrate, each with its own lens. These cameras may be viewed as sensing a 4D light field. From their collected data, they can produce frames of data at arbitrary focal planes. This allows captured imagery to be "focused after the fact."

Figure 4A:
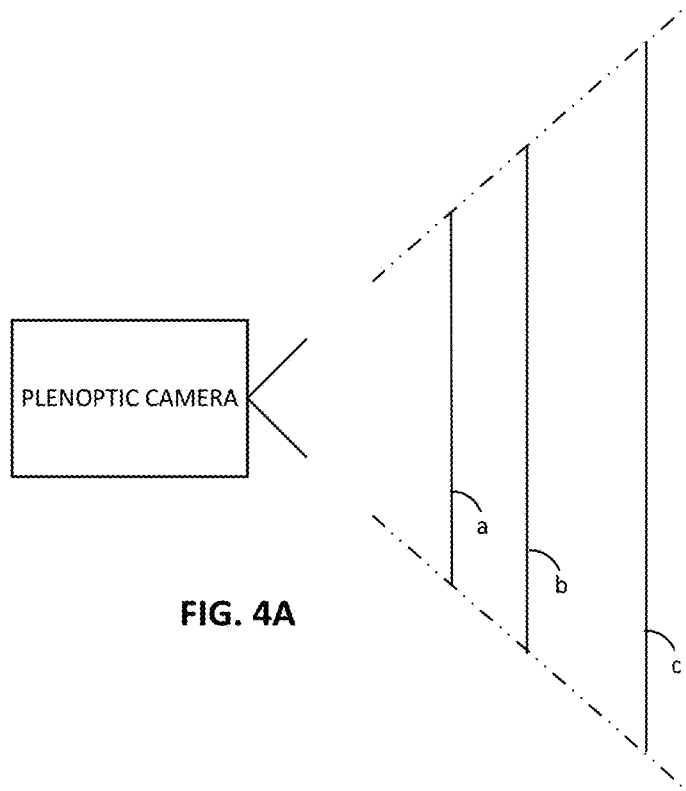
FIGS. 4A and 4B illustrate how a plenoptic sensor can be used to generate different planes of focused imagery within an imaging volume, including parallel planes and non-parallel planes.

For example, in FIG. 4A, a plenoptic camera system processes the data captured by its component sensors to yield a frame focused at focal plane "a." The same data can also be processed to yield a frame focused at focal plane "b" or "c."

Figure 4B:
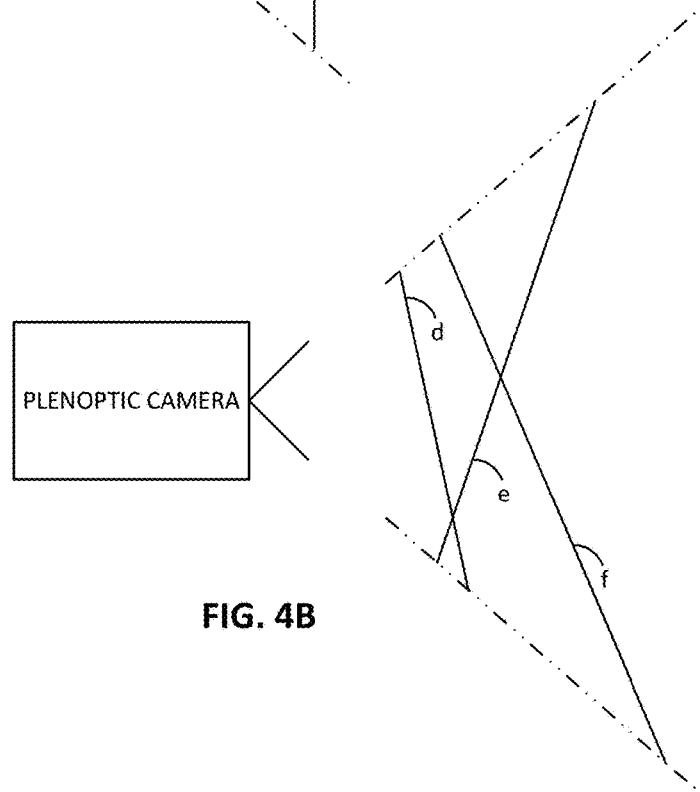

The focal planes needn't be parallel, as shown in FIG. 4A. Instead, they can be non-parallel (e.g., focal planes "d," "e" and "f" in FIG. 4B). One particular technique for synthesizing tilted focal plane imagery is known to artisans from Vaish et al, Synthetic Aperture Focusing using a Shear-Warp Factorization of the Viewing Transform, 2005 IEEE Computer Society Conference on Computer Vision and Pattern Recognition, pp. 129-136.

In one embodiment, captured plenoptic information is processed to yield a first set of imagery having a focal plane coincident with a first plane through a volume that encompasses at least part of an item. The plenoptic information is also processed to yield a second set of imagery having a focal plane coincident with a second plane through said volume, where the first and second planes are non-parallel. The thus-processed information is then analyzed to discern object identification information.

Figure 5:
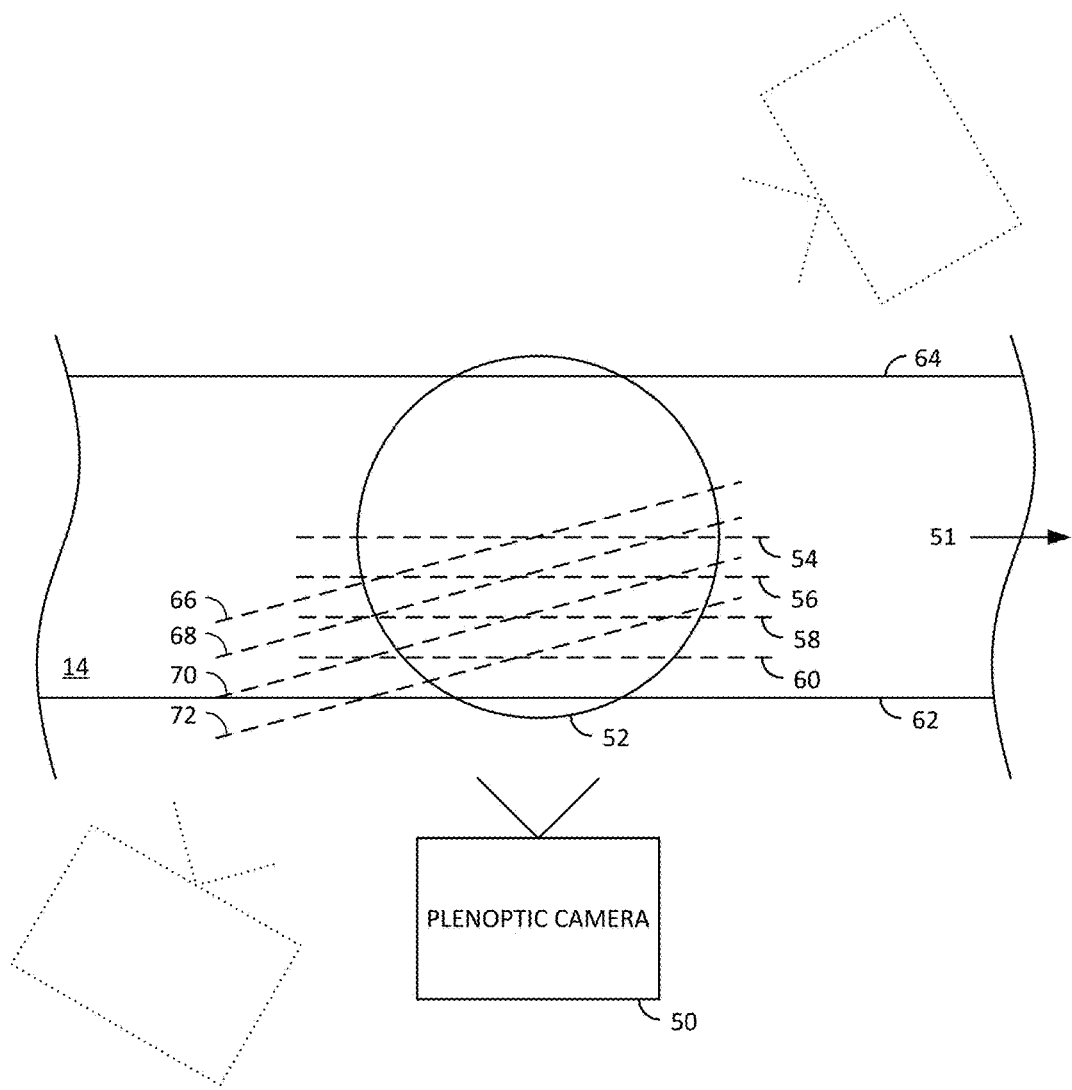
FIG. 5 illustrates a supermarket checkout conveyor that is imaged by a plenoptic camera system, allowing extraction of multiple frames of imagery at different focal planes.

Referring to FIG. 5 (which is a plan view looking down on a conveyor of an exemplary embodiment), the plenoptic information from camera 50 is processed to yield many different focal planes of imagery through a volume that encompasses the items on the conveyor. If the items are imagined as occupying a hemispherical region 52 on the conveyor 14, one focal plane 54 (shown in dashed lines) extends vertically up from the central axis 51 of the conveyor, bisecting the hemisphere. Three other planes 56, 58, 60 similarly extend up perpendicularly from the plane of the conveyor, spaced successively three inches closer to the edge 62 of the conveyor. (Three further planes—not shown, for clarity of illustration—are similarly disposed near the other edge 64 of the conveyor.)

In addition to this first plurality of parallel planes, the plenoptic data is also processed to yield a second plurality of focal planes that again extend vertically up from the plane of the conveyor, but are skewed relative to its central axis 51. The depicted planes of this second plurality, 66, 68, 70 and 72 correspond to the planes of the first plurality, but are skewed +15 degrees.

Although not shown in FIG. 5 (for clarity of illustration), additional sets of focal plane imagery are similarly derived from the plenoptic camera data, e.g., oriented at skew angles of +30, +45, and +60 degrees. Likewise, such planes are generated at skew angles of −15, −30, −45, and −60 degrees.

All the just-described planes extend vertically up, perpendicularly from the conveyor.

The plenoptic information is also processed to yield tilted focal planes, i.e., that do not extend vertically up from the conveyor, but instead are inclined. Counterparts to each of the above-described planes are generated at a tilt angle of 15 degrees. And others are generated at tilt angles of 30, 45 and 60 degrees. And still others are generated at tilt angles of −15, −30, −45, and −60 degrees.

Thus, in this exemplary embodiment, the plenoptic information captured by camera 50 is processed to yield a multitude of different focal planes of image information, slicing the hemispherical volume with planes every three inches, and at every 15 degrees. The resulting sets of image information are then analyzed for product identification information (e.g., by applying to watermark decoder, barcode decoder, fingerprint identification module, etc.). Depending on the location and orientation of the item surfaces within the examined volume, different of these planes can reveal different product identification information.

While plenoptic cameras are generally conceived as full color devices, they needn't be so for product identification. For example, a watermark signal may be encoded in product packaging in a red channel, and a corresponding monochrome (red) plenoptic camera can be used for decoding. In such a camera, the usual four-cell Bayer pattern of red/green/green/blue can be eliminated, and all of the sensor elements can sense red alone.

(Although described with reference to a single plenoptic camera, actual implementations can use two or more cameras, as shown in dotted lines in FIG. 5. Information from such plural cameras can be combined or otherwise used in concert.)

While detailed in connection with an embodiment employing plenoptic information, this concept of examining plural different focal planes of imagery for product identification information can be implemented in other manners. One is to use a fixed focus camera to capture a single plane of imagery, and provide the imagery to a GPU that applies a collection of different image transformations. For example, the GPU can apply a +15 degree corrective perspective transform. This process has the effect of taking any physical surface inclined −15 degrees relative to the image focal plane (i.e., inclined −15 degrees to the camera sensor in typical embodiments), and warp it so that it appears as if it squarely faced the camera. (Desirably, the scene is adequately lit so that the captured imagery has a depth of field that spans the surface being imaged.) The GPU can similarly re-project the original imagery at horizontal tilts of −60, −45, −30, −15, +15, +30, +45, and +60 degrees, and at vertical tilts −60, −45, −30, −15, +15, +30, +45, and +60 degrees. It can likewise warp the original image at each combination of these horizontal and vertical tilts. Each resultant set of image data can be processed by an identification module to extract object identification information.

(Before applying the captured image data to the GPU for perspective transformation, or before applying the GPU-transformed image data to the identification module, the data is desirably examined for suitable focus. Focused regions can be identified by their high frequency content, or their high contrast, as compared with out-of-focus imagery. Imagery that is determined to be out of focus needn't be further processed.)

If the depth of field of a conventional fixed focus camera is not adequate, known extended depth of field imaging techniques can be used (see, e.g., U.S. Pat. Nos. 7,218,448, 7,031,054 and 5,748,371).

In still other arrangements, the system uses a variable focus camera, and its focal plane is cyclically changed (e.g., mechanically or by fluid action) to capture successive planes of imagery at different focal lengths. These images are provided to a GPU to apply different image transformations, as detailed above.

A GPU is well suited for use in the detailed arrangements, because it employs a plurality of processing cores to execute similar instructions on several sets of data simultaneously. Such a GPU can likewise be employed to perform a watermark or barcode decoding operation, or a fingerprint extraction operation, or an OCR operation, on multiple sets of data (e.g., the differently-transformed image sets) simultaneously.

A GPU can also be used to perform processing of information acquired by a plenoptic camera arrangement. For example, a GPU can extract the different planes of focused imagery. Or another processor can extract parallel planes of focused imagery (e.g., planes 54-60 in FIG. 5), and then a GPU can perspective-transform these parallel planes to yield a diversity of other planes that are not parallel to planes 54-60. In still other arrangements, a GPU is employed both to process the captured information (to yield multiple sets of imagery in different focal planes), and also to process the multiple sets of imagery to extract identification information. In yet other arrangements, multiple GPUs are used, including in embodiments with multiple cameras.

Figure 8:
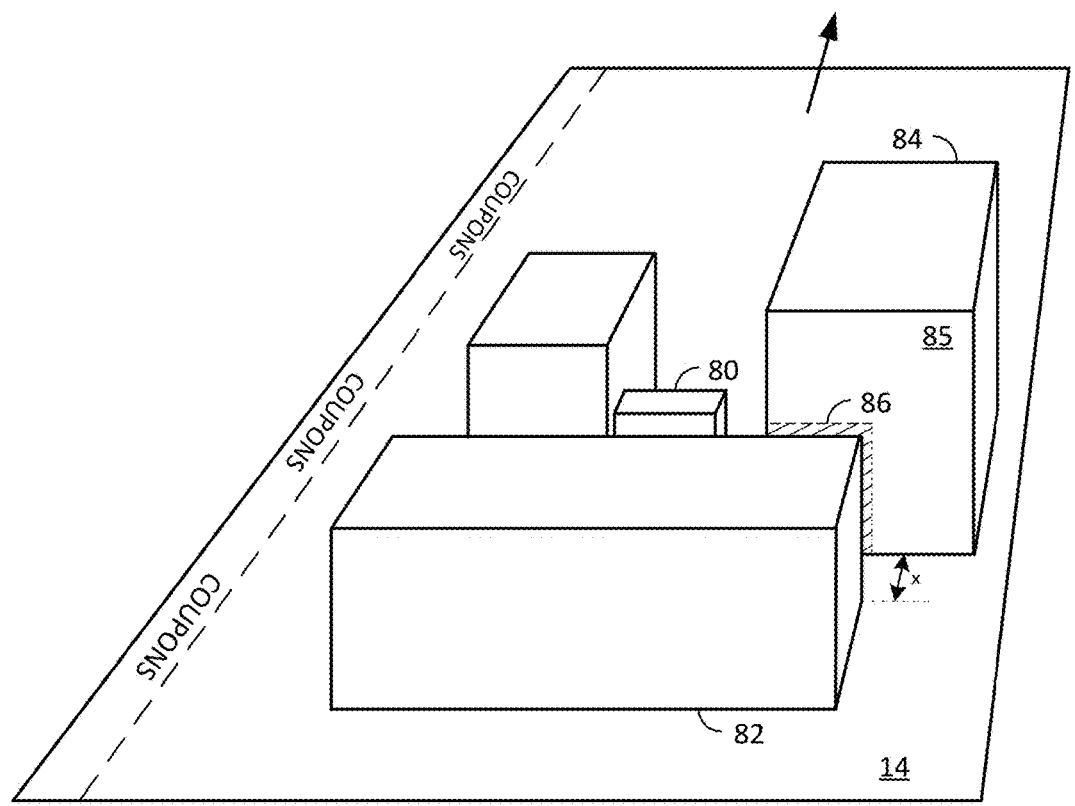
FIG. 8 is a perspective view of items on a checkout conveyor.

FIG. 8 shows a checkout conveyor 14 carrying various items for purchase, from the perspective of an illustrative imaging camera. The items are arranged on the conveyor in such a manner that item 80 is largely obscured. Its position may be such that no barcode is ever visible to any camera as the item passes along the conveyor, and its visible surfaces may be too small to enable object recognition based on other technologies, such as image fingerprinting or digital watermarking.

In accordance with another aspect of the present technology, a 3D image segmentation algorithm is applied to determine the different shapes on the conveyor. The system associates the different segmented shapes on the conveyor with the different object identifiers derived from sensor information. If there is a mismatch in number (e.g., segmentation shows four items on the FIG. 8 conveyor, but the system may output only three product identifications), this circumstance is flagged to the operator. Image data highlighting the outlier item (i.e., item 80 in FIG. 8) can be provided to a supervisor for review and action, and/or a diverter can divert the item from the flow of items through checkout—for manual processing without stopping other checkout progress.

(For a review of illustrative segmentation algorithms, see, e.g., Wirjadi, Survey of 3d Image Segmentation Methods, Reports of Fraunhofer ITWM, No. 123, 2007. Two popular classes of segmentation techniques are thresholding and region growing. Related technology for dimensioning objects on a supermarket conveyor is detailed in U.S. Pat. No. 7,344,082.)

In accordance with a further aspect of the present technology, the checkout conveyor of FIGS. 1 and 8 moves at a uniform rate. However, frames of imagery are not similarly captured at uniform intervals. Instead, the system captures frames at non-uniform intervals.

For example, the camera imagery may reveal a gap between items in the longitudinal direction of the conveyor. (Such a gap "x" is shown between items 82 and 84 of FIG. 8.) When such a gap is present, it presents an opportunity to capture imagery depicting a product face that may be exposed only briefly (e.g., part 86 of face 85 of item 84 that is generally occluded by item 82). The system controls the camera to capture an image frame when part 86 is maximally revealed. If this instant comes at time t=175 ms, and the system normally captures image frames at uniform intervals of 50 ms, then an extra frame is captured at t=175 ms (e.g., frames captures at 0 ms, 50 ms, 100 ms, 150 ms, 175 ms, 200 ms . . . ). Alternatively, the system may delay or advance a regular frame of image capture so as to capture a frame at the desired instant (e.g., 0 ms, 50 ms, 100 ms, 175 ms, 200 ms, 250 ms . . . ). Such an event-driven frame capture may establish the timing by which subsequent frames are uniformly captured (e.g., 0 ms, 50 ms, 100 ms, 175 ms, 225 ms, 275 ms . . . ).

In an alternative arrangement, frame capture is performed at regular intervals. However, the system slows or pauses the conveyor 14 so as to allow image capture from a surface that is only briefly visible to the camera (e.g., part 86). After such image has been captured, the conveyor resumes its normal motion.

Figure 9:
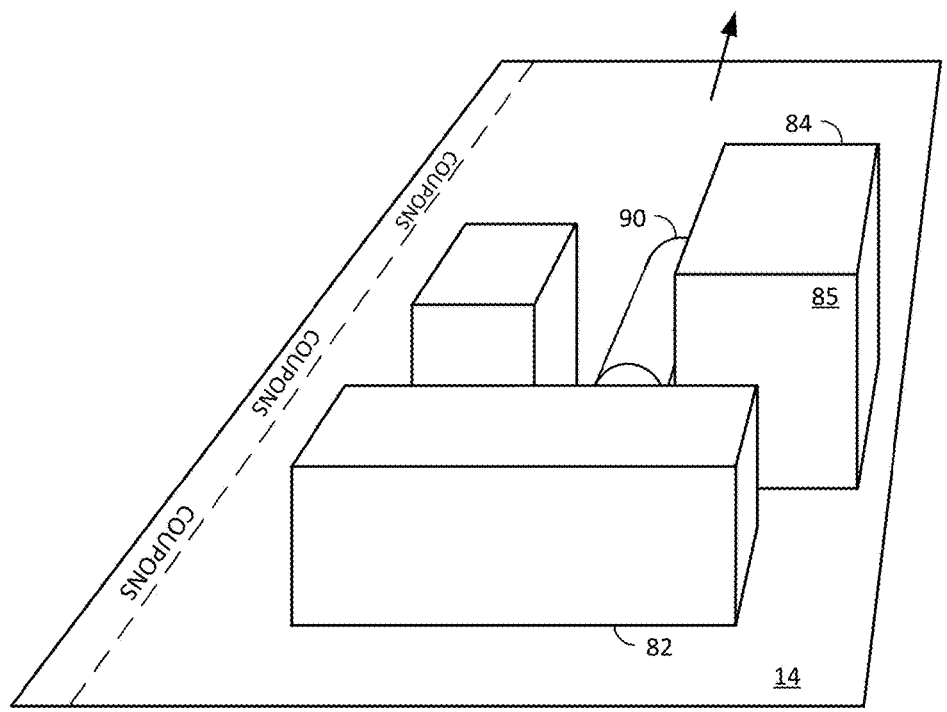
FIG. 9 is another perspective view of items on a checkout conveyor, including a cylindrical item.

FIG. 9 shows a similar conveyor, but this time including a cylindrical article 90. (Only part of the cylindrical surface is visible; some is downward-facing, and the camera's view of another portion of its surface is occluded by item 84.)

According to another aspect of the present technology, text found in imagery serves as rotation-orientation information useful in extracting item identification.

Figures 10A, 10B:
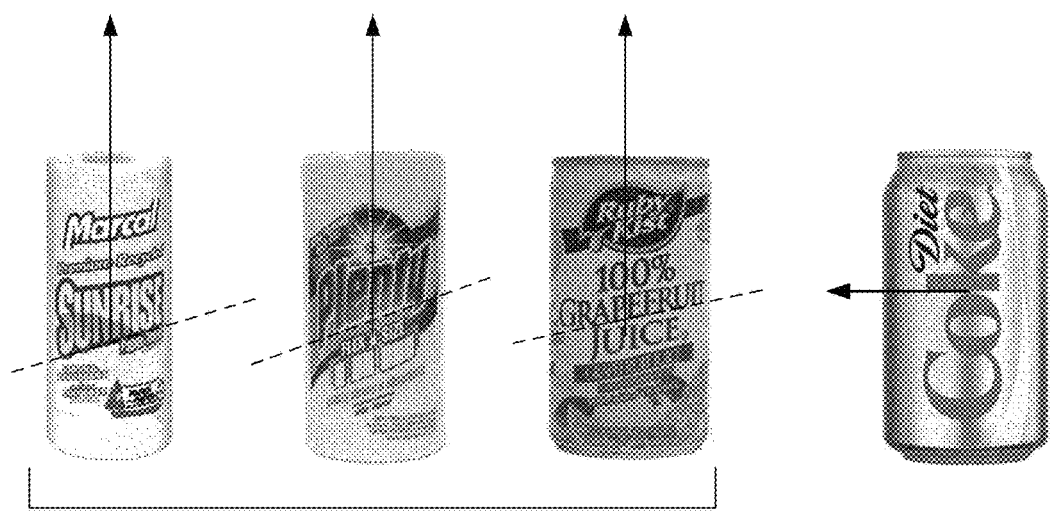
FIG. 10A shows that the most prominent text on most cylindrical items is oriented parallel to the cylinder axis.
FIG. 10B shows that certain cylindrical items include the most prominent text 270 degrees (clockwise) from the cylinder axis.

Consider the cylindrical grocery items shown in FIG. 10A. Each includes prominent text, and the generally-horizontal line of text is inclined (up to the right, as shown by the dashed lines). However, despite such inclination, the up-down axis of each letter points vertically upward (shown by the solid arrows).

FIG. 10B shows a contrary case. Here the up-down axis of each prominent letter points to the side, i.e., 270 degrees clockwise from vertically upward. ("Prominent" text here refers to text that is larger than the smallest text visible on an item.)

Naturally, there are exceptions. But by and large, the up-down axis of the biggest text on an item (cylindrical or otherwise) is generally parallel with one of the principle axes of the item.

Figure 12:
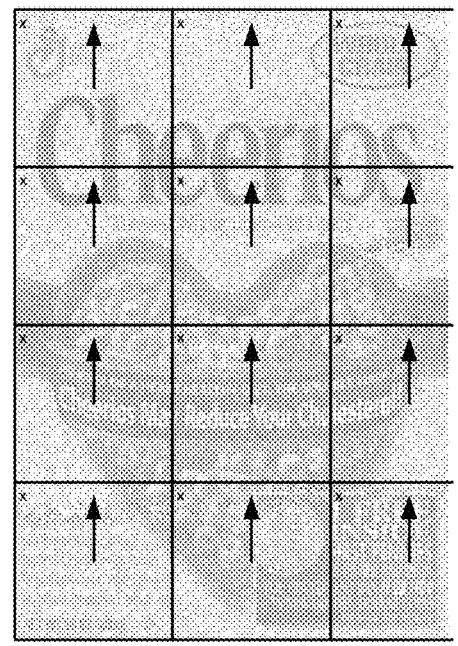
FIG. 12 shows tiled placement of a watermark pattern across a face of a cereal box.

As is familiar to artisans, digital watermarking patterns are typically applied to items in a tiled fashion, with a single square watermark pattern being replicated across and down the item being watermarked. FIG. 12 shows an example. Here artwork for a box of cereal is digitally watermarked with tiled patterns. The tiles are typically embedded with an upper left corner (indicated by an "x") of a first tile coincident with the upper left corner of the artwork. Tiles are then placed across and down from this starting point.

Each watermark pattern has an orientation (indicated by the arrows in FIG. 12). Again, common practice is to embed the watermark tiles so that they are oriented in the same manner as the artwork (i.e., with "up" in the artwork corresponding to "up" in the watermark pattern).

To read the watermark from image data, the watermark decoder must first determine the orientation of the watermark tiles. The watermark decoder's work may be eased, and decoding speed may be increased, if this task of determining orientation is shortcut in some fashion.

The up-down orientation of prominent text on packaging often provides such a shortcut. The orientation of the letter "C" in Cheerios in FIG. 12 indicates the orientation of the watermark encoded in the cereal box artwork.

Likewise, the orientation of the prominent text on the items of FIG. 10A indicates the orientation at which a watermark on these items likely is to be found.

If a watermark decode operation, based on an assumption that the watermark is oriented in the same direction as the prominent text, fails, a second watermark decode operation can be tried—this one assuming that the watermark is oriented 90 degrees from the orientation of the biggest text. Such is the case with the Coke can of FIG. 10B. (That is, the watermark pattern is applied as on the cereal box of FIG. 12, with the top of the watermark tile being oriented towards the top of the product, which in FIG. 10B is 90 degrees clockwise from the orientation of the prominent text "Coke.")

Returning to the conveyor example, a segmentation module identifies and extracts the portion of the camera imagery depicting the shaded surface of item 90. (Known 2D segmentation can be used here.) This image excerpt is passed to a text detector module that identifies at least one prominent alphabetic character. (Known OCR techniques can be used.) More particularly, such module identifies a prominent marking in the image excerpt as being a text character, and then determines its orientation, using various rules. (E.g., for capital letters B, D, E, F, etc., the rules may indicate that the longest straight line points up-down; "up" can be discerned by further, letter-specific, rules. The module applies other rules for other letters.) The text detector module then outputs data indicating the orientation of the analyzed symbol.

Figure 11:
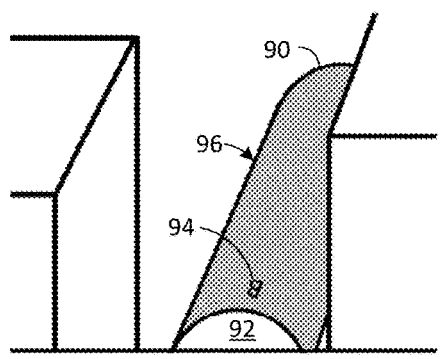
FIG. 11 is a detail of the cylindrical item of FIG. 9.
Figure 13:
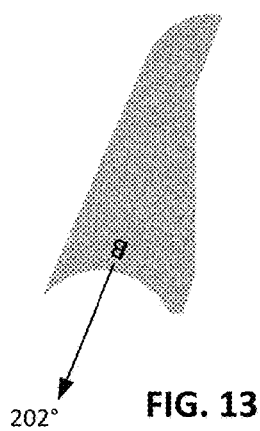
FIG. 13 shows the cylindrical surface portion of FIG. 11, and how text on this cylindrical surface provides an important clue to the surface orientation.

For clarity of illustration, the depicted surface includes only a single letter, a "B" (FIG. 11). The text detector module outputs data indicating that this letter is presented in the image excerpt at an orientation of 202 degrees (FIG. 13).

Figure 14A:
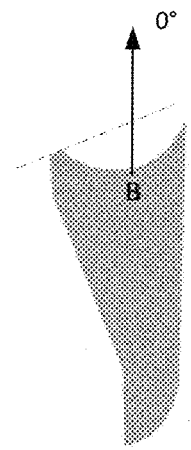
FIG. 14A shows the cylindrical surface in FIG. 9 rotated so that the most prominent text is oriented vertically.

With this as a clue as to the orientation of any embedded watermark, the system next rotates the image excerpt clockwise 158 degrees, so that the "B" is oriented vertically (i.e., 0 degrees), as shown in FIG. 14A. A watermark decode operation is then attempted on this excerpt. The decoder looks for a watermark pattern at this orientation. If unsuccessful, it may further try looking for the watermark pattern at small orientation offsets (e.g., at selected orientation angles +/−8 degrees of the FIG. 14A orientation).

Figure 14B:
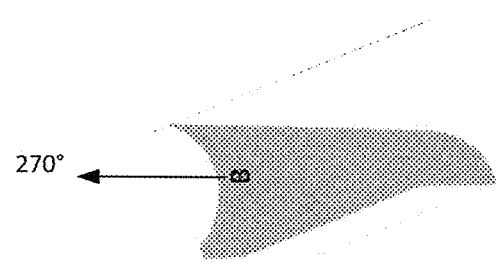
FIG. 14B shows the cylindrical surface in FIG. 9 rotated so that the most prominent text is oriented 270 degrees from vertical.

If no watermark is found, the system can next rotate the image excerpt a further 270 degrees clockwise, to the orientation depicted in FIG. 14B. Again, the same decode operations can be repeated.

In some embodiments, if no watermark is then decoded, the system may conclude that there probably is no watermark, and curtail further watermark processing of the image excerpt. Alternatively, it may employ a prior art method to undertake a more exhaustive analysis of the image excerpt to try to find a watermark—considering all possible orientations (e.g., as detailed in the assignee's U.S. Pat. No. 6,590,996).

Figure 15:
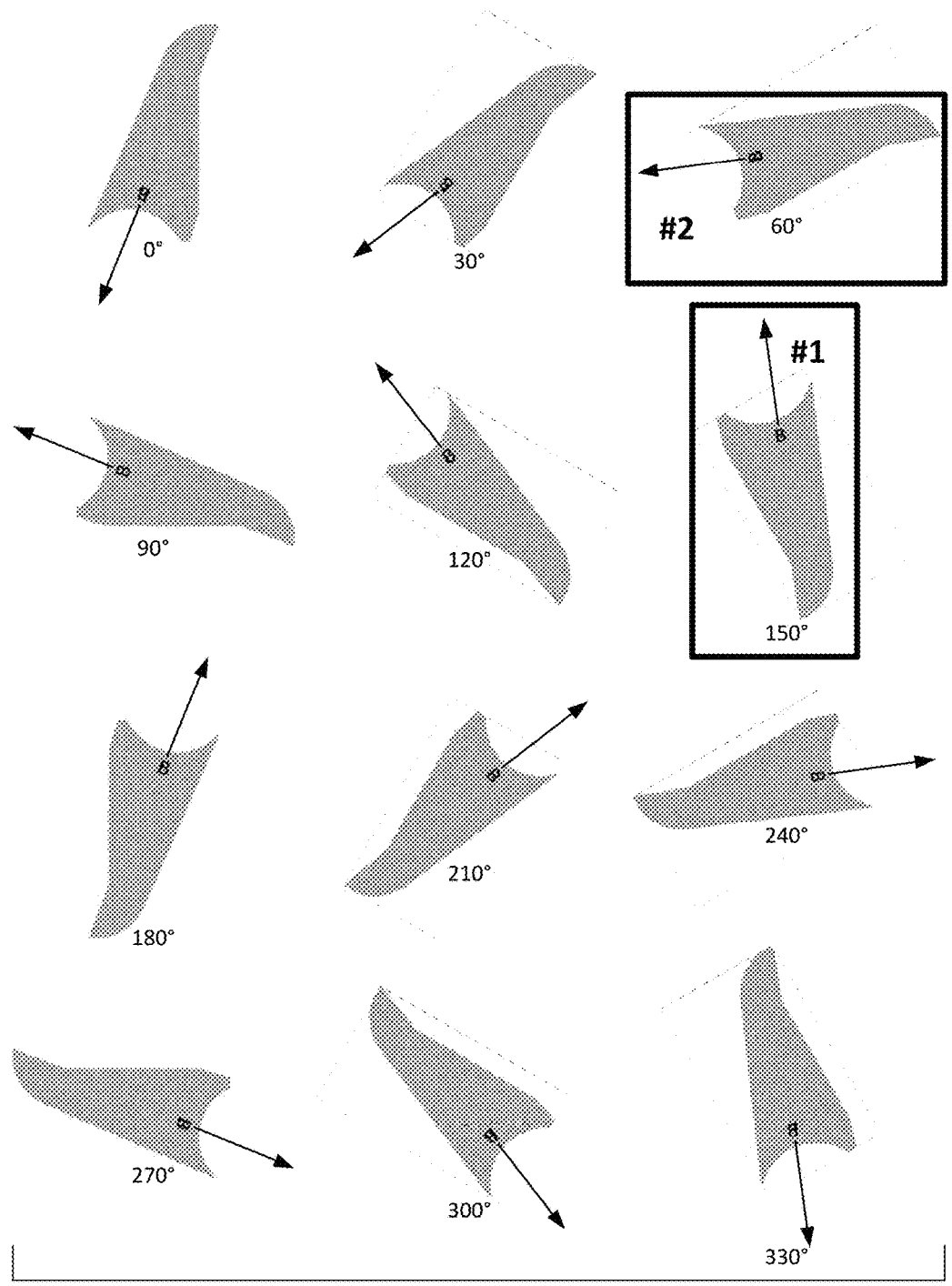
FIG. 15 shows the cylindrical surface portion of FIG. 12, rotated 30, 60, 90, 120, 150, 180, 210, 240, 270, 300, and 330 degrees by cores of a GPU, and indicating two of these rotations as potentially the best for deriving identifying information.

A variant embodiment is shown in FIG. 15. In this embodiment, the image excerpt is applied to a GPU, which uses one core to rotate it 30 degrees, another core to rotate it 60 degrees, and so on for all increments up through 330 degrees. All of these operations are performed simultaneously. Including the original image excerpt, there are 12 differently-rotated versions of the image excerpt. (12 was the maximum number that could be presented conveniently on a single drawing sheet; in actual practice there may be many more, e.g., 36 at rotational increments of 10 degrees, 120 at rotational increments of 3 degrees, etc.)

One approach is to examine each of these differently-rotated excerpts for a watermark—assuming the watermark is oriented "up" in the different depicted orientations (or within a small angular offset of +/−15 degrees).

More economical, however, is for the system to rank the different rotation states based on the likelihood of finding a watermark at that orientation state. In the FIG. 15 example, the system ranks the 150 degree rotation as number 1, because this rotation orients the prominent text character "B" most nearly upright. If a watermark is present in the image excerpt, it will most likely be found by examining this number 1-ranked excerpt (again, +/−15 degrees).

If no watermark is found, the system then considers the number 2-ranked excerpt. Here, the number 2-ranked excerpt is the one rotated 60 degrees. The system ranks this excerpt as number two because the orientation of the text character B is closest to 270 degrees (as in FIG. 10B). Again, the system applies a watermark decoding algorithm to this rotated version of the image excerpt—again examining nearby rotation states too (+/−15 degrees).

If no watermark is yet decoded, the system may give up, or it may consider other rotational states (e.g., perhaps ranked number 3 because of the orientation of other detected text). Or, again, it may invoke a prior art method to search for a watermark of any rotational state.

While the foregoing discussion of text focused on cylindrical objects, the same principles are applicable to items of arbitrary shape.

Another implementation functions without regard to the presence of text in the imagery.

Figure 16:
FIG. 16 shows how a long edge of a segmented image region can be used as a clue to watermark orientation.

Referring to FIG. 16, the system passes the segmented region to an edge finding module, which identifies the longest straight edge 98 in the excerpt. (In one implementation, only boundary edges of the segmented region are considered; in another, internal edges are considered too). The angle of this line serves as a clue to the orientation of any watermark.

(A variety of edge detection technologies are known to artisans. The Canny edge detection technique is popular. Others include Sobel and Harris edge detectors.)

In FIG. 16, there is directional ambiguity—there is no text symbol to indicate which direction is "up." Thus, two possible orientations are indicated, 202 degrees and 22 degrees in this example.

Figures 17A, 17B:
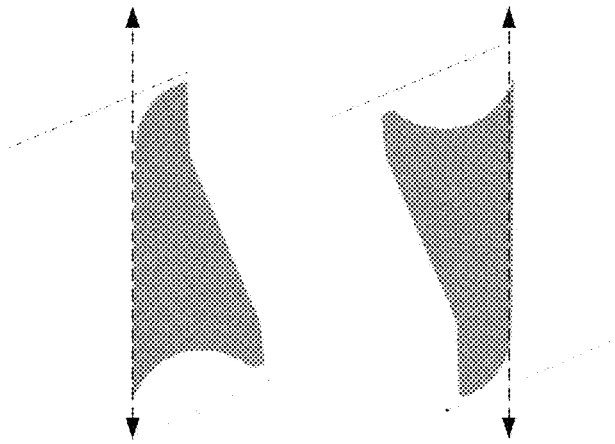
FIGS. 17A and 17B show the long edge of FIG. 16 rotated in two vertical orientations.

The system then rotates the FIG. 16 excerpt to make this longest line vertical, as shown in FIG. 17A. As described above, a watermark decoding operation is tried, assuming the watermark is oriented up in this image presentation. If such attempt fails, the system next rotates the excerpt a further 180 degrees (FIG. 17B) and tries again.

As described above, a GPU implementation can also be utilized, with the system ranking different rotation states for further analysis, based on directional clues—in this case the orientation of the long edge.

A still further implementation relies on circles, rather than straight lines or text. Supermarkets contain countless cylindrical items—mostly canned goods. Such items have two circular faces, which commonly are not printed (e.g., face 92 in FIG. 11). Yet the presentation of the circular face (or part thereof, as in FIG. 11) provides a clue as to the orientation of watermark encoding on an adjoining cylindrical surface.

Figure 18:
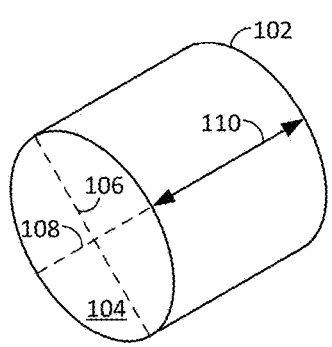
FIG. 18 shows how the minor axis of a ellipse can be used as a clue to watermark orientation.

FIG. 18 shows a can 102, as it might be viewed on a conveyor. Its circular end 104 (which may be a top or bottom), viewed obliquely, appears as an ellipse. An ellipse is characterized by major and minor axes. The major axis 106 is the longest diameter; the minor axis 108 is the shortest diameter. The minor axis can be used like the long edge of FIG. 16, as a clue to the watermark orientation. That is, the minor axis, if extended, crosses the label side of the can from top-to-bottom (or bottom-to-top), as shown by line 110. The orientation of this line typically corresponds to the orientation of the watermark printed on the can's cylindrical surface.

Thus, a system according to this embodiment of the technology uses the orientation of line 110 in FIG. 18 like the orientation of line 98 in FIG. 16. For example, an image excerpt depicting the can is rotated to make this line 110 vertical, and watermark decoding is tried. If unsuccessful, the excerpt is rotated 180 degrees, and decoding is tried again. Again, a GPU implementation can be utilized, with the system ranking the two rotations in which line 110 is oriented most nearly vertically as the most likely contenders.

Often, as in FIG. 9, only a segment of an ellipse is visible to the camera. The system can analyze captured imagery to find segments of ellipses, e.g., using curve fitting techniques, or using a Hough transform. See, e.g., Yuen, et al, Ellipse Detection Using the Hough Transform, Proc. of the Fourth Alvey Vision Conf., 1988. Even from a segment, the direction of the minor axis can be estimated, and used as above.

One way of determining the minor axis of an ellipse, and thus of determining the up-down orientation of the cylindrical object (e.g., line 110 in FIG. 18), is to examine the curvature of the ellipse. Again, Hough or curve fitting techniques are used to identify an elliptical edge in an image excerpt. Consider FIG. 19, which shows an excerpt 118 of an ellipse—the remainder of the ellipse being occluded from the camera's view by other items on the conveyor. (Other parts of the captured imagery in which this excerpt is found are omitted for clarity.)

The minor axis of an ellipse passes through the point of minimum curvature on the elliptical edge. The curvatures at different points along this edge are determined by a curvature module, and the point 120 at which curvature is at a minimum is thereby identified. A tangent 122 to the curve at this point is identified by the curvature module. The minor axis of the ellipse lies along the perpendicular of this tangent, e.g., along line 124.

Sometimes, the point along an ellipse at which curvature is minimized is not depicted in the captured imagery (e.g., due to other objects blocking the camera's view). Even in such case, the "up-down" orientation of the cylinder can still be determined.

Figure 19:
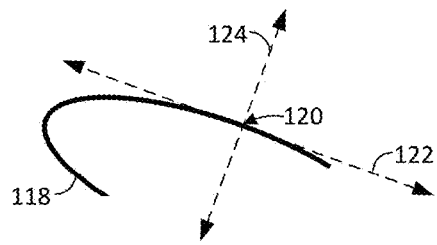
FIGS. 19 and 20 show how even parts of ellipses can be used as clues to watermark orientation.
Figure 20:
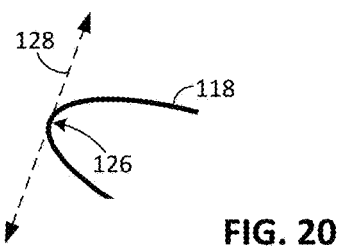

Consider FIG. 20, which shows the same ellipse 118 as FIG. 19, but more occluded. That is, the point of minimum curvature is not depicted.

In this case, the curvature module is used to detect the point of maximum curvature along the edge (i.e., point 126). The curvature module then determines a line 128 tangent to the edge at this point. The orientation of this line typically matches the "up-down" orientation of the digital watermark in the product label that adjoins the curve. As described above, the system rotates the image excerpt to re-orient line 128 vertically, and tries a watermark decoding operation. If unsuccessful, it rotates the image excerpt 180 degrees and tries again. Again, a GPU can perform a plurality of rotations of the imagery in parallel, and the system can consider certain of these in ranked order (i.e., giving first attention to those orientations at which line 128 is most nearly vertical).

Figure 21:
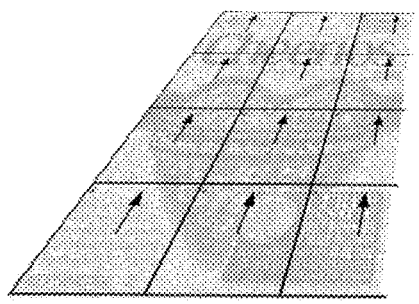
FIG. 21 shows perspective distortion of the cereal box artwork of FIG. 12.

Items imaged on the conveyor belt—regardless of their configuration (can or rectangular carton, etc.) commonly are depicted with perspective distortion. FIG. 21 illustrates how the face of the FIG. 12 cereal box, lying face-up on the conveyor belt, might be depicted in camera imagery. (The markings used to explain watermark tiling are again included in this depiction, but of course are not overtly visible in the camera imagery.)

To decode the watermark, it is helpful to first restore the depiction of the item to its proper aspect ratio.

One approach uses image segmentation to identify different items in the field of view. Most physical items are characterized by perpendicular edges (e.g., a cereal box is a rectangular cuboid; a can is a right cylinder). The edges discerned from the segmented imagery are examined to determine if any pair of edges is nearly parallel or nearly perpendicular (i.e., within, e.g., 20, 10 or 5 degrees or less). The physical edges to which these depictions correspond can be assumed to be truly parallel or perpendicular, with the angular variance in the depicted image due to perspective distortion. A corrective perspective transformation is then applied to restore these edges to parallel or perpendicular relationship.

While simple, this technique breaks down when the item does not have nearly straight edges (e.g., a bag of frozen peas), or if the items are arranged on the conveyor so that certain edges of an item are blocked from the camera's view.

Another approach simply characterizes the perspective distortion of the camera across its field of view, in a calibration operation—before use. This information is stored, and later recalled to correct imagery captured during use of the system.

One calibration technique places a known reference pattern (e.g., a substrate marked with a one-inch grid pattern) on the conveyor. This scene is photographed by the camera, and the resulting image is analyzed to discern the perspective distortion at each 2D location across the camera's field of view (e.g., for each pixel in the camera's sensor). The operation can be repeated, with the calibrated reference pattern positioned at successively elevated heights above the plane of the conveyor (e.g., at increments of one inch). Again, the resulting imagery is analyzed, and the results stored for later use.

In like fashion, a vertical gridded substrate can be placed perpendicularly across the conveyor. Imagery is captured and analyzed to discern perspective distortion in that plane. Again, the process can be repeated with the substrate moved to successive positions along the conveyor (e.g., at increments of one inch), to discern the apparent distortion of imagery captured at such planes.

Similarly, the gridded substrate can be placed longitudinally along the axis of the conveyor. Imagery can be captured and analyzed to discern apparent distortion of surfaces in that plane. Again, the substrate can be moved, and the operation repeated, at successive parallel planes.

When imagery is thereafter captured of items on the conveyor, this reference data can be consulted (and interpolated, e.g., for physical items presenting tilted surfaces) to discern the perspective distortion that influences each part of the captured imagery. Corrective counter-distortions are then applied before the imagery is passed to the identification module.

Correction of perspective distortion is a familiar exercise in image processing and photogrammetry. A variety of other techniques for image "rectification" are known in the art. (Many of the prior art techniques can be applied in simplified form, since the camera position and optics are typically fixed, so associated camera parameters can be determined and employed in the correction process.) If imagery from two different viewpoints is available, the stereo information provides still further opportunities for image correction.

Reference was made, above, to use of detected text as a way of discerning rotation-orientation, but it is also valuable as a metric of perspective distortion.

Most product labels use fonts in which vertical letter strokes are parallel. For example, in FIG. 29, the two vertical letter strokes in the letter "M" of "Mixed" are parallel. Put another way, most fonts have consistent letter widths, top to bottom. Again in FIG. 29, the letter "M" has the same width across its bottom as across its top. (So do the letters "x" and "u" etc.)

Similarly with most straight lines of text: the letters have consistent height. Most "tall" letters (t, k, l, etc.) and capital letters extend from the base text line to a first height, and any "short" letters (w, e, r, etc.) all extend to a second, lower, height. Lines along the tops and bottoms of the letters are generally parallel. (See lines "a," "b" and "c" in the first line of text in FIG. 29.)

Divergence from these norms is useful as a measure of perspective distortion. When detected by a corresponding detection module, a corrective image distortion is applied to restore the lines to parallel, and to restore the widths of letters to consistent values—top to bottom. Watermark detection is then applied to the correctively-distorted image.

Figure 30:
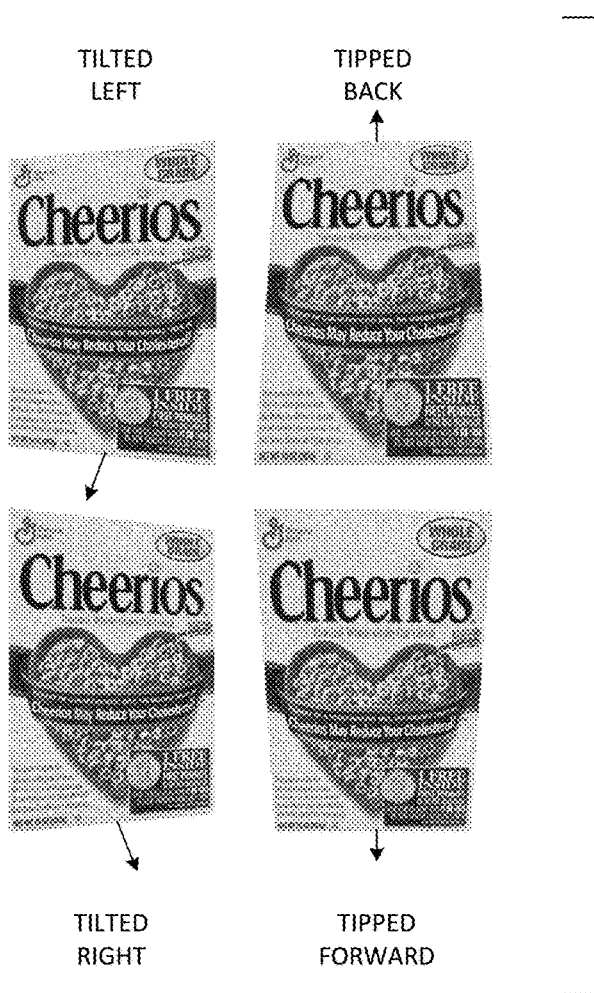
FIG. 30 shows two perpendicular dimensions of perspective distortion: tilt and tip.

FIG. 30 shows that perspective warps can arise in two perpendicular dimensions, here termed "tilt" and "tip."

"Tilt" refers to a surface orientation that is inclined in a horizontal direction, to the right or to the left, from a straight-on, plan, view. Tilted-left refers to an orientation in which the left edge of the surface is at a greater focal distance from the camera than the center of the object. "Tip" refers to a surface orientation that is inclined in a vertical direction. Tipped back refers to an orientation in which the top edge of the surface is at a greater focal distance from the camera than the center of the object.

FIG. 30 also shows small arrows that are intended to indicate directions of surface-normals from the depicted cereal box. In the tilted-left case, the surface normal is inclined to the left—as seen by the camera. In the tipped-back case, the surface normal is inclined upwardly, as seen by the camera.

Figure 29:
FIG. 29 shows product packaging, demonstrating how lines of text can be used to assess perspective distortion.

A gross sense of perspective can be obtained by reference to techniques noted herein, such as the text lines of FIG. 29. If the lines converge as they move to the right, the right part of the label must be further from the camera, indicating a tilted-right pose.

Another gross sense of perspective can be obtained from the scale of the watermark tile. Referring again to FIG. 21, if the watermark tiles are smaller in scale towards the top of the object, this indicates the top of the object is more distant, i.e., a tipped-back pose. Other tip- and tilt-states are similarly indicated by different scales of the depicted tiles. (The scale of the preferred watermark tile is readily revealed from a log-polar plot of the embedded calibration signal, as detailed in U.S. Pat. No. 6,590,996.)

As indicated, if the orientation of the surface is accurately discerned (e.g., by analyzing two frames of imagery showing different viewpoints, and considering positions of keypoints in each), imagery can be distorted so as to accurately counter-act the apparent distortion—restoring it to a plan presentation. Object identification can then proceed on the basis of the corrected imagery.

If, instead of accurate orientation information, the system only has gross orientation information (e.g., tilted left, or tipped back, such as from fast analysis of letter shape or non-parallel lines), different counter-distortions can be tried. For example, if the object appears to be tipped back, but the amount of tip is uncertain, then the object identification module can first try to extract a watermark from the captured imagery without any correction. If unsuccessful, an image processing module can counter-distort the image to impose a perspective as if the image focal plane is tipped-forward 20 degrees (i.e., countering the tipped-back apparent presentation). The object identification module again tries to extract a watermark. If unsuccessful, a further corrective counter-distortion is applied, e.g., processing the original image to impose a perspective as if tipped-forward 30 degrees. The object identification module again tries to extract a watermark. If unsuccessful, a still further corrective warp is applied (e.g., imposing a perspective as if the focal plane is tipped forward 36 degrees). Etc.

Again, a GPU is well suited for such tasks—allowing the just-detailed sequence of attempts to be performed in parallel, rather than serially.

In the case of cylindrical objects, correction of cylindrical warping may be employed, to account for the apparent spatial compression of the packaging artwork as the curved surface recedes from view. (This correction can be applied separately from perspective correction, or as part of a combined operation.)

Figure 22:
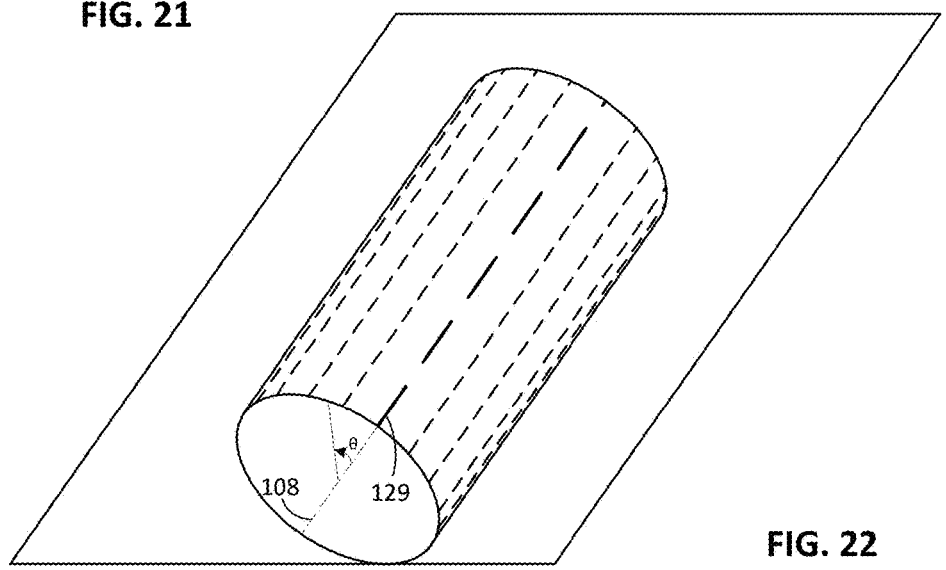
FIG. 22 is an isometric image depicting a cylinder (e.g., a can) on a conveyor.

Ignoring perspective, FIG. 22 shows an isometric view of a cylindrical object, viewed obliquely. Cylindrical distortion is at its maximum where the cylindrical surface curves out of view. It is at its minimum along a center line parallel to the cylinder axis, along the part of the surface closest to the camera. (This is the same line defined by extension of the minor axis 108 of the ellipse, discussed with FIG. 18.) If the cylinder is fully visible (i.e., it is not occluded by another item), this line of minimum cylindrical distortion bi-sects the visible cylindrical face, as shown by the dark, long-dashed line 129 of FIG. 22. The other dashed lines—closer to the edges—are in regions of progressively more spatial compression, causing the lines to appear closer together. (The dashed lines in FIG. 22 are at 20 degree spacings around the cylinder.)

Figure 23:
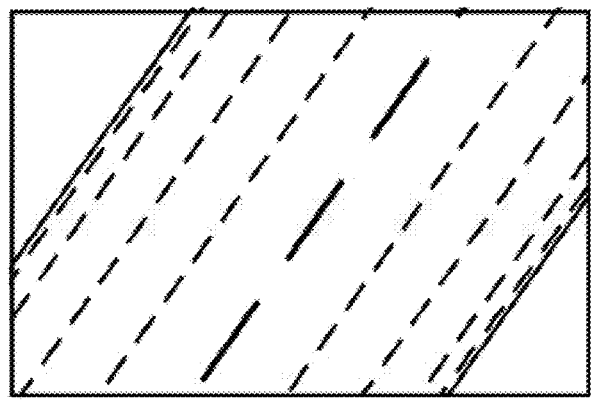
FIG. 23 is an enlarged detail of FIG. 22.

FIG. 23 shows an excerpt of FIG. 22, as might be passed to an object recognition module. The cylindrical item is first segmented from the background. Its up-down axis is next assessed, by reference to text, edges, ellipse features, or otherwise. The image excerpt is then rotated based on the assessed orientation information, yielding FIG. 24.

A cylindrical warp correction is next applied, counteracting the compression near the edges by applying a compensating horizontal expansion. Since the image excerpt spans the full width of the cylinder, and its boundaries were detected by the image segmentation (shown as the solid lines), a straightforward trigonometric correction function is applied.

In particular, if the distance from center line to the edge is a distance "x," then any intermediate distance "y" from the center line corresponds to an curvature angle theta ($\theta$)—from the cylinder's apparent center line—of arcsin (y/x). The horizontal scaling factor to be applied at this distance from the center line is $1/\cos(\theta)$.

Figure 24:
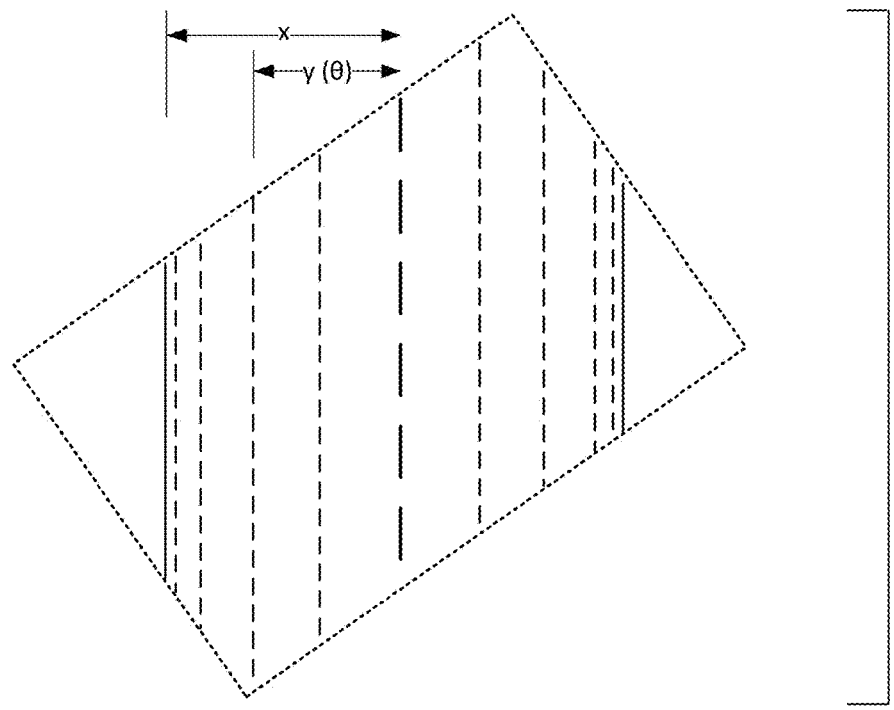
FIG. 24 shows the imagery of FIG. 23, with the axis of the can label reoriented to vertical.
Figure 25:
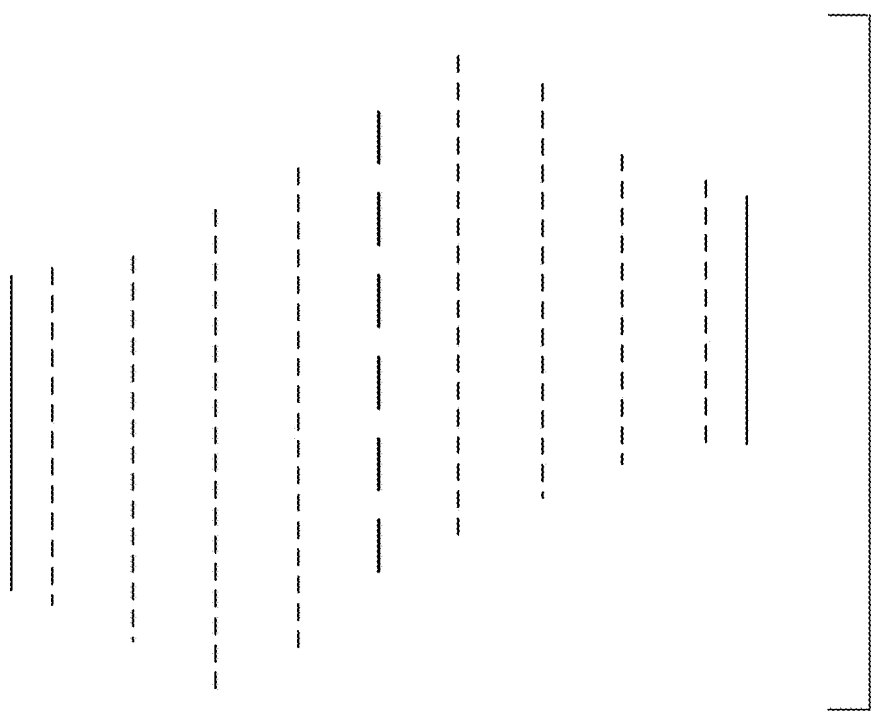
FIG. 25 shows the imagery of FIG. 24, processed to invert the apparent compression of the label artwork near the edges of the cylindrical can.

By such procedure, the FIG. 24 image is horizontally warped to yield a curvature-compensated FIG. 25. (The outline is no longer shown, as it is a curved shape that is difficult to reproduce. The image data would typically encompass the full visible surface of the cylinder, segmented from the camera's view of the conveyor, as opposed to the rectangular excerpt illustrated.) It will be recognized that the dashed lines—at uniform angular spacings of 20 degrees, are now at uniform spatial distances in this 2D representation. Thus, it is as if any label were removed from the cylindrical item, and viewed straight-on.

The compensated image data of FIG. 25 is then processed to yield object identification (e.g., by a watermark decoding module, etc.).

Figure 26:
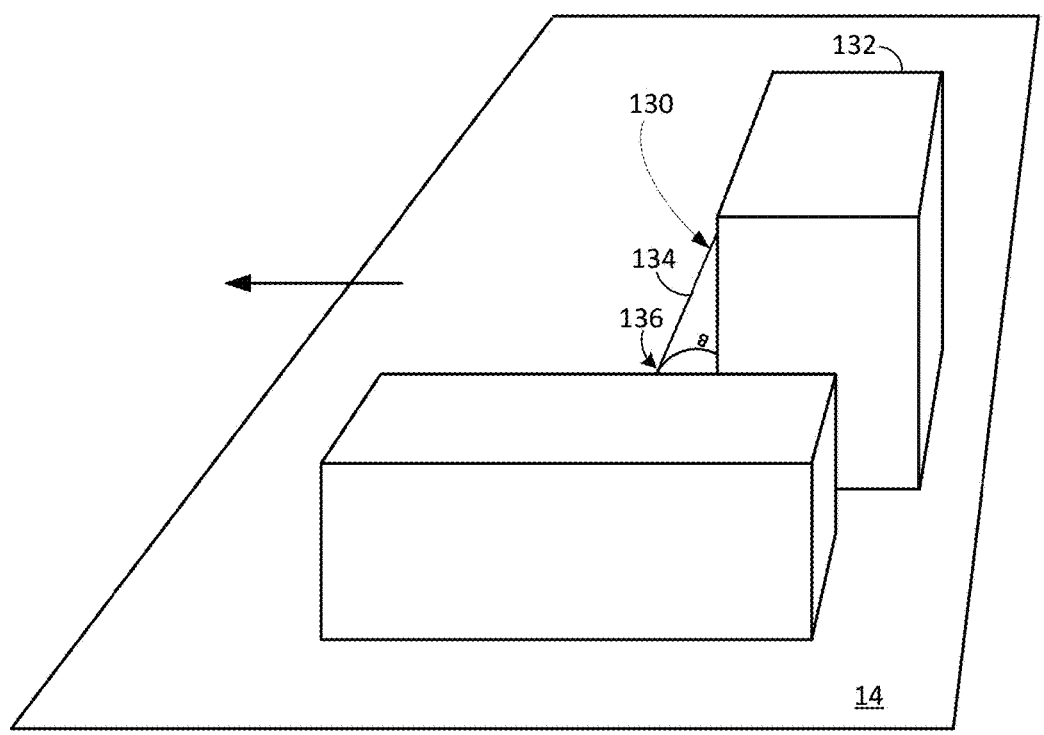
FIG. 26 is a view like FIG. 9, but the conveyor is oriented in a different direction, and the objects include a cylindrical article partially obscured by other items.

The case just-described, in which the cylindrical object is fully-viewable, and its side edges are unambiguous, is straightforward. More challenging are instances where these criteria are not met. FIG. 26 is an example.

In this captured image, much of the cylinder 130—including the entirety of one side edge, and part of the other—are occluded by item 132. Part of one side edge 134 is visible. While this edge line might be due to other features of the imagery, it is most likely the edge of cylindrical object, because the edge detector module finds a point of intersection 136 between this edge 134 and an elliptical curve 138 in the imagery.

Figure 27:
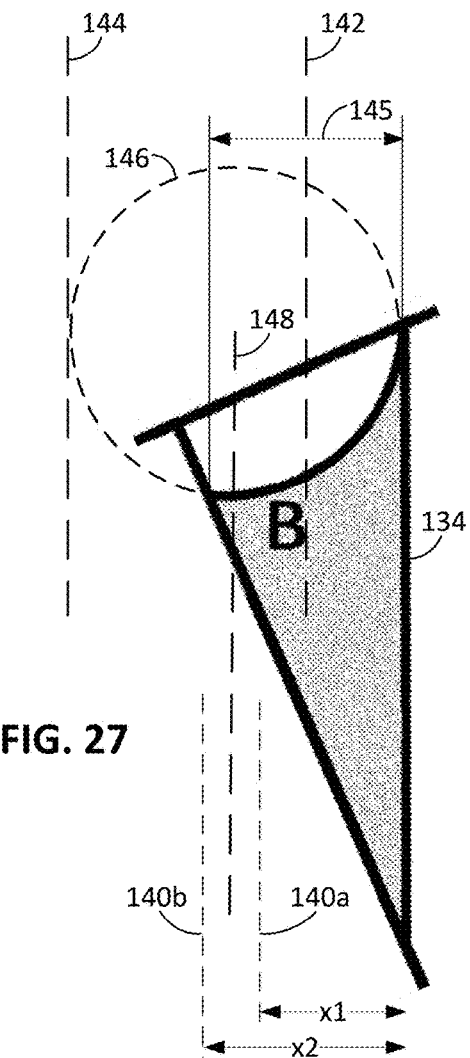
FIG. 27 illustrates the geometry used in "unrolling" the cylindrical artwork on a can, when an edge of the can is discernible.

As described above, e.g., in connection with FIGS. 13-20, the cylindrical surface is segmented from the imagery, and rotated to a likely up-down orientation, as shown in FIG. 27. (This rotation can be based, e.g., on lettering on the cylinder, or the ellipse section 138.) The position of the edge 134 is known, but the position of the center line of minimum distortion (corresponding to the long-dash line 129 of FIG. 24) is uncertain. Is the center line a line 140*a* that is distance x1 from the edge, or a line 140*b* that is a distance x2 from the edge, or some other line?

An exhaustive search is performed, e.g., at least partly employing a GPU—assuming different locations for the center line, performing the cylindrical compensation corresponding to that assumed center line, and then attempting to perform an item identification (e.g., by watermark decoding). At some assumed value of "x," the compensation yields an item identification.

The exhaustive search is not unbounded. The system knows that the center line cannot be to the right of line 142, nor to the left of line 144. It can't be right of line 142 because this is the mid-point of the exposed width 145 of the cylinder face, and the occluded portion of the cylinder is to the left. It can't be to the left of line 144, because the system curve-fits an ellipse 146 to the segment of the ellipse revealed in the imagery, and the center line cannot be to the left of this ellipse. (Indeed, it should be well to the right from line 144.)

The search may preferably start with an assumed center line based on the fitted ellipse 146, e.g., mid-way across its width—as shown in by line 148. The system then iterates from that starting point—trying lines at increasing distances either side of the assumed center line 148, in an attempt to extract an item identifier.

(A still simpler approach is to extend the minor axis of the fitted ellipse 146, and use this as the starting point for the center line. Such approach does not work in FIG. 27 because the view in FIG. 26 on which FIG. 27 is based uses only one-point perspective, rather than two, so the elliptical face of the cylinder is not accurately presented: it is presented as a section of a circle.)

Figure 28:
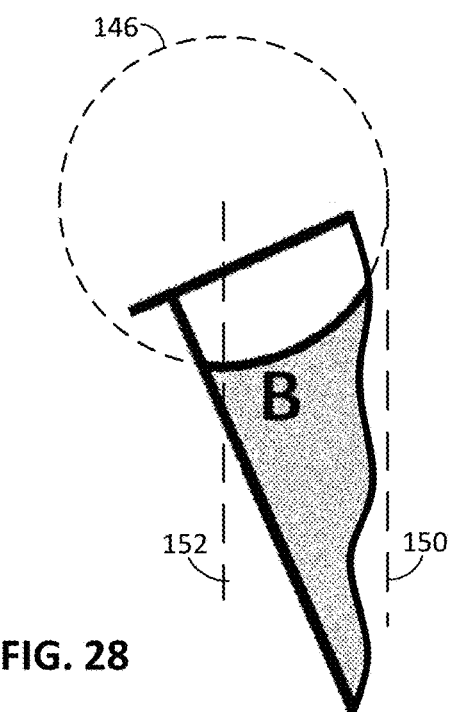
FIG. 28 is like FIG. 27, but for where the edge of the can is not discernible.

FIG. 28 shows a still more challenging scenario, in which the single edge boundary 134 of FIG. 27 is also occluded. Lettering detected on the item has been used to orient the segmented excerpt to an approximate up-down orientation.

In this case, a two-dimensional exhaustive search is done—varying both the assumed location of the edge of the cylinder, and also its assumed center line. That is, the system searches across different curvature states (one metric is the cylinder's radius of curvature, x), and cylinder locations (one metric is the location of the cylinder axis, as viewed from the camera).

Again, since part of the elliptical edge defined by the top of the item is detectable, the system fits an ellipse 146 to this edge, which helps bound the location of the partially-occluded cylindrical surface. In particular, the system starts by assuming that the boundary edge of the cylindrical surface is on line 150—dropped from the edge of the fitted-ellipse nearest the segmented imagery. It further assumes that the center line of the cylindrical surface is on line 152—dropped from the center of the ellipse. Both are then alternately iterated from these starting positions.

As before, for each trial location of the boundary and center lines, the system applies a corresponding corrective warp to "flatten" the presumed cylinder, and then attempts object recognition using the compensated image excerpt.

At some limiting point in the iteration, if object identification has not succeeded, the attempt terminates.

It will be recognized that multiple attempts may be required to extract an identifier (e.g., a watermark) from a partially-revealed cylindrical surface. For example, the estimated up-down orientation may need to be iterated. So, too, the assumed locations of the center line of the curved surface, and an edge location. If perspective is not calibrated in advance, then this too may be iterated. Fortunately, given the capability of multi-core devices, such processing can be effected within the typical time constraints of checkout systems.

Moreover, most item recognition technologies are robust to certain image distortions. For example, watermarks are commonly decoded at 50-200% of original scale, and with 15 degrees or more of perspective distortion. And some watermarks are fully robust to all rotation angles (although detection shortcuts may be implemented if the detector needn't consider all possible rotations). Still further, a complete watermark payload can be extracted from a single tile of watermarked artwork, so in the case of cylindrical objects, a small fraction of whatever surface is exposed will often suffice for decoding. (Barcodes do not have this latter advantage; the barcoded portion must be on the exposed surface. However, barcodes are similarly robust to rotation and scale, and presently are more robust to perspective.)

Due to the decoding latitude afforded by such robustness, the iterative increments in the described embodiments can be relatively large. For example, in FIG. 28, the positions of lines 150 and 152 may be moved laterally a distance equal to 20% of their spacing as an iterative step.

Some implementations may disregard cylindrical distortion, recognizing that a complete watermark tile is less than two inches across, and the side surface of the can closest to the camera may present an axially-oriented strip of label at least two inches in width. Although curved, the cylindrical distortion of this strip is relatively small. Such implementations may prefer to apply the thereby-saved processor effort to address perspective distortion, instead.

It will be understood that techniques like those detailed above can also be adapted for application to item shapes other than cylindrical.

If a conveyor is not present, and the objects are positioned before a camera system by hand, the system can compile a history (histogram) about the pose at which items are most commonly positioned for reading. That is, each time an object is successfully identified (by whatever technology), the system records information about the 3D orientation at which the object was presented to the checkout station (and, optionally, the path along which it traveled). The data may be collected on a per-cashier basis (or per-customer, for self-serve checkouts), to account for the different habits of different users. (Cashiers typically "sign-in" to POS systems, e.g., entering an employee ID and password on a keypad or similar device. Customers may identify themselves by loyalty card.) Once historical object-presentation data has been collected, it can be used to optimize the system's decoding procedure.

For example, if cashier A usually presents items to a camera system tipped-back and tilted-left, the system can apply corrective corresponding counter-distortions to the captured imagery—perhaps without even analyzing the captured imagery to estimate pose. If the cashier's next-most-common presentation is tipped-back and tilted-right, then a compensation adapted to this presentation can be tried if the first-compensated image fails to yield an object recognition.

Conversely, if cashier B usually presents items tipped-forward and tilted left, then a different, corresponding, correction can be applied to images captured at that cashier's station, etc.

The same techniques can be applied to conveyor-based systems. Over time, the system may discern the "canonical" way that objects are placed on the conveyor. Image processing can account for such typical placements by tailoring the order that different identification techniques are applied.

Different objects may be habitually presented, or placed (on a conveyor), differently. After an object has been identified, its presentation/placement data can be stored in association with the object ID and other identifying information, to compile a rich source of characteristic presentation information on a per-item-type basis.

Cashier A may most commonly present cereal boxes tipped-back and tilted left, but may present 12-packs of soft drinks tipped-forward. The system can acquire certain identification information (e.g., straight-edges or curvilinear shape, color histogram, temperature, weight, etc.) from sensors, and use this information to determine the most common presentation pose of objects having such attributes, and apply different image distortions or other identification techniques accordingly based on such sensor data.

As before, a GPU can effect multiple such image counter-distortions in parallel. When cashier A is using the system, the GPU may effect a different collection of image counter-distortions than when cashier B is using the system.

In some ways, it is easier to perform product identification on conveyor-based systems than hand-scanning systems. This is because the orientation of the products typically is constrained, in some fashion, by the conveyor—easing the recognition task. For example, a can nearly always rests on one of its two flat ends or—less likely—is positioned on its side, with its cylindrical axis parallel to the conveyor plane. This substantially limits the universe of camera views that might be encountered. Similarly, boxed-goods are regularly positioned with a planar surface facing down. This causes the adjoining four surfaces to all extend vertically, and the top surface to be disposed in a plane parallel to the conveyor. Again, this confines the range of poses that may be expected. (These are examples of the canonical poses referenced earlier.) In like fashion, a conveyor imparts common, straight-line, movement to all objects resting on it.

This makes the computational task of discerning surface orientations easier, since feature points recognized from two images—captured by a single camera at two different instants—have all moved the same distance in the same direction. (If one point moves 100 pixels, and a second point moves 50 pixels, then the second point is more remote than the first, etc.)

The difficulty of conveyor-based systems is that the camera's view of one product may be occluded by another. In contrast, hand-scanning systems typically present a single item at a time to the camera.

While the foregoing description focused on watermark decoding, it will be recognized that object identification by pattern recognition (e.g., fingerprinting, product configuration, etc.) is also simplified by understanding the rotational and perspective state of the object depiction, from a normal, or reference, presentation. Thus, for example, with SURF fingerprint-based recognition, the discerned feature points in a camera image may more quickly be matched with corresponding points in a reference image if the object depiction in the camera image is transformed to correspond to that in the reference imagery.

In some embodiments, rotational orientation is not important. For example, the watermarking arrangement detailed in Digimarc's U.S. Pat. No. 6,590,996 is fully robust to rotation. In such embodiments, computational effort is better focused on determining the inclination of the object surface, and perspective distortion.

In some embodiments, information determined through one recognition technology is useful to another. For example, by color histogram analysis, the system may make a tentative identification of an item as, e.g., a six-pack of Coke. With this tentative identification, the system can obtain—from the database—information about the configuration of such product, and can use this information to discern the pose or orientation of the product as depicted in the camera imagery. This pose information may then be passed to a digital watermark decoding module. Such information allows the watermark decoding module to shortcut its work (which typically involves making its own estimation of spatial pose).

In another example, image fingerprinting may indicate that an item is likely one that conveys a digital watermark on its packaging. The image fingerprinting may also provide information about the item's affine representation within the captured imagery. The system may then determine that if the image is rotated clockwise 67 degrees, the watermark will be easier to read (e.g., because it is then restored to its originally encoded orientation). The system performs a virtual 67 degree rotation of the imagery, and then passes it to a watermark decoding module.

Watermark indicia—like barcode indicia—cannot be decoded properly if they are depicted at too great an angular skew. In accordance with another aspect of the present technology, products for sale in a retail store are watermarked with multiple watermarks—pre-distorted to aid off-axis reading. In an exemplary arrangement, the watermark pattern (e.g., a watermark tile, as detailed in U.S. Pat. No. 6,590,996) is affine-distorted eight different ways (horizontally/vertically). The eight affine-transformed tiles are summed with the original tile, and this composite pattern is applied to the product or its packaging. The following Table I shows the nine component watermark tiles:

TABLE I

| 1 | Original watermark tile |
| 2 | Original tile, affine-transformed 30 degrees to right |
| 3 | Original tile, affine-transformed 30 degrees to right, and 30 degrees upwardly |
| 4 | Original tile, affine-transformed 30 degrees upwardly |
| 5 | Original tile, affine-transformed 30 degrees to left, and 30 degrees upwardly |
| 6 | Original tile, affine-transformed 30 degrees to left |
| 7 | Original tile, affine-transformed 30 degrees to left, and 30 degrees downwardly |
| 8 | Original tile, affine-transformed 30 degrees downwardly |
| 9 | Original tile, affine-transformed 30 degrees to right, and 30 degrees downwardly |

If a product surface bearing this watermark pattern is tilted up, away from the camera by 45 degrees, component tile #8 in the above list still will be readily readable. That is, the 45 degrees of upward physical tilt, counteracts the 30 degrees of downward affine transformation of tile #8, to yield a net apparent upward skew of 15 degrees—well within the reading range of watermark decoders.

(In a variant embodiment, the composite watermark tile additionally or alternatively includes component tiles of different watermark scales. Similarly, the composite watermark tile can include component tiles that have been warped in non-planar fashion. For example, different curvilinear warps can be used in anticipation of sensing watermarks from curved surfaces, such as canned goods, viewed from different perspectives. In some embodiments, different watermark patterns may be applied in tiled fashion, e.g., one normal, an adjoining tile distorted to "tilt left," another adjoining one distorted to "tilt right," etc.)

In existing checkout stations, spinning mirrors are sometimes used to effect physical scanning of laser beams across product packaging. In accordance with a further aspect of the present technology, moving mirrors are used with camera systems to introduce different distortions (e.g., perspective distortions) in imagery provided to product identification modules.

For example, a camera may face a segmented cylinder having nine different mirrored surfaces. The cylinder may be turned by a stepper motor to successively present different of the mirrors to the camera. Each mirror reflects a differently-warped view of checkout items to a camera. These different warps may be, e.g., the nine different transformations detailed in Table I. For one frame capture, the cylinder presents an unwarped view of the imagery to the camera. For a next frame capture, the cylinder presents a view of the imagery as if skewed 30 degrees to the right, etc. The resulting sequence of frames can be provided, e.g., to a watermark decoder or other product identification module, for generation of product identification information.

In a related embodiment, moving mirrors serve to extend a camera's field of view—presenting scenes to the camera sensor that are otherwise outside the field of view of the camera lens.

Another useful approach to identifying unknown objects (e.g., reading watermarks from surfaces of unknown shape) is akin to a Taylor series expansion. First, assume the object is planar and squarely facing the camera. Try reading the watermark. If unsuccessful, use available data to make a best guess as to a planar slope term (e.g., tip and tilt). Apply a corrective counter-distortion based on the guessed surface slope term, and try reading the watermark. If unsuccessful, use available data to make a further refinement to the guess—adding a simple curvature term. Apply a corrective counter-distortion that is also based on the guessed curvature, and try reading the watermark. This process continues, each time further refining an estimate about the surface configuration, and each time trying to decode the watermark based on such estimate. Continue this procedure until time allocated to the task runs out, or until all available data useful in estimating product configuration has been applied. (Even in this latter case, "blind" attempts at image distortions that might allow watermark decoding may still be tried.)

Reference has been made to certain digital watermark indicia spanning a substantial portion of the packaging. This means at least 25% of the exposed surface area of the packaging. Increased performance can be achieved by increasing the coverage, e.g., to more than 50%, 75%, 90%, or 95%, of the exposed area—in some instances reaching 100% coverage.

While reference was made to processing imagery to counteract certain apparent distortions, this operation need not be done in the spatial (pixel) domain. Instead, the imagery may first be transformed into a complementary domain (e.g., the spatial frequency domain, or FFT domain). The desired counter-distortion can then be applied in this complementary domain.

Such arrangement is particularly favored in watermark-based object identification systems, because watermark decoding commonly operates on spatial-frequency domain data. The imagery can be FFT-transformed once, and then a variety of different distortions can be applied (e.g., by GPU), and each resulting set of data can be provided to a watermark detector. This is computationally easier than applying a variety of different distortions (e.g., by GPU) in the pixel domain, and then having to perform FFTs on each of the differently-distorted image sets, to perform similar watermark decoding.

While certain embodiments made use of image frames oriented at regular 15 degree increments, this is not essential. One alternative embodiment uses one frame parallel to the camera, four frames that are angled at least 20 degrees away from the first frame (e.g., two at +/−25 degrees in a horizontal direction, and two more at +/−25 degrees in a vertical direction), and four more frames that that are angled at least 50 degrees away from the first frame (e.g., two at +/−55 degrees horizontally, and two at +/−55 degrees vertically). This set of nine image frames provides a good diversity of item views, allowing simple watermark and barcode decoders to reliably decode indicia from most surfaces viewable from a camera—regardless of the surfaces' orientations.

Volumetric Modeling, Etc.

A further aspect of the present technology concerns identification of items, e.g., piled at a retail checkout.

Figure 31:
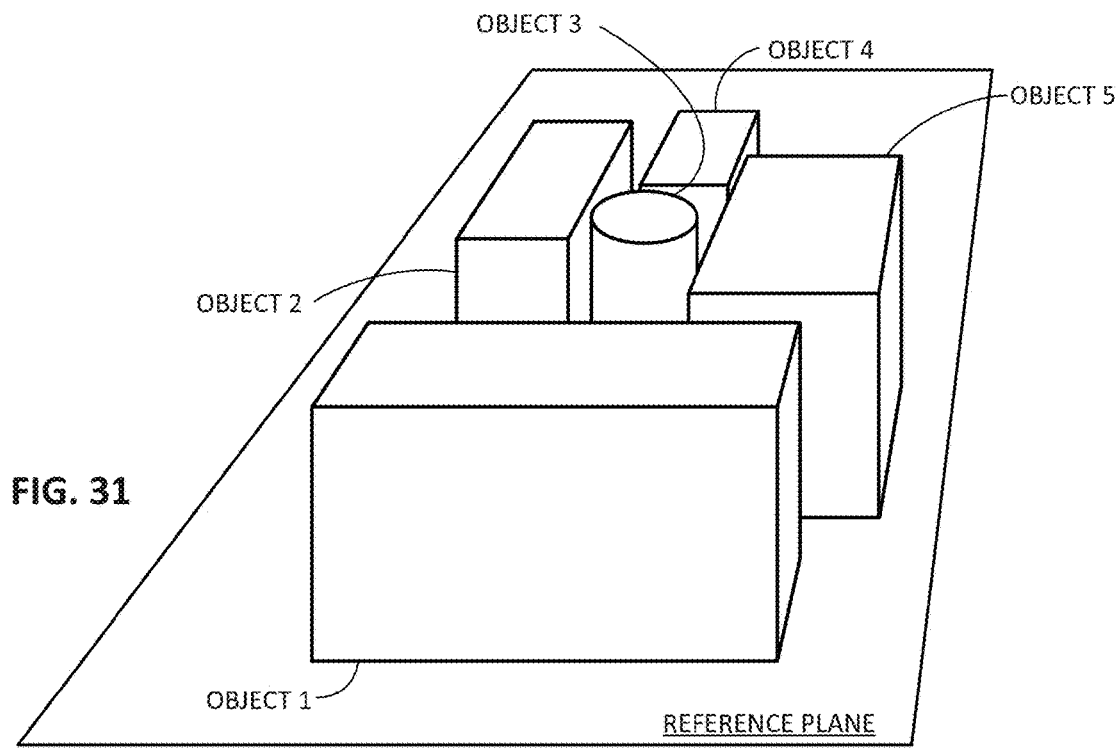
FIGS. 31, 31A, and 32-39B illustrate certain other aspects of the detailed technology.

Such an arrangement starts with 3D information about the assembled merchandise piled at the checkout. This 3D data set can be generated using any of the techniques identified elsewhere herein, including stereoscopic imaging, single camera imaging in conjunction with a moving belt, Kinect sensor, time of flight camera, etc. FIG. 31 shows an illustrative 3D image—showing what seem to be five objects on a conveyor belt.

This 3D information is processed to define plural component object volumes.

The science of reconstructing object volumes from imagery is an old one (e.g., Guzman, "Decomposition of a Visual Scene into Three-Dimensional Bodies," in *Automatic Interpretation and Classification of Images*, Academic Press, 1969). One of the landmarks in the field is Clowes, On Seeing Things, Artificial Intelligence, 2:79-116 (1971).

This earlier work was followed—largely at the MIT Artificial Intelligence Lab—by Waltz, Hoffman and others, who further refined algorithms for discerning component solid shapes based on information derived from imagery. Waltz, in particular, is known for his work on examining local properties in images (visible vertices and edges), and combining this information with geometrical rules to identify what polyhedra are depicted. His use of constraint propagation overcame combinatorial explosion problems to which certain earlier analytic methods were prone.

This volumetric object recognition research has been widely deployed in robotic "pick and place" applications. ("Bin picking" is a common task in which a robot images known 3D shapes that are randomly distributed in a bin. The robot processes the imagery to identify a desired one of the shapes, and then manipulates an arm to remove the item from the bin and place it at a desired location.)

While most such techniques rely on edge-derived geometries, some subsequent technologies shifted to analysis of point clouds (e.g., from range images or depth maps), to identify component shapes based on identification of surfaces. The recent commodification of ranging sensors (e.g., the Kinect sensor, and time of flight cameras) makes such approaches attractive for some implementations.

Additionally, a great deal of practical work has been done to reconstruct 3D building geometries from aerial cityscape images. That application is closely related to the retail checkout context, but on a different scale.

A few of the many writings detailing the foregoing include:

Brady, Computational Approaches to Image Understanding, MIT AI Lab, Memo 653, 1981;
Braun, Models for Photogrammetric Building Reconstruction, Computers & Graphics, Vol19, No 1, January-February 1995, pp. 109-118;
Dowson et al, Shadows and Cracks, MIT AI Lab, Vision Group, June, 1971;
Dowson, What Corners Look Like, MIT AI Lab, Vision Group, June, 1971;
Fischer, Extracting Buildings from Aerial Images using Hierarchical Aggregation in 2D and 3D, Computer Vision and Image Understanding, Vol. 72, No 2, November 1998, pp. 185-203;
Haala et al, An Update on Automatic 3D Building Reconstruction, ISPRS Journal of Photogrammetry and Remote Sensing 65, 2010, pp. 570-580;
*Handbook of Mathematical Models in Computer Vision*, N. Paragios ed., Springer, 2006;
Hoffman et al, Parts of Recognition, MIT AI Lab, AI Memo 732, December, 1983;
Mackworth, Interpreting Pictures of Polyhedral Scenes, Artificial Intelligence, Vol. 4, No 2, 1973, pp. 121-137;
Mundy, Object Recognition in the Geometric Era—a Retrospective, Lecture Notes in Computer Science, Volume 4170, 2006, pp. 3-28;
Shapira et al, Reconstruction of Curved-Surface Bodies from a Set of Imperfect Projections, Defense Technical Information Center, 1977;
Waltz, Understanding Scenes with Shadows, MIT AI Lab, Vision Group, November, 1971; and
Zhao, Machine Recognition as Representation and Search, MIT AI Lab, AI Memo 1189, December, 1989.

The artisan is presumed to be familiar with the above-reviewed prior art, so it is not further detailed here.

Any of these prior art methods can be employed in the present application. However, for the sake of expository clarity, the technology is described with reference to a simple set of geometrical rules applied to edges.

Such a process begins by identifying straight and elliptical contours (edges), and associated vertices. Known edge-finding techniques can be used. Regions (surfaces) bounded by these edges are typically regarded as object faces.

Edge finding techniques based on Canny's algorithm are commonly employed. (See, e.g., Canny, A Computational Approach to Edge Detection, IEEE Trans. Pattern Analysis and Machine Intelligence, Vol. 8, 1986, pp. 679-714.) Canny edge finders are implemented in the popular OpenCV software library, e.g., version 2.4, which also includes a multitude of other useful tools, such as corner detectors, robust local feature detectors, ellipse-finders, etc.

Figure 31A:
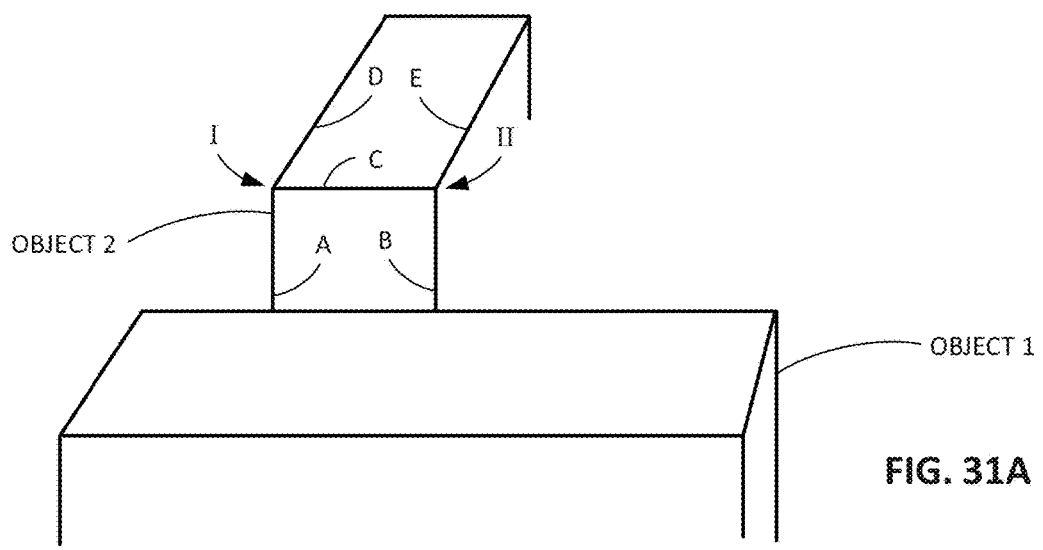

Geometrical rules are applied to identify faces that form part of the same object. For example, as shown in FIG. 31A, if edges A and B are parallel, and terminate at opposite end vertices (I, II) of an edge C—at which vertices parallel edges D and E also terminate, then the region between edges A and B is assumed to be a surface face that forms part of the same object as the region (surface face) between edges D and E.

Other rules are applied to discern locations of occluded features. For example, an edge that extends vertically downward, but that is interrupted (occluded) by an edge of a surface of a different object, is assumed to extend down to a common reference plane (i.e., the plane of the checkout stand), on which the objects are assumed to rest. (See, e.g., lines A and B in FIG. 31A.) Such rules typically have exceptions. For example, some rules take precedence over others.

Figure 32:
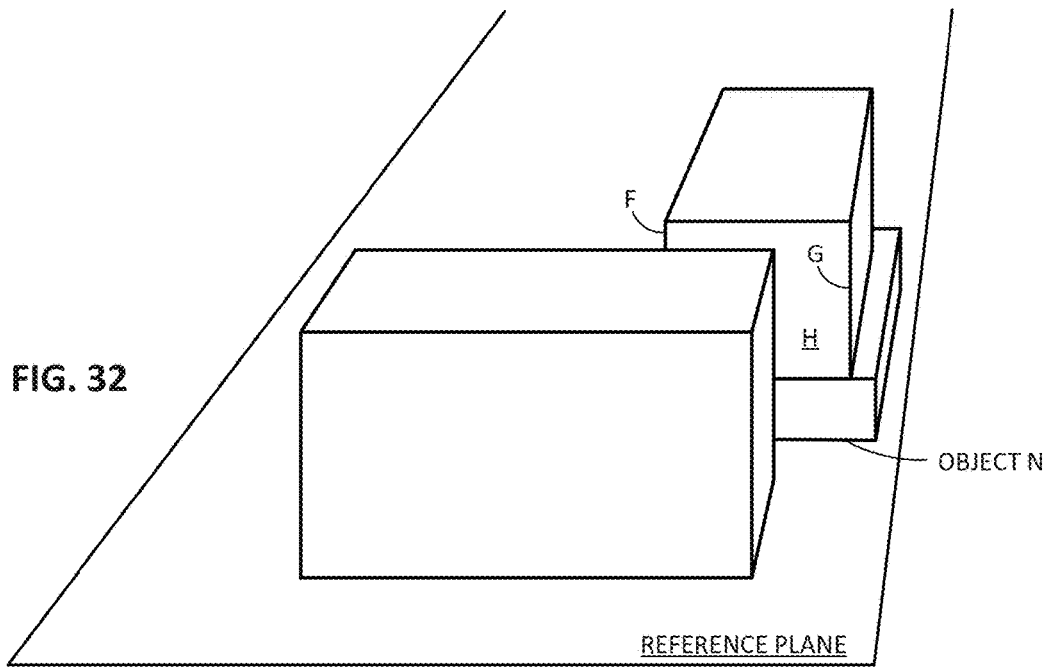

Consider edge F in FIG. 32. Normal application of the just-stated rule would indicate that edge F extends all the way to the reference plane. However, a contrary clue is provided by parallel edge G that bounds the same object face (H). Edge G does not extend all the way to the reference plane; it terminates at the top plane of "Object N." This indicates that edge F similarly does not extend all the way to the reference plane, but instead terminates at the top plane of "Object N." This rule may be stated as: parallel edges originating from end vertices of an edge ("twin edges") are assumed to have the same length. That is, if the full length of one edge is known, a partially-occluded twin edge is deduced to have the same length.

Figure 33:
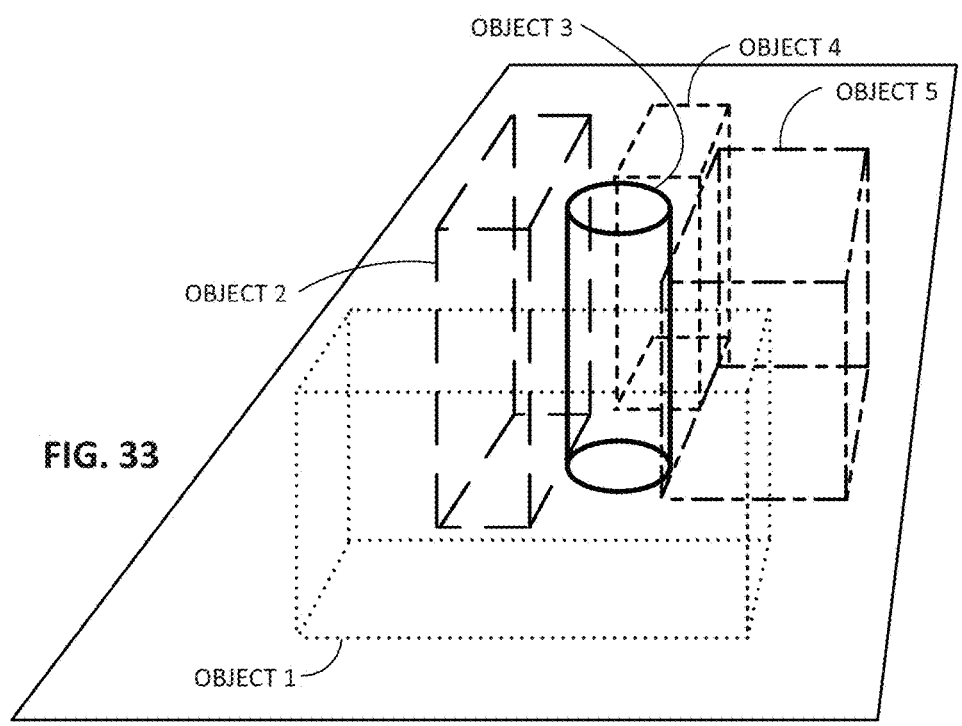

Application of the above procedure to the 3D arrangement of FIG. 31 results in a segmented 3D model, such as is represented by FIG. 33. Each object is represented by data stored in memory indicating, e.g., its shape, size, orientation, and position. An object's shape can be indicated by data indicating whether the object is a cylinder, a rectangular hexahedron, etc. The object's size measurements depend on the shape. The size of a right cylinder, for example, can be characterized by its diameter and its length. Orientation can be defined—for a cylinder—by the orientation of its principal axis (in the three-dimensional coordinate system in which the model is defined). For a regular hexahedron, orientation can be defined by the orientation of its longest axis. The position of the object can be identified by the location of an object keypoint. For a cylinder, the keypoint can be the center of the circular face that is nearest the origin of the coordinate system. For a hexahedron, the keypoint can be the corner of the object closest to the origin.

Comparison of the 3D image of FIG. 31 to the segmented model shown in FIG. 33 shows that the model has extrapolated structure that is unseen in the image. For example, while FIG. 31 reveals that Object 3 is a cylindrical object, only a fraction of the object is actually shown; the rest of the object is occluded by other shapes.

FIG. 33 has extrapolated the shape of Object 3 as being a cylinder with a length-to-diameter ratio of about 2.7. (This roughly corresponds to the shape of a Pringles brand potato chip can.) But this shape is supposition. The only information that is known, for a fact, is the information captured by the sensor system and revealed in FIG. 31, i.e., that the length-to-diameter ratio of Object 3 is 1.0 or greater. A shorter cylinder, such as a Campbell's soup can, also meets this description.

(Using known photogrammetry principles, dimensional data can be extracted from imagery captured under controlled/calibrated conditions. A supermarket checkout is such a controlled environment. In the FIG. 31 case, Object 3 may be determined to have a diameter of 3 inches, and its top surface (together with that of Object 4) may be found to be about 8 inches above the reference plane.

Figure 34:
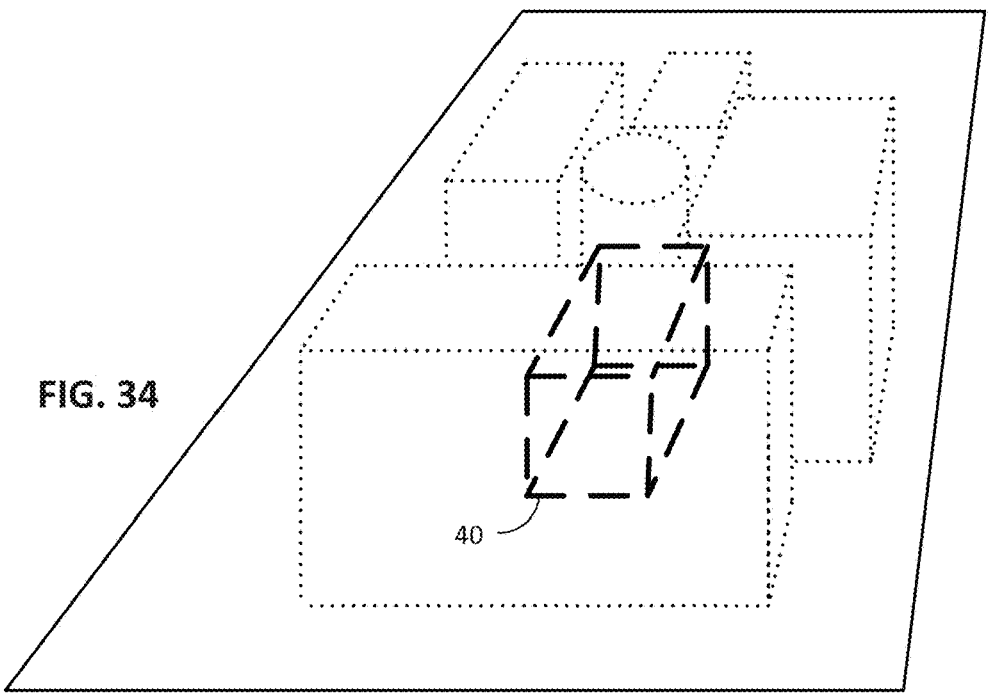

In accordance with another aspect of the present technology, the uncertainty between what is known and what is extrapolated (assumed/supposed) is identified. In one particular implementation, this uncertainty is communicated to a human operator, or to another element of the data processing system. FIG. 34 shows one such manner of communication to a human operator, i.e., a graphical depiction of the pile of merchandise, with a zone of high uncertainty 40 highlighted on a display screen (e.g., by color, bolding, flashing, etc.), so as to alert a checkout clerk about a location that may be checked for additional merchandise.

Figure 35:
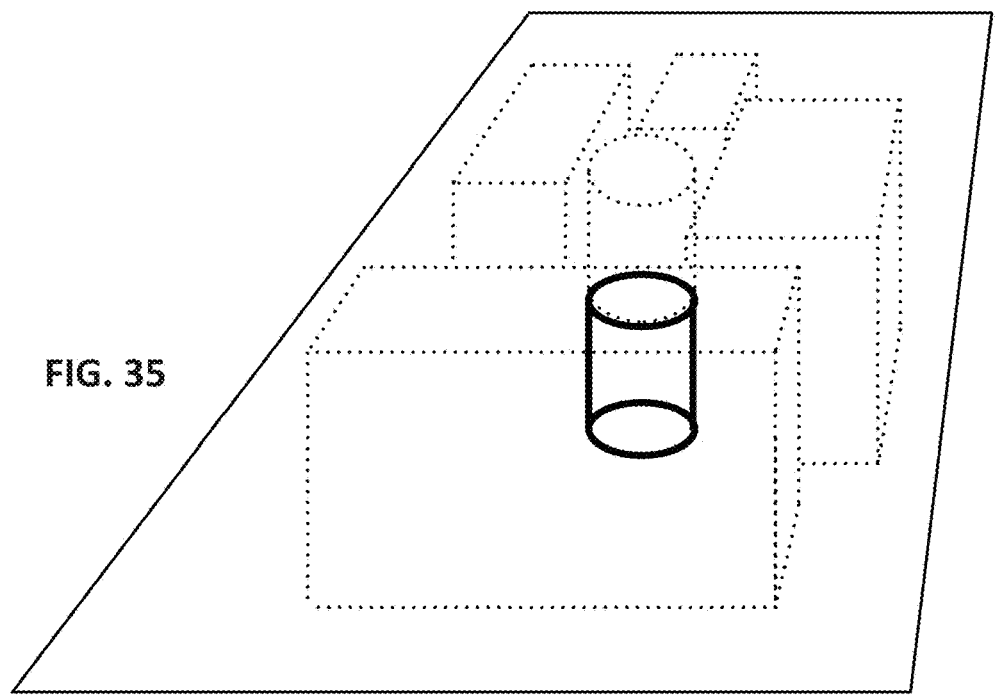

One possibility, depicted in FIG. 35, is that the visible cylinder (Object 3) in FIG. 31 is actually a 4" tall can of soup, positioned atop a second can of soup that is wholly hidden.

It will be recognized that the pile of merchandise shown in FIG. 31, as modeled in FIG. 33, has much uncertainty. For example, the human viewer will perceive (and rules followed by the present system can indicate) that the segmented model depiction of Object 2 and Object 4 are also uncertain. (Object 3 is probably more uncertain, since cylinders with a length-to-diameter ratio of 2.7 are relatively rare in supermarkets, whereas hexahedrons of the dimensions depicted for Objects 2 and 4 in FIG. 33 are relatively more common.)

Other segmented shapes in FIG. 33 are of relatively high certainty. For example, due to the prevalence of regular hexahedrons in supermarkets, and the rarity of any other shape that presents an appearance like that of Object 1 and Object 5 without being a hexahedron, the system can assign a high certainty score to these objects as depicted in FIG. 33.

As just indicated, the system desirably applies rules to compute—for each segmented shape in FIG. 33—a confidence metric. As additional information becomes available, these metrics are revised. For example, if a second view of the pile of merchandise becomes available (e.g., from another sensor, or because the pile moves on a conveyor), then some previously-occluded edges may be revealed, giving greater (or less) certainty to some of the segmented volumes in FIG. 33. In some cases, the segmented model of FIG. 33 is revised, e.g., if the additional data includes evidence of a new item not previously included in the model.

The confidence metric can be based, at least in part, on statistical data about the different products offered for sale in the supermarket. This statistical data can include dimensional information, as well as other data—such as historical sales volumes per item. (If the supermarket sells 100 cans of Pringles potato chips in a month, and 2000 cans of Campbell's soup, then the confidence score for Object 3 will be lower than if the sales volumes for these items were reversed.)

The particular formula for computing a confidence metric will depend on the particular implementation, and the available data. One particular formula comprises an equation in which different metrics are weighted to different degrees in accordance with their importance, and combined, e.g., in a polynomial expression.

The following exemplary confidence metric equation uses input data M1, M2, M3 and M4 to yield a score S for each segmented object. Factors A, B, C, D and exponents W, X, Y and Z can be determined experimentally, or by Bayesian techniques:

$$S=(A*M1)^W+(B*M2)^X+(C*M3)^Y+(D*M4)^Z$$

The uncertainty zone shown in FIG. 34, which is brought to the attention to the human clerk (or other system component), can be threshold-defined, using the computed confidence metric. For example, if Object 3 has a confidence metric of 20 (on a scale of 1-100), and if Objects 1, 2, 4 and 5 have confidence metrics of 97, 80, 70 and 97, respectively, then the uncertainty zone is as depicted in FIG. 34 if the threshold is set to highlight uncertainty zones associated with objects having confidence metrics less than 50.

However, if the threshold is set at 75, then a further uncertainty zone—associated with Object 4, would also be highlighted.

(In a variant embodiment, a binary approach to uncertainty is adopted. Segmented shapes either have certainty or they don't. For example, in FIG. 33, Objects 1 and 5 may be determined to be certain, while Objects 2, 3 and 4 are not. Uncertainty zones associated with the latter are flagged, e.g., for possible follow-up.

In accordance with a further aspect of the present technology, the system's assessments about the different segmented shapes are refined by reference to other sensor data. That is, the system employs other information to help refine an evidence-based determination, e.g., about certainty or shape.

Consider Object 4, which is largely occluded in FIGS. 31 and 33. Scale information extracted from the imagery may indicate this item has a planar (top) face measuring about 2.2"×6". Many items in the supermarket inventory meet this criteria. However, if imagery is also available from an infrared camera, this item may be found to be at a temperature below freezing. Many boxed frozen vegetables (e.g., spinach) have a planar surface of this dimension, but such products commonly do not have a long dimension of 8", as extrapolated in FIG. 33. Based on the additional evidence contributed by the thermal image data, the system may reduce the confidence score for Object 4, e.g., from 70 to 40.

Figure 36:
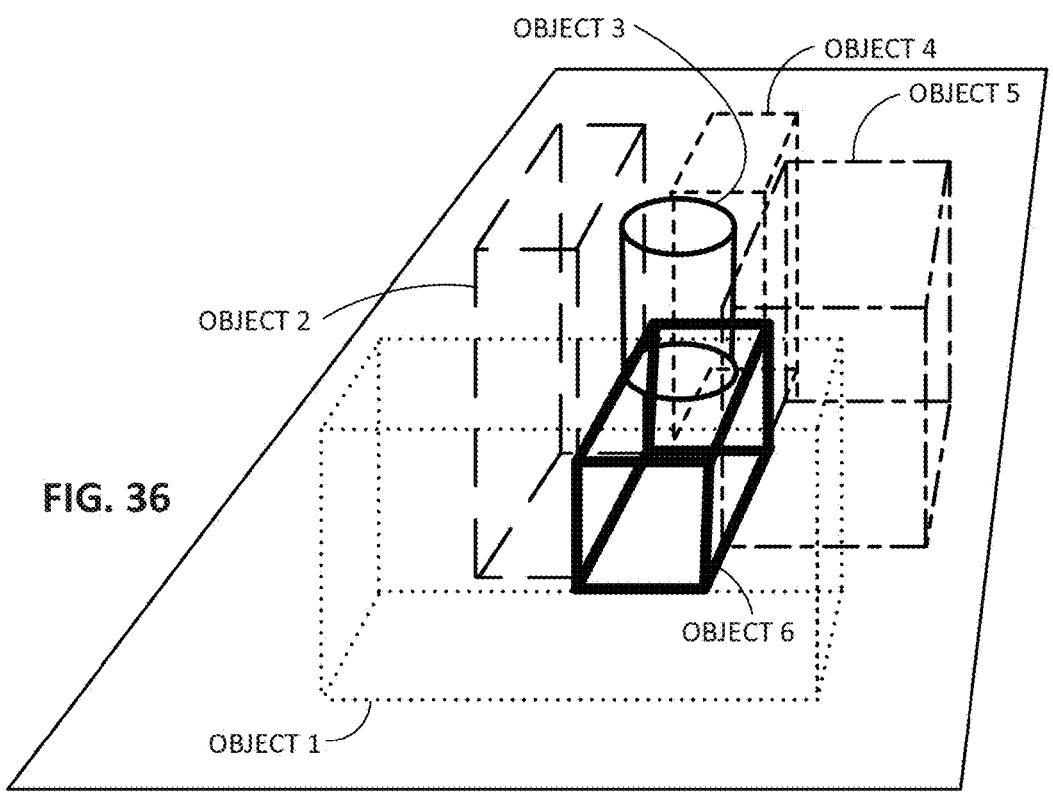

A great variety of other information can be used in this manner Consider, for example, that the image of FIG. 31 may reveal identification markings on the cylindrical face of Object 3 exposed in that view. Such markings may comprise, for example, a barcode, or distinctive markings that comprise a visual fingerprint (e.g., using robust local features). A barcode database may thereby unambiguously identify the exposed cylindrical shape as a 10.5 oz. can of Campbell's Condensed Mushroom Soup. A database of product information—which may be the barcode database or another (located at a server in the supermarket or at a remote server)—is consulted with such identification information, and reveals that the dimensions of this Campbell's soup can are 3" in diameter and 4" tall. In this case, the model segmentation depicted in FIG. 33 is known to be wrong. The cylinder is not 8" tall. The model is revised as depicted in FIG. 36. The certainty score of Object 3 is increased to 100, and a new, wholly concealed Object 6 is introduced into the model. Object 6 is assigned a certainty score of 0—flagging it for further investigation. (Although depicted in FIG. 36 as filling a rectangular volume below Object 3 that is presumptively not occupied by other shapes, Object 6 can be assigned different shapes in the model.) For example, Objects 1, 2, 3, 4, and 5 can be removed from the volumetric model, leaving a remaining volume model for the space occupied by Object 6 (which may comprise multiple objects or, in some instances, no object).

A task list maintained by the system is updated to remove identification of Object 3 from identification tasks to be completed. That part of the pile has been identified with sufficient certainty. Knowing its shape, the geometrical model of the pile is updated, and the system continues with other identification tasks.

The position of a barcode (or other marking) on an object is additional evidence—even if the captured imagery does not permit such indicia to identify the object with certainty. For example, if a hexahedral shape is found to have has a barcode indicia on the smallest of three differently-sized faces, then candidate products that do not have their barcodes on their smallest face can be ruled out—effectively pruning the universe of candidate products, and increasing the confidence scores for products that have barcodes on their smallest faces.

Similarly, the aspect ratio (length-to-height ratio) of barcodes varies among products. This information, too, can be sensed from imagery and used in pruning the universe of candidate matches, and adjusting confidence scores accordingly.

(As suggested by the foregoing, the processing system may maintain multiple identification hypotheses about each item in the pile. For example, the system may separately compute confidence scores that the cylindrical shape in FIG. 31 is a particular can of soup, or a particular can of potato chips. Some evidence may increase or decrease both scores in tandem (e.g., thermal camera data indicating the cylinder is cold, or at room temperature). But other evidence will tend to increase confidence in one hypothesis, and reduce confidence in another.)

Figure 6:
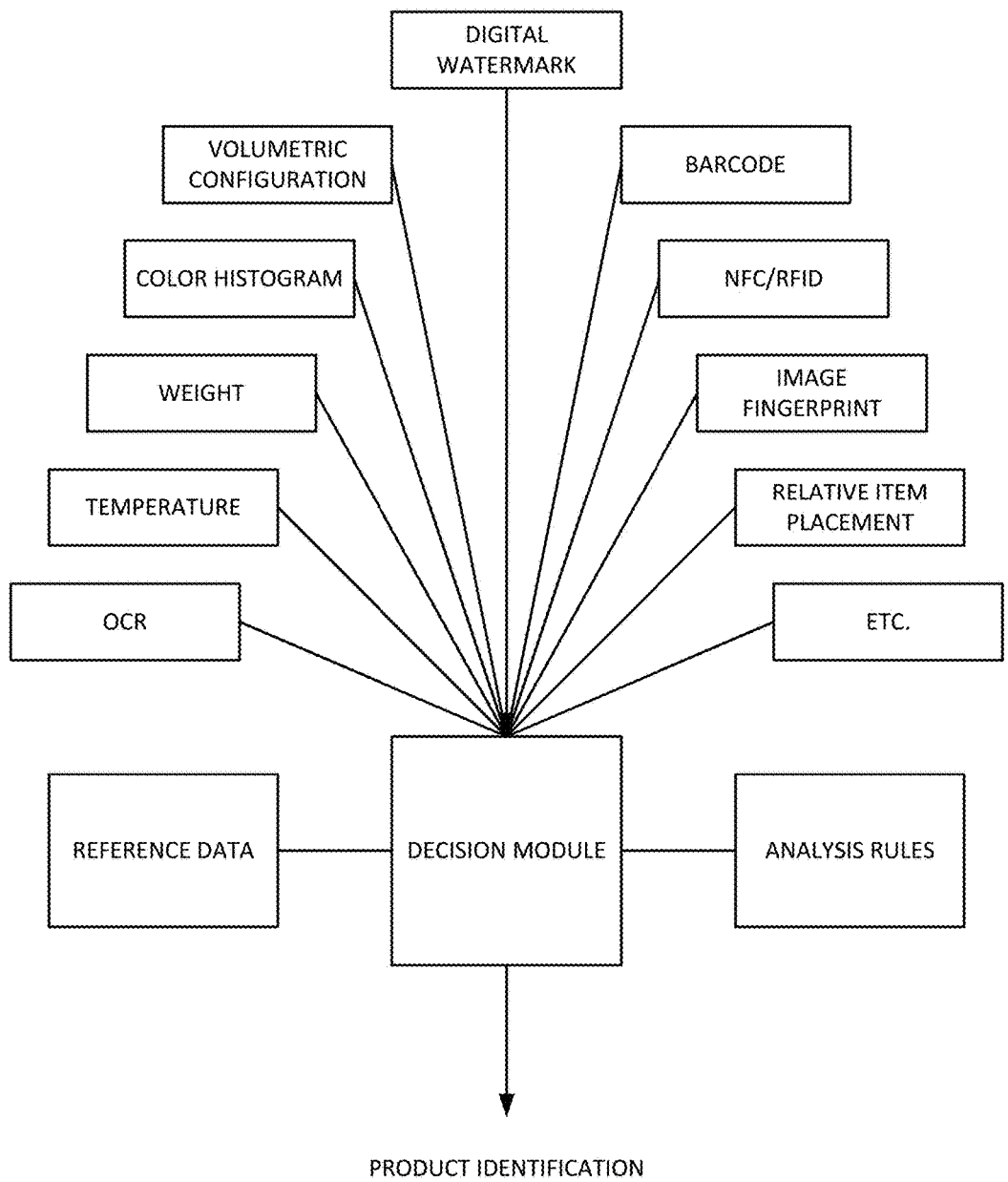
FIG. 6 shows a schematic illustration of a checkout system that considers multiple different types of input information, in conjunction with stored analysis rules and reference data, to determine product identification.

FIG. 6 shows some of the sensor-derived evidence that the system may consider in developing and refining hypotheses regarding product identification.

As another example of how the system's assessments about the different segmented shapes can be refined by reference to other sensor data, consider weight data. Where the weight of the pile can be determined (e.g., by a conveyor or cart weigh scale), this weight can be analyzed and modeled in terms of component weights from individual objects—using reference weight data for such objects retrieved from a database. When the weight of the identified objects is subtracted from the weight of the pile, the weight of the unidentified object(s) in the pile is what remains. This data can again be used in the evidence-based determination of which objects are in the pile. (For example, if one pound of weight in the pile is unaccounted for, items weighing more than one pound can be excluded from further consideration.)

It will be recognized that the above-described technology can be conceived, in one respect, as growing a model of known objects—adding objects as they are identified. An alternate conception is to model an unknown pile, and then subtract known objects from the model as the objects are identified.

An initial model of a total 3D volume presented for checkout can be generated based on sensed data (e.g., imagery). When an object in the pile is identified (e.g., by product markings, such as by fingerprinting, barcode, text OCR, or through use of other evidence), the object's shape (volume) is obtained from reference data stored in a database. The object's orientation (pose) is next determined—if not already known). Again, this may be done by comparing sensor data (e.g., showing edges, product markings, etc.) with reference information stored in a database. Once the object orientation is known, that object's shape—correspondingly oriented—is virtually subtracted from the 3D volumetric model. (Its weight may also be subtracted from the unknown pile weight, if weight information is known.) This process proceeds for all identifiable objects. The remaining volume is then checked for hidden objects, or an output signal can be issued, alerting that the pile needs to be spread out to reveal hidden contents.

For any method based on extracting geometrical edges from luminance images, there is a need to distinguish geometrical edges from pattern edges. One approach is to use range images/depth maps (in addition to, or in lieu of, intensity images) to avoid confusion arising from printing and other markings on the faces of objects.

While the above-detailed geometrical edge-based, rule-based procedure for segmenting 3D data into component volumes is a simple way of identifying conventional shapes, other items encountered in supermarkets can have less conventional shapes—such as egg cartons. These shapes can be defined by stored reference data (templates, akin to CAD-like models) to which the image processing system can resort for identification purposes, e.g., using known bin-picking object identification arrangements. In one such arrangement, the 3D imagery is searched for the various templates in a store's catalog, to determine whether any such item is at least partially visible in the pile. Such procedure can be applied before, or after, the rule-based segmentation of conventional shapes.

Further Remarks Concerning Conveyors

Reference was made, above, to various innovations associated with conveyors at retail checkouts. Most conveyor innovations may be regarded as falling into one of three classes: (1) aids in object recognition, to increase throughput and accuracy; (2) new features for the shopper; and (3) benefits for advertisers.

In the first class, markings on the conveyor can serve to identify the plane on which the objects rest—a helpful constraint in product recognition and object segmentation. The markings can also serve to identify the velocity of the conveyor, and any variations. Relatedly, the markings can serve as spatial references that help with pose estimation. In some embodiments, the markings serve as focus or calibration targets for one or more of the imaging systems. Such spatial reference information is also helpful to establish correspondence between information derived by different identification technologies (e.g., watermark and barcode).

Among new features for the shopper, such conveyor markings can define a lane (FIG. 8) on which the shopper can place coupons. The system is alert to this lane, and examines any imagery found there as candidate coupon imagery. When detected, the system responds according to known prior art coupon-processing methods.

A user may place a smartphone in this lane, with the display facing up. A coupon-redemption app on the smartphone may cyclically present different screens corresponding to different coupons collected by the user (e.g., by scanning promotions in the store, or in a newspaper, or sent to the smartphone electronically—such as by Groupon, etc.). As each coupon is successfully read by the checkout system (e.g., sensed by a camera, or with the coupon information otherwise-conveyed), the checkout system signals such success to the smartphone. This signal can comprise a beep of a particular tone, or other audible acknowledgement. Alternatively, another type of signal can be used (e.g., optical, radio, etc.). When the smartphone receives this signal, it then presents a next coupon to the checkout system (e.g., on its display). This process continues until all coupons available on the smartphone that are relevant to the merchandise being checked-out have been presented and acknowledged.

The check-out system camera can discern that the phone is on the conveyor belt—and not simply held over it—because its velocity matches that of the belt. The smartphone may automatically start the presentation of coupons (e.g., it may activate the coupon redemption app) in response to input from its sensors, e.g., sensing motion along a horizontal plane using its accelerometers, or sensing certain strobed illumination characteristic of a checkout lane using its front-facing camera, etc.

Conversely, the user's smartphone on the moving belt can collect visual information projected onto the conveyor by the projector. This information can represent discount coupons, redeemable at a subsequent visit for merchandise related to that being purchased by the consumer. (Such information can likewise be conveyed to the smartphone by audio, radio, or other communication technology.)

The conveyor can serve as a projection screen, onto which imagery is projected by, e.g., an overhead projector. (Typically, the projector is obliquely angled towards the conveyor, with corrective optics to redress, e.g., keystoning.) As objects on the conveyor are recognized, the projector can present related information, such as item name and price, other suggested purchases, related recipes, digital coupons, etc. The projected imagery desirably follows the associated items as they travel along the conveyor.

The user can touch any of the indicia projected onto the conveyor. A camera senses the user's action (e.g., a camera adjacent the conveyor that captures imagery for item recognition, or a camera positioned with the projector). The system understands the camera-sensed action to indicate user interest in the touched indicia. Several responses may be triggered.

One simply is to freeze the projected indicia in place relative to the user (while the belt and items advance). This allows, e.g., the user to capture an image of the indicia with a personal device, e.g., a smartphone. (This allows the user later to explore the presented information, e.g., pursuing web links indicated by digital watermarks encoded in the projected indicia.)

Another system response is to present a video to the user. The video can be projected at a stationary location, such as on the conveyor (which may continue to advance under the projected video) or on a display screen (e.g., a screen on which the user's purchases are tallied).

Another response is to credit a coupon discount to the amount owed by the consumer. By presenting cash-back coupons to the consumer as items are being checked-out, the consumer can be incented to watch the conveyor (or other device where information is presented). Much of the projected information may be promotional in nature, and the viewer's attention can be maintained by periodically presenting a coupon.

The projected indicia can be text, a logo, machine-readable data (e.g., barcode or watermark), etc. It may comprise a video.

For advertisers, the conveyor belt can be printed with brand messages, or carry temporary stickers for different branding events. In some instances the belt is dynamically printed each cycle, and wiped clean during its under-counter return. Known "white board" and "dry erase" markings can be used.

Further Improvements

The sensor evidence considered in identifying items being purchased needn't be collected at the checkout station. Consider, for example, an implementation in which the shopper's track through the store is monitored, such as by an indoor location technology (e.g., using a unit carried by the shopper or the shopper's cart to sense or emit signals from which location is determined, e.g., sensing a different flicker or modulation of LED lighting in different aisles, or other form of location-related signaling), or by ceiling-, floor- or shelf-mounted cameras or other sensors, etc. If the shopper stops for 15 seconds in front of the Campbell's soup shelf, this data helps reinforce a hypothesis that the cylindrical shape revealed in FIG. 31 is a can of soup—even if no barcode or other identifying information can be discerned from imagery captured at checkout.

Sometimes confidence scores can be revised based on the lack of certain evidence. For example, if the shopper's path through the store did not go down the aisle containing the Pringles potato chips, this tends to increase a confidence score that the cylindrical object is a soup can. (As is evident, certain embodiments of this technology rely on a database or other data store with information about the layout of the store, indicating locations of the different products in the store's inventory.)

Thus, knowing locations in the store visited by the shopper, and more particularly—knowing where the shopper or the shopper's cart paused in the store, is useful information is deducing the identity of items in the cart. Still better is knowing those locations in the store where an item was placed into the cart. (The introduction of an item into the cart can be sensed in various ways, including a cart weight sensor, a camera, an array of break-beam photo sensors that senses a hand or other item passing through a plane into the volume of the cart, photosensors that detects shadowing by a new item (or by the user's hand/arm, etc.) as it is moved into the cart, etc.)

A related class of evidence comes from inventory sensors. Cameras, weight transducers, near field chip readers, or other sensors can be positioned to monitor the removal of stock from shelves. If a ceiling mounted camera, imaging the soup shelves, captures video or periodic imagery revealing that a can of Campbell's Condensed Chicken Noodle Soup leaves the shelf at around 10:30 a.m., this tends to increase the confidence score that a cylindrical shape sensed at a checkout station at 10:40 a.m. is a can of Campbell's Condensed Chicken Noodle Soup. (This datum would increase the confidence score less for a cylindrical shape sensed at a checkout station at 11:10 a.m., and perhaps not at all for a cylindrical shape sensed at a checkout station at 2:00 p.m. That is, the analytic weight given to the data varies in accordance with a time-related factor.)

Data from such an inventory sensor, indicating removal of a can of chicken soup at 10:30 a.m., in conjunction with data from a location sensor—indicating presence of the shopper at the soup shelves at 10:30, is even stronger evidence that the cylindrical shape in the shopper's pile is a can of chicken soup.

In some instances, inventory-tracking cameras are positioned or otherwise designed to avoid capturing imagery or other information about shoppers in the aisle, to avoid certain privacy concerns. Imagery from such cameras may be presented on public displays in the aisles or elsewhere in the store, to put shoppers at ease.

The foregoing has just touched on a few of the multiple sensors that can provide product-identifying evidence. A more lengthy, but still incomplete, list of technologies that can aid in product identification (and in discriminating between candidate products) includes: forced air (e.g., sensing disruption of air blown through a pile, as indicative of its contents—including change in its temperature, which can indicate a concealed frozen item), vibration (e.g., sensing resulting product movement and/or inertia, which can be indicative of density, and sensing sound, which can also be distinctive), other acoustic sensing (e.g., passing item surface past a pointed stylus, or vice versa, and analyzing the sound produced), ultrasonic excitation and imaging, radiographic screening (e.g., ultrasonic or millimeter wave scanning, such as is done by TSA equipment at airport security stations), light-polarization sensing (e.g., to reduce certain reflections and to help assess surface texture), other optical texture sensing, motion sensing (e.g., accelerometers), UV/IR cameras, watermarks, RFID/NFC chip sensing, weight sensing, shopper demographic sensing (e.g., by camera, or by reference to loyalty card profile), thermal time constants (e.g., how quickly a warm area caused by manual handling decays in temperature, haptic sensing (e.g., rubber membrane that deforms as items are placed onto it), time of flight cameras, chemical and olfactory sensing, gaze tracking (e.g., sensing that shopper is looking at Campbell's condensed chicken noodle soup; tracking of a checkout clerk's gaze can be used to identify salient points in captured imagery—such as the locations of product barcodes; Google Glass goggles can be used in gaze tracking), sensing pose of hand as shopper or clerk grasps an item, inertial modeling (heavy items are moved along a different track than light things), shopper's purchasing history (shopper prefers Coke to Pepsi, buys milk weekly, bought a 24-pack of paper towels last week so is unlikely to buy paper towels for a while), statistical item correlations (when a shopper buys spaghetti noodles, the shopper often buys spaghetti sauce too), crowdsourced human identification by Amazon Turk service or the like (e.g., relaying imagery of an otherwise unidentified product to one or more human evaluators for assessment), etc., etc.

The technologies detailed herein can utilize data collected from sensors at a variety of locations, including from the product itself (e.g., packaging includes certain wirelessly-coupled sensors), from store shelves, from ceilings (looking down onto aisles or shelves), in shopping carts, carried or worn by shoppers, at point of sale stations, associated with checkout conveyors, carried/worn by clerks or shoppers, in bagging areas, etc.

Such collected information is used in a data fusion manner, to successively narrow a universe of possible product identifications. Probabilistic modeling can often be employed (e.g., using Bayesian classifier, boosted tree, or random forest approaches).

Thus an exemplary supermarket system uses a multi-feature product identification procedure—the components of which contribute different evidence to a decision module that tests different product identification Bayesian hypotheses until one emerges as the winner.

One component of the supermarket's system may provide volumetric product configuration (shape) information. Another component may provide color histogram data generated from RGB imagery depicting the products. Another may provide barcode data (which may be incomplete or ambiguous). Another may contribute digital watermark data. Another may provide NFC/RFID information. Another may provide image fingerprint data. Another may contribute recognized text (OCR) data. Another may contribute weight information (e.g., from a conveyor weigh scale). Another may contribute item temperature information (e.g., discerned from infrared camera imagery or air temperature). Another may provide information about relative placement of different items (a consumer is more likely to put a 12-pack of soda on top of a bag of dog food than on top of a bag of potato chips). Others may contribute information gathered in the shopping aisles. Etc. Not all such information may be present for all items, depending on item characteristics, the manner in which the items are arrayed on a conveyor, availability of sensors, etc.

Outputs from plural such components are provided to a decision module that determines which product identification is most probably correct, giving the ensemble of input information. (FIG. 6.)

By such an arrangement, collected evidence is used to refine the confidence scores of the different objects seen, or deduced to be, presented for checkout, until all are identified within a given certainty (e.g., in excess of 99.99%). After all evidence is considered, any object(s) not identified with such accuracy is indicated for manual examination by a clerk, or is mechanically diverted from the pile for further evidence collection (e.g., by imaging, weighing, etc.)

In some embodiments, a projector can project information onto the pile of items to convey information. For example, the projector can project price information onto (or near) items as they are identified, to assure the customer that the price charged is as expected. Additionally, or alternatively, the projector can illuminate products in green (or some other distinctive fashion) after they have been successfully identified. Red can indicate products (or areas in the pile) about which the system is uncertain. A checkout clerk can thus examine the pile and remove anything illuminated in red for additional imaging (or other sensing), or simply scatter the pile to expose additional product faces for imaging, until the system has recognized all the items and the pile is uniformly illuminated in green.

Some arrangements have no checkout counter; items are moved (e.g., by the shopper) directly from a shopping cart (basket) to a bag. A system according to the present technology can monitor the space between the cart and the bag, and can sense one or more types of data from objects as they pass, to effect identification (sometimes in conjunction with previously-acquired information).

Shopping bags, and/or the bagging area, may also be enhanced to aid identification. For example, bags may be provided with features to aid in item recognition/identification—such as markers to assist in determining object pose.

Moreover, bags or the bagging area may also be equipped with sensors to aid identification. For example, a bag may be suspended from hooks allowing the weight of the bag to be sensed. A bag may also be positioned (e.g., hung or sat) in an instrumented area, with one or more sensors for collecting object identification data. The bags may be made of a material that is functionally transparent to the sensing technology (e g, millimeter wave scanning, or UV/IR illumination), so that data can be sensed from the bag's contents from one or more external sensors. Alternatively, sensors may be placed inside the bag. In one particular arrangement, sensors are removably placed inside the bag. For example, a frame structure, comprising four vertically-oriented planar members coupled at their vertical edges, and defining a regular hexahedral volume—just smaller than that of the bag itself, is lowered into an empty bag (e.g., a fabric bag brought by the shopper). One or more panels of this frame is instrumented with one or more sensors. Items are then placed into the bag, by placing them within the frame structure. The sensor(s) acquires data from the items as they are placed—or as they rest—within the structure. After data has been collected by the sensors, the frame instrumented structure is lifted and removed from the bag—ready for re-use in another bag. With the declining cost of sensors, a bag brought by the shopper may itself be permanently equipped with sensors, which are polled at the bagging station for sensed data by the store computer system.

The order in which a human places items in a bag can also be used as evidence of item-identification. For example, the system may identify (e.g., by barcoding) a package of hamburger buns that is placed into the bottom of a bag. If a large shape is next placed into the same bag, the system can deduce that this next object is not a heavy object—such as a six-pack of soft drinks More likely is that the large object is a light weight item—such as a pack of paper towels.

If a shopper's items are identified before being bagged, the system can suggest to the shopper—or a clerk—a rational bag-packing strategy. A procedure based on stored rule data can be followed. For example, the system can first determine the aggregate weight and volume of the shopper's items, and apply the stored rules to determine a number of bags required to hold such a weight/volume of items. Similarly, given N bags (e.g., three), the rules can indicate which items should be placed in the bottom of each bag (e.g., the heaviest or most crush-resistant/crush-tolerant items). Likewise, the rules can determine which items should be placed in the top of each bag (light items and the most crush-sensitive items). As a consequence of these determinations, the system can indicate which items should be placed in the middle of each bag. Other rules may lead to frozen and refrigerated items being placed together, and remote from items that may be frost damaged (and remote from deli items that may be warm). Etc. The suggestions may take the form of voiced instructions. Alternatively, projected light of different colors can illuminate different items, signaling that they should next be placed in bags that are similarly identified by color. In essence, such arrangement is a bagging expert system.)

A weight sensor in a cart may be used not just to weigh an item as it is placed into the cart (i.e., by sensing the before-after difference in weight); it can likewise be used to weigh an item as it is removed from the cart (again by reference to the weight difference).

Some implementations of the technology are self-learning. For example, the detailed system can statistically track data that—in the aggregate, begins to reveal clues for product identification. A data driven model for product identification thus evolves through exposure to additional data. The system may discern, for example, that a shopper who passes through the frozen foods aisle at the beginning of a fifteen minute shopping visit, is less likely to have a frozen food item presented for checkout than a shopper who passes through the frozen foods aisle at the end of such a shopping visit. Such probabilistic models can be constructed by humans, but are more readily—and accurately—developed by analysis of historical shopping data.

Information collected by distributed sensors (e.g., in carts, shelves, and/or ceilings, etc.) can be used, in conjunction with shopping list data received from consumers, to aid in traffic management through the store. If the system finds a "milk" entry is found on the lists of five shoppers, it can suggest routes through the store for the different shoppers that allow them to pick up other items on their respective lists, and arrive at the milk cooler in time-staggered fashion—avoiding a bottleneck as one shopper carefully studies carton expiration dates while others wait.

The artisan will recognize that shoppers can be identified in various known ways, including loyalty cards, routine radio emissions from smartphones, smartphone apps that exchange data with a store computer, facial recognition and other camera-based techniques, etc.

Existing checkout systems commonly issue an audible signal (e.g., a beep) to confirm successful reading of a barcode. In accordance with another aspect of the present technology, the system issues different audible signals—depending on the manner of product identification. If a product is identified by barcode reading, one type of beep is issued (e.g., 250 milliseconds of 523 Hz signal). If the product is identified by digital watermark decoding, a second type of beep is issued (e.g., 400 milliseconds of 660 Hz signal). If the product is identified by fingerprint recognition, a third type of beep is issued (e.g., 500 milliseconds of 784 Hz signal).

Of course, these signals are exemplary only; any different signals can be used (including signals that are sequences of beeps—either all of the same frequency, or of different frequencies).

If item recognition is based on several different types of object data, still other signals can be used. Alternatively, a signal indicating the identification technology that served as a primary basis for identification can be issued.

Watermarks will gain deployment gradually in supermarkets. As with barcodes, some time will pass before all items are watermark-encoded. The different audible feedback signals noted above will help train the checkout staff about which types of product identification are typically successful with which types of products. For example, if a cashier learns, by repeated exposure, that boxes of Kleenex tissues always issue a barcode "beep" and not a watermark "beep,"

then the cashier will learn to slow down with such items, and be sure that the barcode on Kleenex boxes is oriented towards the sensing device. On the other hand, if the cashier learns that General Mills cereal boxes are reliably read by watermark recognition, then these items may be passed more quickly through checkout, since the cashier has confidence that they will be read regardless of orientation.

While certain embodiments discern the geometrical pose of component patches on items being checked-out, and then process the imagery depicting such patches so as to yield processed imagery showing the patches as if presented squarely to the camera, in other embodiments, this latter action is not necessary. Instead, the discerned pose information can be provided to the system module that derives product identification information. Such module can then work with the original imagery, expecting its geometrically distorted state, and discerning the identification information taking such distortion into account.

In some of the detailed embodiments, the geometrical pose information for component surfaces on products/packaging is discerned from the camera imagery. In other implementations, the pose information can be determined otherwise. One such alternative is to use the Microsoft Kinect sensor device to sense the 3D environment. Tools extending the use of such device far beyond its original gaming application are now widely available. Microsoft, for example, distributes a software development kit ("Kinect for Windows SDK") that enables programmers to use the sensor's various capabilities in arbitrary applications. Open source drivers for the Kinect sensor are available from Adafruit Industries and PrimeSense, Ltd. In a further aspect of the present technology, such a sensor is used in assessing the pose of product surfaces at a supermarket checkout.

Unlike some other pose-assessment arrangements, the Kinect sensor does not rely on feature extraction or feature tracking. Instead, it employs a structured light scanner (a form of range camera) that works by sensing the apparent distortion of a known pattern projected into an unknown 3D environment by an infrared laser projector, and imaged by a monochrome CCD sensor. From the apparent distortion, the distance to each point in the sensor's field of view is discerned.

Microsoft researchers have demonstrated use of a movable Kinect sensor to generate a volumetric model of an unknown space (Azadi et al, KinectFusion: Real-Time Dynamic 3D Surface Reconstruction and Interaction, Article 23, SIGGRAPH 2011). The model relies on continually-tracking 6DOF information about the sensor (e.g., defining its X-, Y-, and Z-position, and its pitch/roll/yaw orientation, by auxiliary sensors), and uses this information—with the depth data output from the moving range sensor system—to generate a 3D model of the space. As the sensor is moved, different views of the scene and objects are revealed, and these are incorporated into the evolving 3D model.

In Kinect-related embodiments of the present technology, the sensor typically is not moved. Its 6DOF information is fixed. Instead, the items on the checkout conveyor move. Their motion is typically in a single dimension (along the axis of the conveyor), simplifying the volumetric modeling. As different surfaces become visible to the sensor (as the conveyor moves), the model is updated to incorporate the newly-visible surfaces. The speed of the conveyor can be determined by a physical sensor, and corresponding data can be provided to the modeling system.

In addition to providing pose information for component item surfaces, such arrangement provides an additional manner of product identification—by volumetric product configuration. As noted, some existing products have distinctive shapes, and packaging for others readily could be tailored to impart a distinctive product configuration. Even features as small as 1 mm in size can be discerned by such volumetric modeling, allowing logos and other distinctive markings to be presented on products/packaging in raised embossing, or depressed engraving, fashion. Volumetric data from an item can be used, at checkout, for product identification—matching against a catalog of reference volumetric product configuration data (in a manner akin to present use of image fingerprinting for product identification).

In an implementation that uses the Kinect sensor for pose determination and/or volumetric configuration sensing, the Kinect RGB camera can be used as the sensor for capturing imagery from which other product identification information is determined. In such embodiments a checkout conveyor can be marked with volumetrically-sensible features, such as raised grooves or other prominences, embossed logos, etc. Such features can be used in a manner akin to the conveyor markings described earlier.

Volumetric modeling can also be performed without a Kinect-like sensor. With two or more different views of an item, or of items on a checkout conveyor, a 3D model of the depicted item(s) can be produced.

In many implementations, volumetric modeling is not used independently for product identification. Instead, it is one aspect of the above-noted multi-feature identification procedure—the components of which contribute different evidence to a decision module that tests different product identification Bayesian hypotheses until one emerges as the winner.

As described above, outputs from plural such components are provided to a decision module that determines which product identification is most probably correct, giving the ensemble of input information. This module can rely on reference information about products in the store's inventory, stored in a database or other data structure. It can likewise rely on analysis rules, stored in similar fashion. These rules may cause the module to accord the different input information with different evidentiary weight, depending on circumstances and candidate item identifications.

For example, if a weight sensor indicates an item weighs 12 ounces, the rules can specify that this is highly probative that the item is not a 40 pound bag of dog food. However, the rules may indicate that such information is of little value in determining whether the item is a can of corn or beans (for which the stored rules may indicate color histogram data has a greater discriminative value). Similarly, if a cylindrical carton is sensed to have a temperature below freezing, this is strong collaborating evidence that the item may be a container of ice cream, and is negating evidence that the item is a container of oats.

In one illustrative implementation, the decision module performs a staged analysis. Tests that are fastest, and/or simplest, are performed early, and are used to rule-out large numbers of possible items from the store's catalog of inventory. For example, if the weigh scale indicates a weight of one pound, all items having weights above three pounds may be disqualified immediately (e.g., six- and twelve-packs of soda, large containers of liquid detergent, 40 pound bags of dog food, etc.). Tests that are highly discriminative, e.g., having the potential to identify a single item out of the store's catalog (analysis of captured data for digital watermark and barcode information is of this sort), may also be applied early in the staged process.

Generally speaking, a minority of the products in a supermarket comprise most of the sales volume. Coke is seen frequently on checkout counters; not so with smoked oysters and obscure ethnic condiments. Desirably, the checkout system is optimized for recognition of the products that constitute most of the volume. Thus, for example, the analysis rules in the embodiment of FIG. 6 may be selected, and ordered, to most quickly identify the most popular grocery items.

Such a system may be self-learning. A new product may be recognized, initially, by an express identifier, such as a watermark or a barcode. Through repeated exposure, the system collects information about image fingerprints, weights, color histograms, temperature, etc., that it associates with such product. Later, the system becomes able to recognize the item even without reference to the original identifier.

In some staged recognition systems, data from one stage of the analysis is used in determining an order of a later part of the analysis. For example, information captured in the first stage of analysis (e.g., color histogram data) may indicate that the item is probably a carton of Diet Coke product, but may leave uncertain whether it is a 6-pack or a 12-pack. This interim result can cause the analysis next to consider the item weight. If the item weighs between 9 and 10 pounds, it can be identified as highly likely to be a 12-pack carton of Diet Coke. If the item weighs half that amount, it can be identified as highly likely to be a 6-pack. (If it weighs less than 4.5 pounds, the initial identification hypothesis is strongly refuted.)

In contrast, if the initial histogram indicates the product is likely a carton of Reese's product, but leaves uncertain whether the carton contains ice cream bars or peanut butter cups, a temperature check may next be considered to most quickly reach a reliable item identification.

The rules data consulted by the decision modulation assign weighting values to different evidentiary parameters and different items. These values are used to determine an evolving probabilistic certainty that a tentative product identification is correct. When the decision module has considered enough evidence to make a product identification with a probabilistic certainty exceeding a threshold value (e.g., 99.99%), further analysis is skipped, the module outputs the product identification, and it can then consider a next item in the checkout. If all of the available evidence is considered, and the threshold certainty value is not met, this circumstance can be flagged to a human operator (e.g., providing an image of the item and/or other associated item information) for follow-up.

In a related implementation, a voting arrangement is used, with different identification technologies each casting virtual votes for different item identifications. The votes of some identification technologies may be more heavily weighted than others, reflecting their greater granularity of identification, or reliability of identification. The item identification with the most votes wins.

In some embodiments, an item that is not reliably identified—after consideration of all the available evidence, is physically diverted so that the flow of subsequent items through the checkout procedure is not stopped while the troublesome item is manually examined Such diversion can be by an arrangement such as compressed air, a diverting arm, or a trap door.

It will be recognized that smartphone apps (and the successors to smartphones and their apps) can be adapted to cooperate with and supplement (e.g., in terms of sensor data collection and data processing) the detailed systems. For example, a shopper may maintain a shopping list on the smartphone, which list data is shared with the store computer (perhaps in advance of the shopper's visit) to aid in the shopping experience. (An entry of an item on a shopper's electronic list is still additional evidence that can be used in identifying items presented for checkout. Indeed, the list can comprise a suitable set of initial identification hypotheses about items in that shopper's checkout pile.)

Relatedly, data can be captured at home and used in connection with shopping. For example, Tupperware and other re-usable food containers can be equipped with sensors, e.g., that provide data about the weight, chemical/smell, and appearance of their contents. A camera/illuminator in a lid of such a container can apply object recognition techniques to visually distinguish different products (e.g., popcorn, sugar, nuts, flour, etc.). Existing containers may be retro-fit with sensor-equipped lids. Such devices can be self-powered (e.g., by battery), or energized based on parasitic excitation from another source. Such devices wirelessly communicate with other such devices, or with a computer, via a mesh or other network. A cookie container may have its own social networking presence (e.g., a Facebook or Twitter account)—informing humans or other data consumers about its fill level, when last refreshed, when last opened (and by whom), etc. When the inventory of such a monitored food product falls below a threshold (which may be determined by the historical inventory level at which the container has been re-filled in the past), that food item can be added to the user's shopping list.

Similarly, in a social network vein, when a consumer adds a food item to a shopping list, or when such item is added to the consumer's shopping cart, this information may be published by social network channels (e.g., Facebook or Twitter). This information may be made available (with the consumer's permission) to companies that want to market to the consumer. To illustrate, if Tony puts a can of Campbell's soup on his list or in his cart, this information—or the opportunity to respond to it—may be offered to Campbell's and its competitors (e.g., General Mills' Progresso soups). For example, in an automated auction, these different companies may bid increasing amounts of cash (or other consideration) to determine which—if any—gets to interact with Tony, or gets access to certain of Tony's demographic profile data for marketing or research purposes. (The consideration may be split between Tony and the store.) The interaction may come via a display screen in the cart or at the checkout station, via a portable device carried by Tony, via imagery projected on the conveyor at checkout, etc. Such object-related encounters can also be added to a stored repository of Tony's grocery profile data—serving as context information useful, e.g., in tailoring the search results (or order of search results) presented when Tony thereafter uses the Google search service or engages in other activities. If Tony does a Google search for a recipe (e.g., to make use of a surplus of tomatoes harvested from his garden), he might get different search results than Alice, who enters the same search terms—but whose grocery profile data is different.

These concepts needn't be applied only when Tony places an item on a list or in a cart. The same concepts can likewise be applied when Tony looks at a product in a supermarket. Eye tracking systems—coupled with a store's layout data—allow a shopper's gaze to be accurately discerned, e.g., to identify that Tony is looking at a shelf location where Campbell's Cream of Mushroom soups are stocked. The dwell time of the gaze can be noted as well. This information can be logged, published, and/or made available to others, as detailed above, and corresponding actions can be taken.

Some stores may choose to implement a Trusted Shopper checkout option—available to shoppers who meet certain qualification standards. These standards can include, e.g., purchases averaging more than $300/month, a loyalty-card shopping history with the store that dates back at least two years, an address within two miles of the store, etc. Other indicia of trustworthiness can be gathered from public and private databases, e.g., including credit scores, employment history, background checks, etc. The Trusted Shopper option is designed to enable such shoppers to more quickly check out, due to a heightened level of trust. For example, in a self-service checkout station, some of the alarms that occasionally bedevil regular shoppers ("Place item in the bagging area!") can be disabled for Trusted Shoppers. Similarly, instead of requiring goods to be machine-identified, the shopper can self-identify the items (e.g., by tapping a displayed entry from a list of items commonly purchased by that shopper, or by submitting a shopping list to indicate items being purchased). Qualified shoppers can be authenticated by facial recognition, card swipe and PIN number (e.g., loyalty card or credit/debit card), etc.

Still Further Improvements

Electronic shelf labeling is increasingly common in retail stores. Such labeling employs LCD or other display units, attached to the fronts of shelves, to present prices and product information for items offered for sale on the shelves. The displayed information is typically controlled by wireless transmission from a store computer. Such units may be powered by a battery, by a photoelectric cell, or otherwise.

One vendor of such equipment is the Swedish company Pricer AB. Its technology is detailed, e.g., in US patent publications U.S. Pat. Nos. 7,005,962, 7,213,751, 7,461,782, 20040012485 and 20060100967.

In accordance with a further aspect of the present technology, an enhanced type of shelf-mounted display unit is provided. Such a unit is additionally equipped with a rear-facing sensor that senses identifying information from an item presented for sale on the store shelf.

In a particular embodiment, the sensor comprises a 2D image sensor. Imagery captured by the sensor is processed (within the shelf-mounted unit, or at a remote computer processor) to decode machine readable data from a retail item stocked on the shelf. For example, a digital watermark payload on the item can be sensed and decoded.

The unit may also include an illumination source (e.g., a visible, IR, or UV LED) which is activated during a period of image capture (e.g., a thirtieth of a second, every 5 minutes) to assure adequate illumination.

By reference to the sensed identifier, a remote computer identifies the item, and sends the appropriate price and product information for presentation on the display screen.

The sensor may sense data from several different adjoining products. For example, the sensor camera's field of view may encompass two or more different types of Campbell's soups. A different digital watermark payload is decoded from each. In this case, the unit can be configured to cyclically present price/product information for each product so-sensed. Alternatively, the image processing software may be arranged to identify only a single product, e.g., by a block of watermark data that is sensed closest to the center of the captured image frame.

(As in the other embodiments, barcode, RFID, and other sensing/identifying technologies can alternatively be employed.)

In a variant arrangement, price/product information is projected from a data projector, onto the product or onto the shelf. Such display can be instead of, or in addition to, a display screen of the shelf-mounted unit.

Such arrangements permit store personnel to move inventory about the shelves as-needed, and the electronic shelf labeling adapts automatically—displaying the price of the proximate item.

A related embodiment employs shelf-mounted units with aisle-facing cameras. Each such unit captures imagery of shelving on the opposite side of the aisle. From such imagery, the contents of those shelves can be determined (e.g., by watermark decoding, product fingerprints, or otherwise). Such cameras may be used both to aid identification of products presented for checkout (e.g., a can of soup disappeared from a shelf between images taken a minute apart; such a product will likely be soon presented for checkout). The camera imagery can also serve to aid with automated inventorying. For example, each night the imagery can be analyzed to identify depleted stock. If the Campbell's Tomato Soup shelf is looking bare—with only two identifiable cans on the shelf, then the stocking staff can make sure to provide more stock. (Such stocking can be triaged. The most popular, or highest margin, products can be restocked before slower-moving, lower margin items are dealt with.)

A variant implementation does not use fixed cameras. Instead, one or more movable cameras (which may be panoramic or hemispherical, or dodecahedral) are transported by a conveyance and capture imagery as they move—akin to Google Street View. In a particular implementation, the camera is moved down the aisles—when the store is closed—by a robotic vehicle following a prescribed path on the floor, or even by a store clerk on a skateboard.

(Technology used in Google Street View is detailed, e.g., in US patent documents U.S. Pat. No. 7,843,451 and 20110242271. Related technology is detailed in U.S. Pat. Nos. 5,703,604 and 6,141,034 to Immersive Media Corp.)

Data collected by any of the foregoing arrangements can be compiled and presented in map form, and made available to store customers, e.g., via an online service from outside the store. Such a service can receive consumer queries asking whether the store has a particular item in stock. Such questions can be answered by reference to store inventory information determined from the collected imagery. A customer can also be provided with a floor map and shelf photo detailing where, in the store, a requested item is located.

A related aspect of the technology concerns projecting onto (or near) different retail packages, different indicia (e.g., red, yellow, or green colors) to indicate product expiration information. Again, the products can be sensed and identified by watermarks or barcodes—preferably encoded with information by which expiration information can be determined Some industry-standard product identification codes, such as GS1 DataBar-Expanded barcodes and the GS1 PTI standard, have payload fields expressly for the purpose of encoding expiration date (or for expressing a product's lot code, which can be used to look up a corresponding expiration date in a database). Such codes can be conveyed as watermark payloads. Alternatively, expiration date information can be encoded in a watermark, which is supplemental to other product-identifying technology (e.g., barcode or fingerprint).

A particular implementation comprises a fixed camera positioned to view into a dairy case of a grocery store, and an associated projector that projects a "heat map"-like pattern of colored areas onto the displayed products, indicating which items are relatively fresher, and which are relatively older. A store can apply a differential pricing policy, e.g., applying a 50% discount for products that are purchased on their expiration dates, a 30% discount for products that are purchased the day prior, a 20% discount for products that are purchased two or three days before their expiration date, etc. The consumer can select from the differently-illuminated products in the dairy case, based on pricing considerations and date of expected use.

(The item's production date, packaging date, "best before" date, etc., can alternatively be the basis for projection of different indicia.)

In variant arrangements, the colors simply indicate different product pricing (e.g., green indicates $1.89; blue indicates $1.49, etc.). These prices can reflect expiration-based discounts.

Instead of projecting colored indicia, the projector can project alphanumeric information onto the respective products, e.g., indicating expiration date, price, or other information.

(The projection of indicia in registered alignment onto products is a straightforward application of known augmented reality techniques, in which graphical indicia are overlaid in registered alignment with features of imagery captured by a camera from a real world scene and presented on a display screen. In the present case, however, the indicia are not overlaid on a screen displaying imagery of a real world scene, captured by a camera. Instead, the indicia are projected onto the real world scene itself, from which the camera captures imagery. Although there is typically not an identity mapping between pixels in the projector LCD and corresponding pixels in the camera data, the appropriate mapping for any projector/camera pair can readily be determined.)

A related arrangement does not use a fixed camera in the store, but rather employs a camera-equipped device conveyed by the shopper (e.g., a smartphone or head mounted display device). Again, imagery is captured depicting one or more product packages on a store shelf. The imagery is processed to decode machine readable indicia (e.g., digital watermark data) encoded on the packaging. The decoded information may literally express expiration date information. Alternatively, it may comprise an index code that is resolved—by reference to a table or other data structure, either within the portable device or remote from it—to obtain corresponding expiration date information.

In such arrangements, the portable device may project information onto the product(s)—as in the fixed store camera case. More typically, the portable device presents the user with an augmented reality display, in which expiration indicia for different packages is displayed as a graphical overlay on the captured imagery. (Again, a colored heat map can be employed, whereby the shopper can quickly identify newest and oldest inventory among the imaged packages.)

Another aspect of the technology involves determining demographic information about a person near a particular shelf product display (e.g., age, gender, ethnicity, historical shopping history, etc.). Based on this demographic information, the system presents an animated display promoting a product.

The person's demographic classification can be determined in various ways. One is by a shopper loyalty card that identifies the person, and provides some associated demographic information. A related technique senses radio emissions from a portable device carried by the person (e.g., Bluetooth or cell signals). From such signals, the person's identity may be determined Still another technique relies on image-based facial analysis, through which age, gender, mood and ethnicity may be estimated. A variety of "smart sign" systems operate in this way. Such systems are available, e.g., from Intel (the Intel Audience Impression Metric Suite) and the French company Quividi (the VidiCube). Additional information is provided in PCT patent publication WO 2007/120686.

The animation can be presented as an augmented reality overlay on the display of the person's portable device. For example, imagine that in 2020 a boy is walking down the cereal aisle of a grocery with his father, and both are wearing head-mounted display devices. The boy's display may present an animated sword fight between Captain Crunch and his nemesis, appearing on the floor or on the shelf near the Captain Crunch cereal. The dad, in contrast, may see an excerpt of a fitness video appearing near the Shredded Wheat cereal. Competing with that, next to the adjoining Life cereal, the father may see an animation promoting Life, and offering 20% off a box of Captain Crunch if the two are purchased together. (The system that identified the boy's demographics also notes that his gaze is cast in the direction of the Captain Crunch cereal, prompting such cross-promotion. Both cereals are products of the Quaker Oats Company.)

Audio may also accompany such animated presentations (and be delivered, e.g., to the shopper's Bluetooth ear bud).

Without some limit, there could be a countless number of "Buy me! Buy me!" messages, everywhere shoppers look. To quell the distraction, the user's portable device preferably allows only a few such products/brands to present promotional messages. In one such arrangement, the user device sends data indicating it will receive ten promotional messages during this visit to the store, and will grant those ten rights to the ten companies that bid the most for the shopper's attention. An automated auction is conducted each time a shopper enters a store. The more demographic information the shopper reveals to the potential bidders, the more accurately the shopper can be targeted, and the higher the bids are likely to be. The ten highest bidders provide the bid-for consideration to the user (e.g., depositing funds in a user account), and presentations from those parties are then presented to the user in the store.

(Such automated auctions are known from Google AdWords, and from applicant's published application 20110143811. Additional information about limiting the number of augmented reality overlays presented on a scene is detailed in applicant's published application 20110161076.)

Another aspect of the technology helps draw a shopper's attention to certain products, e.g., which may be on their shopping list.

Such list information is provided by the shopper to the store computer system. When the shopper is sensed in an aisle where an item on the list is stocked, the shopper's attention is drawn to the item location by illumination on or near such product. The illumination can be from a shelf-mounted device (e.g., an LED), or can be projected from a data projector (e.g., mounted on the ceiling, or an opposite shelf).

The location of the desired product on a shelf can be determined by reference to sensor data, as described elsewhere (e.g., fixed store cameras, such as on the ceiling, or on opposite shelves, or on the back of electronic label units; portable cameras—such as conveyed by shoppers, robots, or skateboarding clerks; RFID, etc.).

Relatedly, the shopper's attention can be drawn to items that are "on special." The shopper's mobile device can present a store map that highlights locations in the store where items are reduced in price—identifying both where the items are, and where the shopper is. A similar display can be presented on a stationary display panel in the store, or in an image presented from a stationary store projector. Such a display/projector can also be operated to identify locations, in the store, where items found on the shopper's shopping list can be found. (The shopping list may be transferred from the shopper to the store computer in certain implementations.)

Still another aspect of the technology concerns assessing advertising efficacy (e.g., newspaper advertising).

Advertising (outside of the store, not inside) is placed, promoting a premium that is available to purchasers of a required group of items. For example, a $5 discount may be awarded if a Heinz product (e.g., ketchup), a box of cereal from the Quaker Oats Company (e.g., Life), and a Chicken of the Sea product (e.g., tuna), are all purchased together.

Inside the store (e.g., at checkout), the store computer analyzes collections of goods purchased by shoppers—looking for the specified combination. If the required combination is sensed, the premium is awarded to the shopper.

Since the prize is not promoted inside the store, and the specified collection of products would not regularly be purchased together (although they might—by chance), their presentation together at checkout is some evidence that the advertising was effective in driving customer behavior. The store may assess the relative effectiveness of different advertising media by publicizing different promotions in each, and noting the respective effectiveness of each.

A further aspect of the present technology concerns use of heads up-like displays at checkout stations. As is familiar, a heads-up display involves the projection of information onto a transparent surface, so a viewer sees both the projected information, and the scene beyond the surface.

In the present situation, such a surface is placed between the shopper and a checkout conveyor. A data projector presents information on the surface, for viewing by the shopper. This information can include, e.g., price information, discount information, expiration information, calorie information, whether the item has been identified yet (e.g., a green overlay if identified, red if not), etc.

Desirably, such information is presented on the surface at a position so that the shopper views the information in registered alignment with the items to which it corresponds. This requires knowledge about the position of the shopper's eyes/face, so that the projected image can be presented where it appears to overlay (or be presented adjacent to) the actual item as seen through the surface. A fixed camera at the checkout station, pointed across the checkout conveyor to the area where the shopper stands, provides imagery that is analyzed to determine the position of the shopper's eyes. (The position of the camera in a reference frame is known, allowing pixel positions from its captured imagery to be correlated with real-world position.) With this information, the position at which certain information should be projected on the transparent surface—to align with a certain item as viewed by the shopper—can be geometrically computed.

The fixed camera may only collect 2D information, and may not be able to discern the shopper's position in a third dimension (i.e., towards or away from the camera). But this is generally not critical to placement of the projected information. If more accuracy is desired, one of the known depth-sensing camera arrangements can be employed.

A similar heads-up display arrangement can alternatively, or additionally, be provided for the checkout clerk (if any). However, since the clerk may need to manipulate certain items as part of the checkout, the presence of the transparent surface between the clerk and the items may be an obstacle. Better, for the clerk, is to wear a head-mounted display (HMD) that overlays the information on the image presented by the HMD, in augmented-reality fashion.

The HMD approach lacks the known camera position of the fixed camera arrangement. However, the camera is close enough to the wearer's eyes that parallax can be disregarded. This allows a one-to-one mapping between the camera and the display to be employed. For example, if an item appears in the center of the camera field of view, the overlaid information for that item is similarly presented in the center of the display.

(Widespread HMD use by clerks is expected to occur before widespread HMD use by the general public. However, when shoppers do routinely have HMD apparatuses, their HMDs can be used in lieu of the transparent medium approach.)

In both the transparent medium and HMD cases, still further accuracy in overlaying item information adjacent the corresponding item can be gained by identifying locations of known reference points in the camera field of view. SIFT/SURF/ORB-like approaches can be used for this, by matching feature points in a field of view to corresponding feature points in a reference set of imagery. The feature points may comprise static features that are commonly in the camera's field of view, e.g., corner points on the conveyor, other structural elements of the checkout station, credit card terminal, candy rack, adjoining checkout station, etc. Additionally or alternatively, reference markers (e.g., as detailed in patent publication 20110087497), placed at known positions, can be used. Such markers include calibrated features permitting their distance and pose (and reciprocally, the distance and pose of the camera) to be determined.

In the just-described embodiments, camera data is also used to identify the positions of items presented for checkout. This data can be captured by one of the cameras noted above (e.g., a fixed camera looking towards the shopper, to determine eye positions, or a HMD camera). Alternatively, a different camera can be employed (again, having a position that is known, or discernible by reference to known features). In the latter case, the field of view of the two cameras can be geometrically related by an appropriate transform.

Imagery from the above-noted cameras can also be used, by itself, or in conjunction with other sensor data, to identify the objects presented for checkout.

In accordance with another aspect of the technology, a checkout station is equipped with a horizontal display panel (e.g., LCD, plasma, etc.). The panel is desirably positioned where items being purchased by a shopper are placed on it, or moved over it, during checkout.

The panel is controlled by an associated processor/display driver to present item information relating to items above it. For example, if a can of soup is placed on the panel, the panel may present the price of the soup so that it is positioned next to the item (e.g., between the can and the shopper, in a font that is sized for easy viewing). Similarly, if the soup can is passed over the display, the price can be presented in animated fashion—following underneath the can as it moves. When the can passes off the panel, the price can be maintained at its final position, until a price for another item needs to take that position.

Instead of, or in addition, to price, the display panel may present other alphanumeric information, such as discount, expiration date, etc. It may also indicate whether the item has yet been recognized by the system. For example, if the item has not yet been identified, a red region can be presented on the display where the alphanumeric item information would otherwise be presented. Once the item has been identified, a green region can be presented (or the fact of item identification can simply be indicated by presentation of the alphanumeric information).

Figure 37:
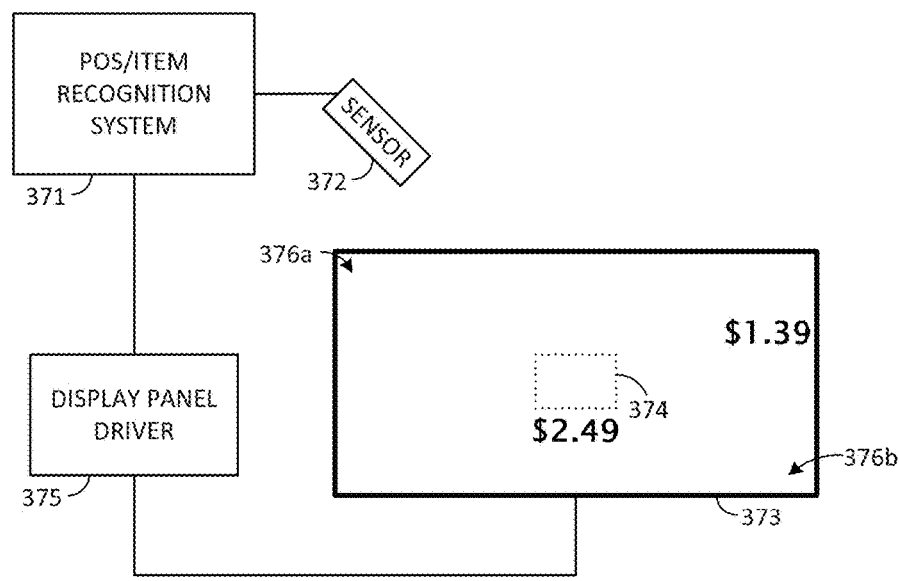

Such an arrangement is shown in FIG. 37. A point of sale system 371 includes an item recognition portion coupled to a sensor 372 (e.g., one or more cameras, etc.). A display panel 373 has an item 374 resting on it, which is recognized and determined by the POS station to have a price of $2.49 (e.g., by reference to a database system). The sensed position of the item, together with its determined price, is passed to a display panel driver 375, which causes this text to be presented on the display panel, adjacent the item. (Shown on the right edge of the panel is a $1.39 price left by another item that was recently removed off that edge, e.g., for bagging.)

In some embodiments, the display panel 373 can comprise a touch panel that both displays information and receives human input associated with item checkout. For example, the keypad presently found on the POS station may instead, or also, be presented on the touchpad panel, for operation by the clerk during the checkout process. A keypad may similarly be presented on the panel for operation by the shopper, e.g., to enter a bankcard PIN number, a shopper loyalty number, or other data entry. Such data-entry displays may be positioned in the corners 376a, 376b of the touch panel.

Providing a horizontal display panel at a checkout station requires a substantial reworking of existing checkout station hardware. In accordance with another aspect of the technology, a more modest arrangement is employed—one that is well suited to retrofitting of existing checkout stations.

In accordance with this aspect of the technology, a camera system captures imagery from items at a checkout station, as in other embodiments. However, instead of presenting visual feedback on a horizontal display panel underneath the items, this arrangement employs an array of elongated visual indicators (e.g., LCD displays, or LEDs) along an edge of the checkout station—such as along a checkout conveyor. The visual indicators are operated by a processor (responsive to input data from the camera system) to identify items that have not been identified. For example, red LEDs can illuminate adjacent items that the system has not yet identified. In a conveyor embodiment, the red indication can "follow" the item down the conveyor, until the system has identified it—at which time it changes to green. If the item reaches the checkout clerk and the adjoining LED is still red, the checkout clerk can reposition the item on the conveyor to aid in identification, or take other responsive action.

Figure 38A:
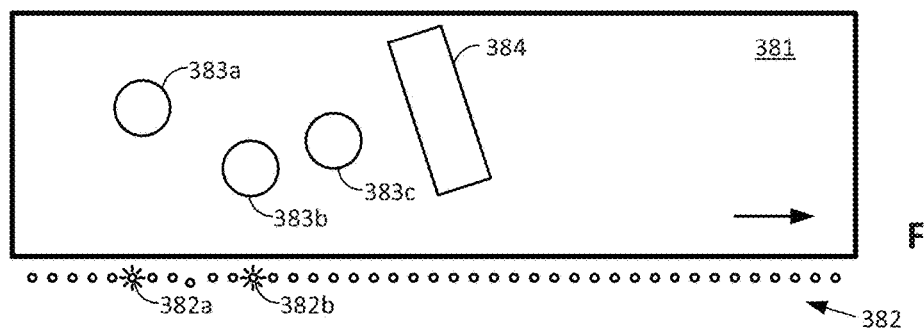

FIG. 38A is a partial plan view of such an arrangement. Three cans (383a, 383b, 383c) and a box (384) are traveling on a conveyor 381 towards the right. An array 382 of LEDs lines one side of the conveyor. LEDs 382a and 382b are illuminated in red—indicating that the adjoining two items (cans 383a and 383b) have not yet been identified. As the conveyor moves the cans, the red indicia follows them (until they are recognized, at which time such LEDs turn green).

Figure 38B:
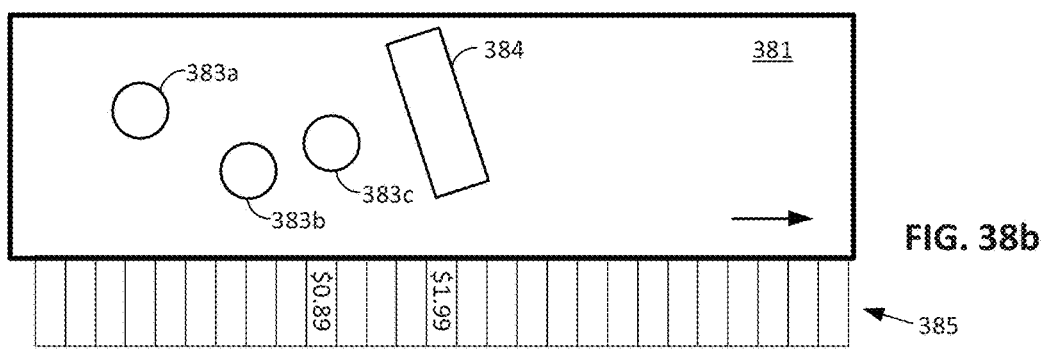

An alternative such embodiment presents price data adjacent the items as they travel down a conveyor, e.g., using an LCD display 385. FIG. 38B shows such an arrangement (not to scale). Items that haven't yet been recognized have no adjoining price display.

In accordance with yet another aspect of the present technology, a sensor system is employed at an exit area of a retail store (i.e., an area between the checkout station(s) and the exit door) to identify items of merchandise by reference to data sensed by the system. For example, the system may detect—by an RFID sensor, that a box of Tide laundry detergent is in the exit area, and may detect—by image fingerprinting or digital watermark decoding—that a package of disposable diapers is also in the exit area. Such data is checked against the store's database record of recent checkout transactions (e.g., in the past 2 or 5 minutes) to confirm that the identified item was the subject of a recent checkout transaction at a store checkout station.

Another aspect of the present technology concerns a collaborative checkout method, in which the shopper and the clerk both simultaneously present items for identification (e.g., to one or more scanners).

In a particular arrangement, items from the shopper's cart are partitioned into two flows. One comprises "easy" items that are reliably machine-identified without extra effort. These items include items in watermarked packaging, since such items commonly have watermarks on multiple different faces (e.g., canned and boxed items). This flow is handled by the shopper. The other comprises more difficult items, e.g., in which produce must be identified and weighed, or items that are lacking watermarking, etc. This flow is handled by the clerk. (The clerk may also assist with the first item flow.)

The partitioning may simply comprise the clerk reaching into the shopper's basket for items known to be more difficult to machine-identify—allowing the shopper to handle the other items. Alternatively, material handling technology can be employed, e.g., with cans and boxes being identified by shape and mechanically routed to the shopper, with all other items being routed for handling by the clerk.

As just suggested above, produce handling can be a bottleneck in grocery checkout. The clerk must visually identify the item, and then look up the current price—commonly in a guidebook or other unabridged listing. (Weighing is sometimes required as well.) Some produce may be easily identified, but other requires much more scrutiny. For example, a store may stock multiple types of similar-looking apples (some organic, some not).

To help relieve this bottleneck, one or more sensors are used to collect data from the produce. Sometimes the clerk may open a bag to present the produce to, e.g., an overhead camera. Sometimes the produce may be contained in a bag that is transparent at a particular sensing wavelength. In other arrangements, olfactory/chemical sensors are used.

From the sensor data, a class of the produce is recognized (e.g., by object recognition based on imagery, or chemical signature). The system may recognize, for example, that the bag contains apples. Based on the class, the system presents a listing of only the items in that class. For example, a POS display may present on a touch screen a display with just 5 tiles—one labeled with each apple type presently stocked by the store (MacIntosh, Red Delicious, Yellow Delicious, Fuji, and Braeburn), and associated price. The clerk touches the tile corresponding to the correct item, without having to browse a listing that includes bananas, oranges, etc. If the produce manager sells out of a particular type of apple, the POS system is alerted to this fact, and the tile for that type of apple is not thereafter presented to the clerk (until the item is restocked).

Such arrangement can similarly be employed for self-checkout, by the shopper.

Industrial fruit inspection techniques can also be used. For example, multi-spectral imaging can be used, in which fruit is illuminated with one or more known light sources, and reflection from the fruit is sensed at multiple different wavelengths (e.g., 450, 500, 625, 750 and 800 nm) It will be recognized that some of these are outside the range of human vision (e.g., 750 and 800 nm) LED light sources of different wavelengths can be used, operated in sequential fashion, or simultaneously. Some embodiments employ the infrared illumination provided by certain depth sensing cameras, to provide illumination.

Terahertz radiation and sensing can also be employed (e.g., in the 0.3-3 THz frequency range).

Classification techniques can additionally or alternatively be employed, wherein the store system is trained to recognize fruits of different types, by reference to training data (optical or otherwise) collected from known samples.

In one such arrangement, when a batch of produce arrives at a store, it is processed to identify a distinguishing multi-spectral optical or chemical signature—before produce from the batch is made available to customers. Such signature data is entered into the store's computer system—in association with data identifying the produce (e.g., by name, price, arrival date, supplier, etc.).

When, thereafter, any such produce is presented for checkout by a shopper, one or more sensors at the checkout station repeats the sensing operation. The collected data is checked against the reference data earlier collected—to identify a best match. If the produce is unambiguously identified, it is added to the checkout tally without further intervention (except, perhaps, weighing). If the sensed signature appears to potentially correspond to several reference items, tiles for each possible are presented on the clerk's touch panel, for selection among the presented options.

Another aspect of the technology concerns bulk items that are packaged at the time of shopper selection. An example is cold cuts from a deli counter.

In accordance with this aspect of the technology, a clerk employs a sheet of wrapping medium (e.g., butcher paper) that has been pre-printed to encode an identifier, by which that sheet can be distinguished from other such sheets. In one particular arrangement, the sheets are sold in packages of 250, and each is encoded with a different identifier (i.e., serialized).

The clerk wraps the cold-cuts in such a sheet, places it on a weigh-scale, and enters a product code on the scale UI. The product code identifies the product (e.g., Lebanon Bologna), and allows the system to recall the price for that item (e.g., $4.39/pound). From the per-pound price, and the weight, the scale computes the price of the item. This price can be shown to the shopper from the scale display, and reported to the shopper by the clerk.

The scale includes a camera that captures an image of the package, and extracts the wrapper medium identifier from such imagery. The scale sends the extracted medium identifier—together with the other product details (e.g., product code, product name, measured weight, price per pound, total price) to the store's central computer database for storage.

When the shopper later presents the packaged item for checkout, a camera system at the checkout station senses the identifier from the wrapping medium, and recalls from the store database the associated product particulars (product code, weight, price, etc.). The price is added to the checkout tally.

Sometimes—both with barcode scanning and other technologies—a single item may be twice-sensed when passing through a checkout station. This can occur, for example, when a product box has barcodes on two or more surfaces. Each barcode may be sensed, causing the system to conclude that multiple items are being purchased.

Checkout stations typically emit an audible alert each time an item is identified (e.g., a beep). To alert the clerk—or shopper—that a possible duplicate identification of a single item has occurred, the station can emit a distinctive tone when the same product identifier is sensed twice, and included twice on the checkout tally. Such distinctive tone can be of a frequency different than the usual beep, or it may consist of a chirp or other time-varying signal.

If a clerk (or shopper) finds that a product has been mis-counted, the error can be corrected by gesturing with the product. For example, the clerk (shopper) can make a shaking gesture with the product. This shaking gesture is sensed by a camera system at the checkout station. The system understands this gesture to indicate that the product has been added an extra time—erroneously—to the tally. It responds by canceling one of the duplicate entries for that item.

More gamification elements may be introduced into the shopping experience to make it less tedious. One approach is to steganographically mark one or a minority of items in a store with an identifier, which permits the item to be identified as a prize-winning item.

At checkout, imagery captured from items presented for purchase is analyzed to see if any is one of the prize-winning items. If so, a prize (e.g., a discount, special merchandise, or other premium) is awarded to the shopper.

Such arrangement can be practiced by applying stickers to several grocery items. Only one (or a few) of the stickers, however, encodes the steganographic identifier indicating it is a prize-winning item. To the shoppers, all of the stickers are indistinguishable. Analysis of the imagery at checkout, however, reveals the winners.

(While such "treasure hunt" promotions have previously been employed in supermarkets, they have usually relied on human-visible indicia revealed only when a product is opened for consumption. The winners can then return the winning indicia to the store—or mail it back to the producer—to redeem the prize. Such approach, however, led some consumers to open packaging in the store—looking for the winners—and leaving the non-winners opened on the store shelves.)

In accordance with another aspect of the technology, a shopper's mobile device is employed to identify items being purchased while the shopper is still in the shopping aisle.

In such arrangement, a camera of the mobile device captures imagery from each item to be purchased—either while the item is still on the shelf, or after it has been placed in a basket. The imagery is analyzed to produce identification data for such item.

If watermarking or fingerprinting is used, the product can typically be recognized regardless of its orientation (pose) relative to the camera. If, however, barcode reading is used, the shopper must commonly manipulate the item so as to present the barcode to the camera. (Items are rarely stocked with barcodes facing the aisle.) This manipulation may be a two-handed operation—one to hold the mobile device and one to turn the item. Fingerprint- and watermark-based item identification, in contrast, can commonly be done single-handedly—pointing the camera to whatever surface of the item is facing the camera, from the shelf or cart.

The shopper's mobile device can be executing a branded application—such as a Wal-Mart app—that performs the item recognition task (optionally in conjunction with a partner processor in the cloud, e.g., matching image fingerprint data, or looking-up barcode/watermark payloads). The shopper can sign-in to the app with a loyalty shopper number, or other identifier.

In some arrangements, the device launches an app appropriate to the store based on sensed context information. For example, the device may track its location (e.g., by GPS), and if it finds its location is in a Wal-Mart store, it can launch the Wal-Mart app. In contrast, if it finds its location is in a Target store, it can launch the Target app.

Context other than location can be used. For example, audio sampled by the mobile device microphone can be analyzed to extract identifying information. A Target store, for example, may play a digitally-watermarked music track in its stores that allows mobile devices to discern that they are in a Target store. (Shopkick works on a similar principle, e.g., as detailed in its patent publication 20110029370.)

When the shopper arrives at a checkout station, the tally of items in the cart is transferred to the store computer (if same wasn't done previously, e.g., in real-time as the items were identified). The tally can be transferred wirelessly (e.g., Bluetooth or Zigbee), by RFID, optically, or otherwise. Optical transmission can be by a series of visible indicia (e.g., barcodes or watermarks), each briefly displayed on a display of the mobile device (e.g., for a fifth, tenth or twentieth of a second), and sensed by a camera/scanner at the checkout station (essentially, a movie of barcodes/watermarks). If the mobile device is a head-mounted display, the series of visible indicia may be projected (e.g., from the HMD) onto the counter or other surface, for capture by the checkout station camera. A store clerk—if present—can facilitate payment and bagging. Or these, too, can be handled by the shopper in self-serve fashion (e.g., with payment completed using the mobile device).

In accordance with a further aspect, the technology includes capturing imagery from an item, and processing the captured imagery to extract first data encoded in a first machine readable form. By reference to this extracted first data, information is obtained about second data encoded in a second machine readable form different than the first. The captured imagery is then processed to extract that second data—using the just-obtained information. In such arrangement, one or both of the first or second machine readable forms can comprise a steganographically-encoded digital watermark.

Additional Details of One Particular Embodiment

This particular embodiment involves an item at a checkout station that is moved along a path, such as by a conveyor or by a human A first camera arrangement captures first 2D image data depicting the item when the item is at a first position along the path. (Suitable 2D imaging scanners are provided, e.g., by DataLogic ADC INC., located in Eugene, Oreg.)

The moving item includes a digital watermark pattern printed or carried on the product packaging. In this particular embodiment, the digital watermarking spans a substantial portion of the packaging extent. In regions where there is no printing (e.g., white space), a yellow or other unobtrusive watermark tint is applied. (Yellow watermarking is particularly discussed, e.g., in Digimarc's published patent application 20110274310 and U.S. Pat. No. 6,345,104.)

The following discussion concerns both enhancements to watermark embedding and watermark detection for this particular application scenario.

Consider, first, general color embedding. In offset printing, a spot color is generated without a screens or dots. Colors are usually generated by printing cyan, magenta, yellow, or black using a single run, but sometimes extra colors are added to print spot colors which are not combinations of CMYK. Care must be taken when altering a cover image that contains spot colors. (An image that is to be encoded to convey a digital watermark pattern is commonly called a host, or cover, image.) Further, there might be constraints on the ink densities that are allowable at each pixel. Traditional watermark embedding, which usually alters pixel values in the RGB space, may not work well for packaging and other materials printed using spot colors. In particular, it can produce objectionable artifacts in these uniformly-colored spot color areas. The present embodiment employs a different method that embeds a watermark in an optimal ink color direction, to make these artifacts much less visible.

Some watermark embedders use the sRGB color space, which spans a limited gamut that will not handle the extended dynamic range of packaging printed with spot colors. By directly modifying the spot color ink densities, the color accuracy and gamut of the cover image are maintained. By changing two inks, we can construct a closed form for the optimal color direction of a grayscale embedder by using a local linear approximation. Extension to other definitions of watermark signal is also discussed.

More particularly, this embodiment embeds a watermark signal in a printed image by changing ink densities. By modifying combinations of inks, we can construct a signal in different color directions. The perceptibility of the change is measured with a visibility function which is just length in a modified version of the Lab color coordinate system. Obviously there is a tradeoff between visibility and watermark detection robustness, but below certain level of distortion, we would like to maximize the watermark signal that we insert that meets this visibility constraint.

An example watermark embedder takes a color image and converts it to gray scale image as a starting point for message modulation. We generalize this by allowing a more general function of color space. For example, we might create a U detector (from YUV color space) which has a watermark signal embedded in $S_U(R,B,G)=(-0.15\ R)+(-0.29\ G)+(0.44\ B)$. We call this signal definition the watermark signal ($S_{wm}$), for short.

Once the watermark signal is defined, we can construct the embedder which finds the optimal ink changes to maximize watermark signal for a given visibility constraint. This optimal ink mix depends on the definition of both the watermark signal and the visibility function. We describe an enumerated (e.g., brute force) optimization that will work for any color combinations.

Changing the available inks in a small region R allows one to change the original base color to a color in a subset of the full gamut available on the printer. If N inks are available for watermark signal insertion, then the set of all ink combinations, which we denote by $\Sigma_{ink}$, is a bounded N dimensional set. Given a point in $\Sigma_{ink}$, we can combine the inks to get a color. The space of all available colors for R, which we denote by $\Gamma_{ink}$, is a subset of the full printer gamut. The watermark signal is a real valued mapping on the color gamut $\Gamma_{ink}$. For example we could define a watermark signal function by $S_{Grey}(R,G,B)=((R+G+B)/3)$ which maps a pixel color to a grayscale. The definition of $S_{Grey}$ is given in sRGB coordinates but should be smooth across the entire printer gamut.

From the original color location, the visibility increases as we change the ink density. We choose from $\Sigma_{ink}$ the ink combinations that have acceptable visibility. The set of colors generated by these ink combinations is the compact set $\Gamma_{ink}$, and the watermark signal function $S_{wm}$ has a maximum and minimum on $\Gamma_{ink}$.

Figure 39A:
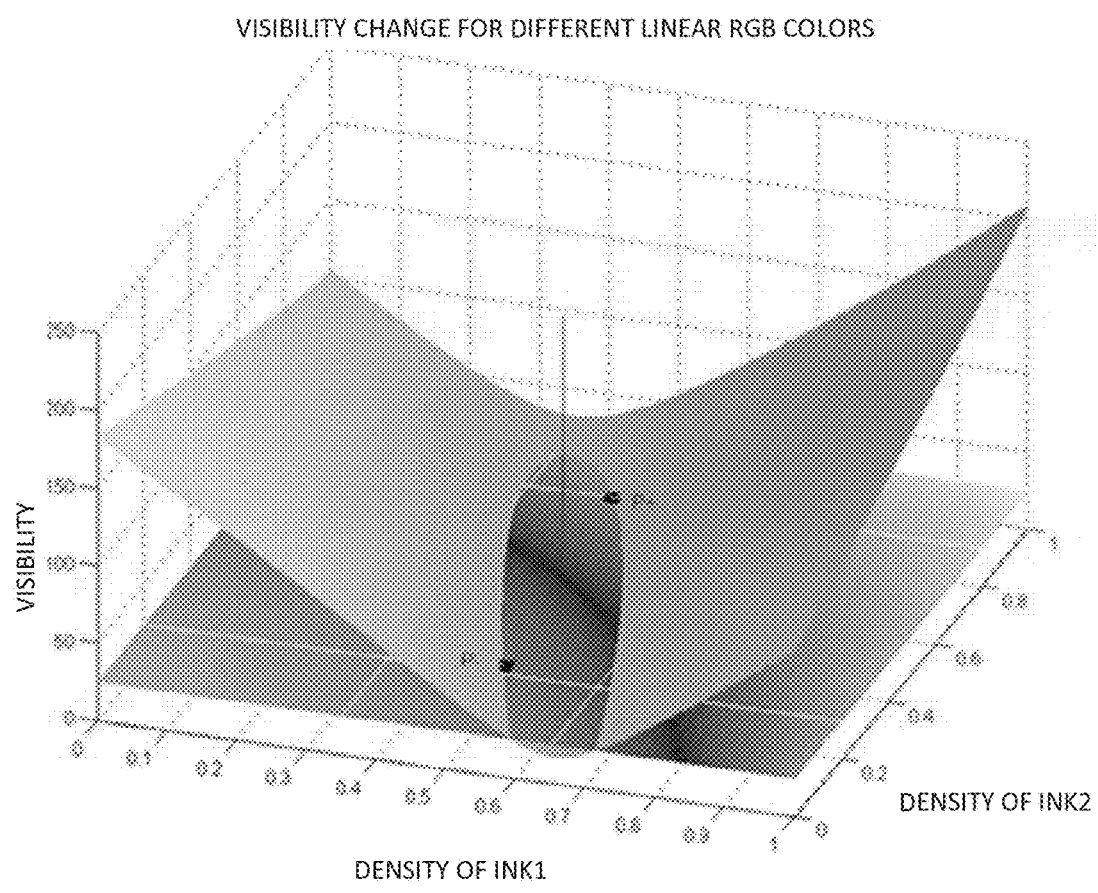

If only two inks are available at a point, then changing these two inks will typically result in a two dimensional surface of the available colors, and both $\Sigma_{ink}$ and $\Gamma_{ink}$ are two dimensional. In this case we can think of $\Gamma_{ink}$ as a two dimensional surface in three dimensional color space. In FIG. 39A we show an example plot of how visibility changes when two inks are combined. It is important to emphasize that this graph is the possible range of values for one particular pixel on the image. The colors of the plane in the plot are the actual colors generated by the various combinations of ink densities. The flat gray plane is a plane of constant visibility and has gray values that indicate the change, $\Delta S_{wm}$, in the watermark signal. The watermark signal in this case is defined by $S_{wm}(R, B, G)=(R+G+B)/3$. The white lines in the gray plane indicate extra ink constraints for these two inks, and the tall vertical black line in the center of the plot indicates the starting base color. The pool of values below the gray visibility plane are ink density pairs that are within the acceptable visibility constraint. The two points (P+, P−) in this pool with the largest signal are the optimal points for watermark embedding (corresponding to positive and negative $\Delta S_{wm}$) and are indicated by black squares.

The optimum points (P+, P−) have changes mainly in ink 2. As we raise the visibility constraint, the gray plane of acceptable visibility will rise and the gray pool of acceptable ink values (at the center) will grow larger. But at each visibility, the goal is to find the points in the acceptable visibility pool that have the largest positive and negative watermark signal.

Figure 39B:
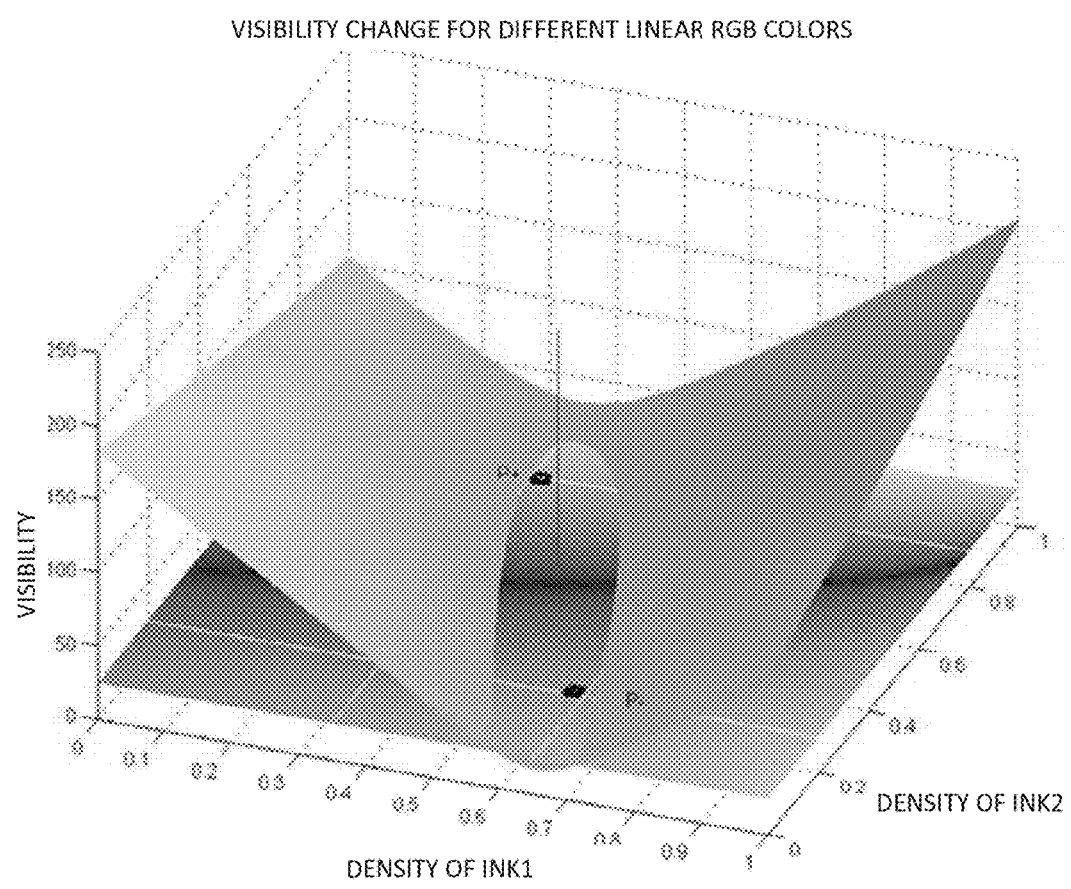
Figure 40A:
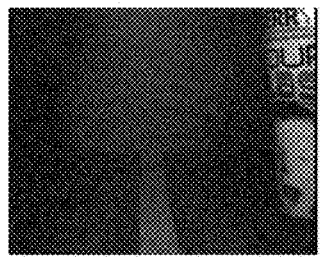
FIGS. 40A-40F show six images captured from a checkout camera when sweeping a soft drink can for checkout (at a medium pace of sweeping, by a non-professional checker).
Figure 40B:
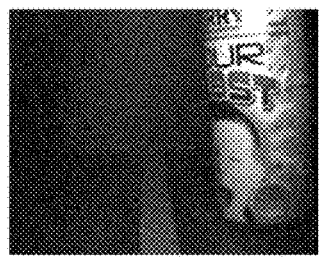
Figure 40C:
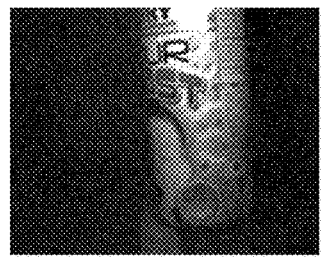
Figure 40D:
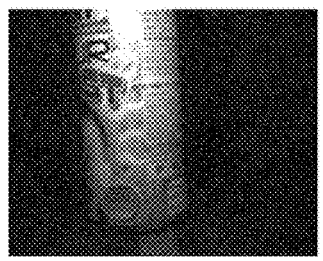
Figure 40E:
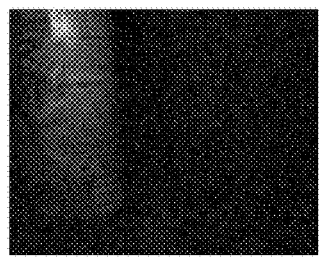
Figure 40F:
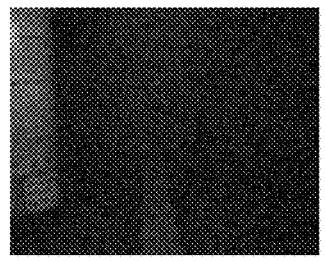

In FIG. 39B we show the same color point with the same visibility and ink constraints, but we change the watermark signal to the function $S_{wm}(R,B,G)=(-0.15\ R)+(-0.29\ G)+(0.44\ B)$. One can insert a larger watermark signal, and the ink constraints are the limiting factor. In this case, it is clear that the optimal positive watermark signal corresponds to increasing ink 2 but decreasing ink 1.

We define a mapping $L: \Sigma_{ink} \to \Gamma_{ink}$. We write the color set $\Gamma_{ink}$, in Lab or some other perceptually uniform color coordinates.

In the case of two inks we can derive a precise formula. We construct the Jacobian of the mapping L. In this case, our pools of acceptable visibility are ellipses. There is a closed form for the optimal grayscale value on this ellipse. If $c_r$ is the color of cover image, then we take the Jacobian derivative of L at $c_r$. Let $u_1, u_2$ in $\Sigma_{ink}$, be changes along ink 1 and ink2 respectively. We define quantities, $$E(c_r)=J_L(c_r)u_1 \cdot J_L(c_r)u_1, F(c_r)=J_L(c_r)u_1 \cdot J_L(c_r)u_2,$$
$$G(c_r)=J_L(c_r)u_2 \cdot J_L(c_r)u_2.$$

The ink change vectors $\alpha\ u_1+\beta\ u_2$ that meet a visibility constraint $R_v$ can be written in terms of E, F and G, $$R_F^2 = \alpha^2 E(c_r) + 2\alpha\beta F(c_r) + \beta^2 G(c_r)$$

This is an ellipse. If we assume a grayscale watermark signal then using Lagrangian multipliers we can find the optimal embed points in terms of $\lambda$ which is linear in the visibility $R_v$, $$\begin{bmatrix} \alpha \\ \beta \end{bmatrix} = \lambda \begin{bmatrix} G(w \cdot v_1) - F(w \cdot v_2) \\ -F(w \cdot v_1) + E(w \cdot v_2) \end{bmatrix}$$

where $$w = \frac{1}{\sqrt{3}}(1, 1, 1)^t$$

Now back to some checkout scenarios. Recall from above that an item to be purchased moves along a path, such as a conveyor. A first camera arrangement captures image data depicting the item when the item is at a first position along the path.

This next section discusses a prioritization of watermark titles in captured image data (e.g., 30 frames or more per second) fed to a watermark detector. Sometimes, a digital watermark detector is fed a video feed of much larger resolution (e.g., 1024×1280 pixels) than what is covered by a watermark tile detector (e.g., 256×256 pixels). If a detector is looking at single-blocks (tiles), then the detector may run multiple times for every frame to analyze each tile. Given the resource constraints of the hardware (e.g., embedded device, ARM processor, etc.), it may be difficult to process the whole area of every frame in a timely manner (e.g., as packaged items are buzzing by on the conveyor past the camera). Therefore, it is beneficial to limit the number of single-block analyses running on every frame, and to present those image blocks most likely to have decodable watermark data before less promising blocks.

This may not be an issue for well-marked large packages, because they fill large portions of the camera field of view, and thus the chance that a single block detector is placed on a watermarked area is high. On the other hand, small packages, like cans and small boxes (e.g., a tea box), may only occupy a small portion of the whole field of view, as shown in FIGS. 40A-40F, making the chance of a single block detecting being placed on a well watermarked area very low.

During a normal checkout pace, when the camera is running at its normal speed of 30 FPS, a typical small package will show up in 2 to 4 frames with good presence, as shown in FIGS. 40A-F. Since a small package covers a small area of the camera's field of view, the strategy of reading the watermark from many blocks may have diminishing returns in terms of complexity vs. robustness. Most possibly, the detector will spend time looking for a watermark in background areas of the image, or in blocks spanning the package boundary, but not on the package itself.

It will be recognized that the entering frame (FIG. 40A) and the leaving frame (FIG. 40F) are not considered good for watermark detection, e.g., since the item occupies such a small fraction of the image frame.

For this camera system, where the input is a video stream, we have found that background subtraction from moving averages of previous frames is a computationally efficient and effective method to extract the fast moving foreground objects. This method separates static or slow moving objects (classified as background) from fast moving objects (classified as foreground), and focuses the computational resource on the more meaningful foreground objects.

The foreground detection works as follows:

Background(k+1)=alpha*Frame(k+1)+
    (1−alpha)*Background(k),                          1.

Foreground(k+1)=Frame(k+1)−Background(k+1), if
    Frame(k+1)−Background(k+1)>threshold,             2.

where indices k or k+1 represents the incoming frame's temporal axis, alpha is the learning rate which controls how to update background from the incoming frame, and the threshold is to suppress any noise from illumination variations.

This process is computationally efficient because it simply uses pixel-wise subtraction, addition and comparison. Also, its memory usage is low, since it does not require saving all previous frames, but only an average of most recent frames. By efficient post-processing and clustering the results of each pixel (or groups of pixels), approximate information about location/shape of the foreground object can be obtained. All processing is done in real time.

The location/shape of the object can be utilized to constrain the area where the detector needs to be placed. Significant savings in the complexity can be achieved without losing detection robustness.

Figure 41A:
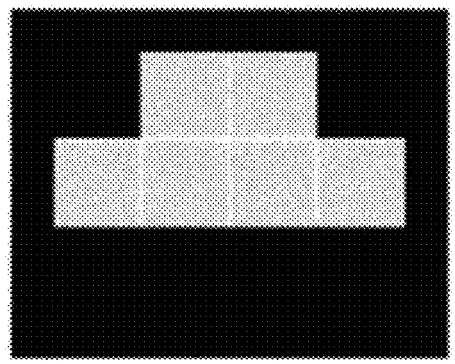
FIGS. 41A and 41B show a "B17" block pattern used to select candidate blocks of imagery for watermark decoding.
Figure 41B:
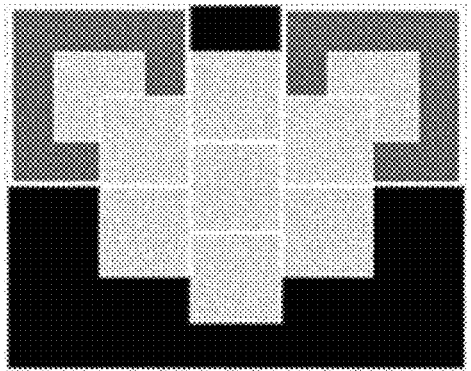

Once the foreground region has been detected, we can assign detection blocks to locations in the imagery to enhance detection. For example, a static pattern, nick-named B17, is shown in FIGS. 41A and 41B. FIG. 41A shows the location of 6 blocks, and FIG. 41B shows the location of 9 more. Two additional, larger blocks (corresponding to watermark tiles that are twice as large in each direction as tiles for the other blocks) bring the total number of blocks to 17.

One option is to use the detected foreground region to mask the blocks of the B17 pattern. That is, for each of the 17 blocks, such block is processed for watermark detection only if it falls inside the foreground region.

Another, second option is a bit more complex.

First, the detected foreground region is expanded to a square window, encompassing all the foreground pixels. Then the square foreground region is divided into equally spaced zones (e.g., one, four, nine, etc.—whichever yields zones most similar in size to the 15 smaller blocks of the B17 pattern). The foreground pixels (i.e., incoming pixel values from the camera, minus averages of corresponding pixels in previous frames) inside each zone are summed together. This summation is a representation of the illumination of the foreground in each zone.

Second, two other approaches are used to prioritize the placement of single block detectors (i.e., areas in which the watermark detector will look for watermark signal) inside the square foreground region, because the number of single block analysis areas may not be enough to cover the whole region. The first approach is based on illumination (or brightness). If the zones are ranked according to their illumination, those of high rank may indicate good illumination and those of low rank may indicate poor illumination. We would prefer not to place the single block detectors on poorly illuminated zones. Also we may decide to discard zones with extreme high illumination values because they indicate over-saturated pixels from glare (caused, e.g., by specular reflection from the packaging by the scanner illumination). An ordered ranking of the remaining zones is established, and pixels for these zones are sent in that order to the watermark decoder for processing.

The second approach is based on the geometric position of each zone. In some cases, the areas at the top and bottom of the image frame detect poorly, due to over-saturated pixels on the top (i.e., those nearest the illumination source) and poorly-illuminated pixels on the bottom (i.e., those most remote from the illumination source). So we assign a weight to each zone based on its geometric location within the frame. For example, center blocks may be weighted more significantly than edge blocks. Or edge blocks may only be consulted if no signal is found in center blocks. Again, a ranking of the different zones, based on these criteria, is established, and pixels for these zones are sent in that order to the watermark decoder for processing.

To merge the two approaches, we can combine a ranking based on the normalized illumination value of each zone with a ranking based on geometric position, yielding a hybrid ranking Those zones that appear most likely to contain a decodable watermark signal are sent to the decoder in an order established by such hybrid ranking.

Another option is illustrated in FIGS. 42A-42J. These illustrations are based on a sequence of images captured while a coffee can was passed in front of a camera.

Each of FIGS. 42A-42J is a composed frame based on one of the images in the sequence. Each Figure is composed of (a) the incoming frame, shown in the upper left quadrant, (b) the detected square foreground region, shown in the lower left quadrant, and (c) the single block detectors overlaid on top of the incoming frame, shown in the upper right quadrant. (The lower right quadrant is nil.) The minimum offset between the selected blocks is set to a predetermined pixel value, e.g., 64 pixels, to avoid choosing blocks with a large overlap (i.e. blocks that are from similar image areas).

Preliminary experiments have been conducted to verify the process. The test datasets used are ad-hoc captures from non-professional checkers. There are two datasets, one named YangScan and the other named BeckyScan. The YangScan dataset contains mostly small packages (cans) and comprises 1025 frames of about 30 seconds recording from a digital camera, while the BeckyScan dataset contains both small and large packages and comprises 596 frames. The BeckyScan dataset contains more frames depicting packages, so it has more frames in which watermarks were detected.

The results of using the first option, which uses the foreground region to trim down the B17 pattern, are shown in Table I. There are 168 frames and 53 frames detected as containing watermark from BeckyScan and YangScan datasets, respectively, using the fixed static B17 pattern. By switching to the flexible foreground trimmed B17, to get the same detection rate, on average, only 10 frames are required for BeckyScan, and only 7 frames are required for YangScan. Since YangScan contains more small packages, and the benefits of using foreground detection are more obvious on small packages, the saving in terms of number of blocks per frame is more significant for YangScan.

TABLE I

|  | 168 frames detected with flex pattern | 168 frames detected with fixed pattern |
|---|---|---|
| BeckyScan | 2680/275 = 9.75 blocks/frame | 17 blocks/frame |
|  | 53 frames detected with flex pattern | 53 frames detected with fixed pattern |
| YangScan | 978/162 = 6.04 blocks/frame | 17 blocks/frame |

Figure 43A:
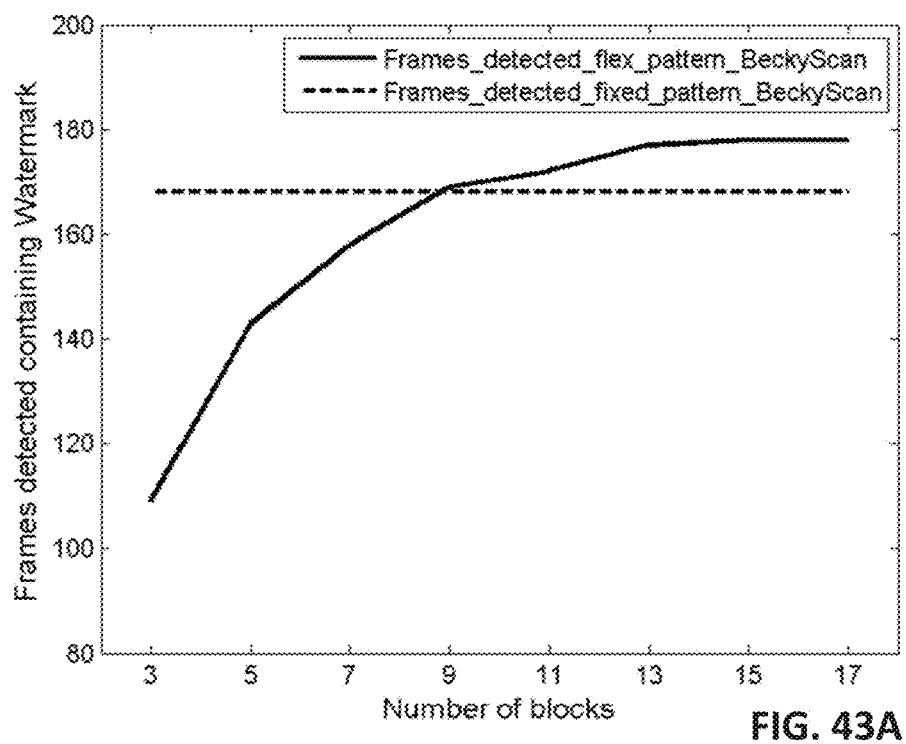
FIGS. 43A and 43B are graphs detailing results achieved with different detection approaches.
Figure 43B:
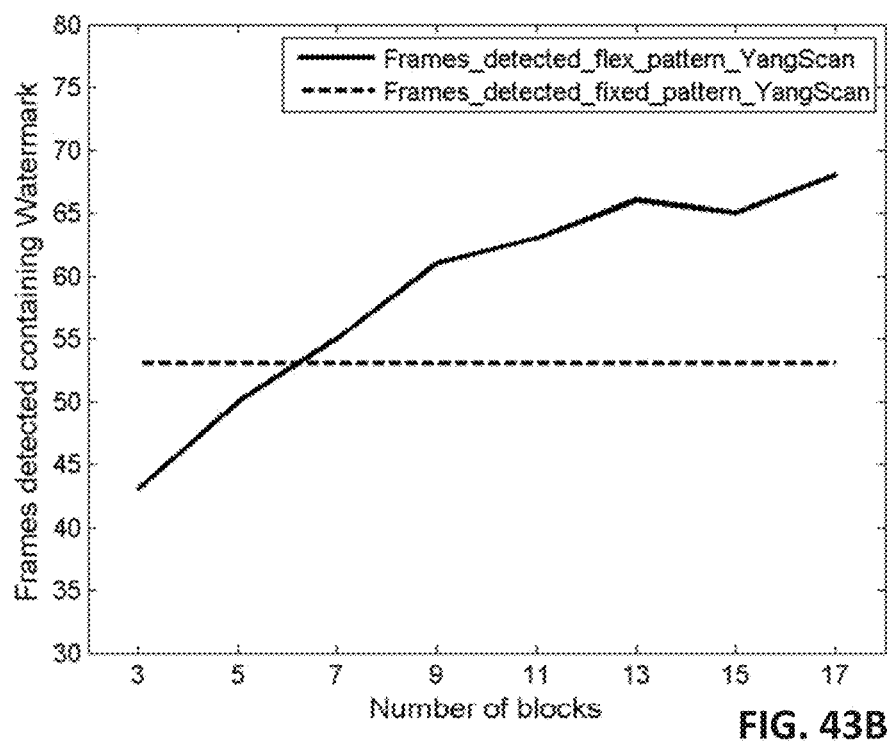

The results of using the second option are shown in FIGS. 43A and 43B, which compare flexible pattern from foreground (Option 2) with fixed static pattern, in placing single block detectors.

The straight lines in FIGS. 43A and 43B mark the number of detected frames from BeckyScan and YangScan datasets using the static B17 pattern, 168 and 53, respectively. The curves indicate the number of detected frames when choosing different numbers of blocks placed inside the foreground region. In general, if there are enough detector blocks, say, e.g., 17, then the flexible block pattern gives better detection results. And if the number of detector blocks is reduced, say, e.g., down to 9, the flexible block pattern still provides a good detection rate with much reduced computational cost.

In other cases we implement a "smart watermark detector"—one that can train itself based on user or cashier habits or preferences. For example, through a series of training check-out runs, it is determined that cashier 1 holds packaged items at a certain angle, or at predetermined distances from the camera, or at a certain swipe speed, or places items on a conveyor at certain orientations. Other training information may include, e.g., proximity to the scanner, speed of scanning, production rotation habits, professional vs. amateur checker, etc. Or the detector may determine that it is only getting watermark reads from certain block areas when a certain checker checks out. All this information (or subsets of this information) can be used to adjust the watermark detector, e.g., by determining which blocks to prioritize in a detection process. For example, it might be found that cashier 1 commonly swipes items in front of the camera so that the packages are in the top or bottom of the field of view. Whereas, above, these block areas would typically be given low prioritization. But if the detector knows that the cashier is cashier 1, then these areas can be more highly prioritized.

A user's self-checkout habits—including how and at what speed they present objects to the check-out camera—can be monitored and stored for later use in configuring a watermark detector, e.g., by prioritizing certain block selections for watermark detection. A user's store loyalty card ID can be associated with a database or other record that stores such information, enabling the proper detector prioritization. Such information can then be used to inform the watermark detector on how to better process imagery when that person is checking out.

Some checkout stations will continue to monitor barcodes even if supplemental symbologies like watermarking are present during checkout. In these case, consider the flowing flow:

1. Imagery is presented to a watermark detector.
2. The watermark detector analyzes the imagery and detects a watermark. The watermark may include a payload or index or other information.
3. A process is invoked that utilizes that watermark information to create an image overlay for captured imagery. The image overlay preferably includes a barcode or other symbology that includes the watermark information, or information obtained from utilizing the watermark information. That way, if the same imagery that was analyzed for a digital watermark is then fed to a barcode reader the graphic overlay barcode will be easily recognizable even if the depicted product packaging did not display a barcode.

One challenge may occur if two or more of the same packaged items are within a single image frame. For example, 2 cans of Diet Mountain Dew might be pictured in the same frame. The watermark detector finds a read, but in different, non-contiguous image areas. In such cases a watermark payload may be used to look up a spatial template. The spatial template is sized roughly to represent a particular item (e.g., diet soda). The spatial template is placed around a block area where watermarks were detected. If watermarks (or watermark components like orientation components) are located outside of the spatial template then there is a likelihood that the image frame includes two or more watermarked objects.

The cashier can be warned to examine this area more carefully, or the system may make a determination independently to ring up two items.

In another implementation, the checkout camera includes or cooperates with special illumination. The illumination projects watermark orientation information (e.g., a grid, which may be steganographic) on the packaging. The projected illumination is captured along with the packaged items. The projected grid is deciphered by the watermark detector to help determine orientation information include relative depth, orientation, etc. This information can be used in watermark detection, or foreground/background decisions.

In still another implementation, watermark information is used to identify certain areas on packaging. For example, a watermark signal (e.g., an orientation component) might be used to outline the nutrition facts on a package. The watermarked area is then used to create a spatial position on a reading device (in this case, e.g., a smartphone like an iPhone or Android device). An augmented reality display is overlaid on the watermarked area.

Feature Recognition

Certain implementations of the detailed technology employ recognition of robust feature descriptors (e.g., SIFT, SURF, and ORB) to aid in object identification.

Generally speaking, such techniques rely on locations within imagery where there is a significant local variation with respect to one or more chosen image features—making such locations distinctive and susceptible to detection. Such features can be based on simple parameters such as luminance, color, texture, etc., or on more complex metrics (e.g., difference of Gaussians). Each such point can be represented by data indicating its location within the image, the orientation of the point, and/or a feature vector representing information associated with that location. (A feature vector commonly used in SURF implementations comprises 64 data, detailing four values of luminance gradient information for each of 16 different square pixel blocks arrayed around the interest point.)

Such image features may comprise individual pixels (or sub-pixel locations within an image), but these technologies typically focus on 2D structures, such as corners, or consider gradients within square areas of pixels.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are robust to image scale, rotation and affine transformation. They are also robust to changes in illumination, noise, and some changes in viewpoint. In addition to these properties, they are distinctive, relatively easy to extract, allow for correct object identification with low probability of mismatch, and are straightforward to match against a (large) database of local features. Object description by a set of SIFT features is also robust to partial occlusion; as few as three SIFT features from an object are enough to compute its location and pose.

The technique starts by identifying local image features ("keypoints") in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient is calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with σ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints of different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with σ 1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25% to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure is Bonato et al, "Parallel Hardware Architecture for Scale and Rotation Invariant Feature Detection," IEEE Trans on Circuits and Systems for Video Tech, Vol. 18, No. 12, 2008. Another is Se et al, "Vision Based Modeling and Localization for Planetary Exploration Rovers," Proc. of Int. Astronautical Congress (IAC), October, 2004.

Published patent application WO07/130688 concerns a cell phone-based implementation of SIFT, in which the local descriptor features are extracted by the cell phone processor, and transmitted to a remote database for matching against a reference library.

While SIFT is perhaps the most well-known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A feature vector commonly used in SURF implementations comprises 64 data, detailing four values of luminance gradient information for each of 16 different square pixel blocks arrayed around the interest point.)

ORB feature-based identification is detailed, e.g., in Calonder et al, BRIEF: Computing a Local Binary Descriptor Very Fast, IEEE Transactions on Pattern Analysis and Machine Intelligence, Vol. 34, No. 7, pp. 1281-1298; Calonder, et al, BRIEF: Binary Robust Independent Elementary Features, ECCV 2010; and Rublee et al, ORB: an efficient alternative to SIFT or SURF, ICCV 2011. ORB, like the other noted feature detection techniques, is implemented in the popular OpenCV software library (e.g., version 2.3.1).

Other Remarks

Having described and illustrated the principles of our inventive work with reference to illustrative features and examples, it will be recognized that the technology is not so limited.

For example, sensing and other processes described as taking place at one location (e.g., a checkout station) may additionally, or alternatively, be conducted elsewhere (e.g., in a shopper's cart, in a store aisle, etc.).

Naturally, data from the sensors can be relayed to a processor by a variety of means—including both wired (e.g., Ethernet) and wireless (e.g., WiFi, Bluetooth, Zigbee, etc.).

Technologies described with reference to fixed systems (e.g., a POS terminal) can instead be implemented through use of portable devices (e.g., smartphones and headworn devices). Technologies described with reference to smartphones can likewise be practiced with headworn devices (e.g., the Google Glass device).

For expository convenience, parts of this specification posit that a retail store (e.g., a supermarket) has two essential portions: the checkout portion, and a shopping portion. The former comprises the checkout station (which can include any or all of a POS terminal, conveyor, cash drawer, bagging station, etc.), and the adjoining areas where the shopper and clerk (if any) stand during checkout. The latter comprises the rest of the store, e.g., the shelves where inventory is stocked, the aisles that shoppers traverse in selecting objects for purchase, etc.

As noted, while many of the detailed arrangements are described with reference to conveyor-based implementations, embodiments of the present technology can also be used to inspect, identify and inventory items presented by hand, or carried on the bottom of a shopping cart, etc. Indeed, item inventory and payment needn't be performed at a conventional checkout counter. Instead, items may be identified in the cart (or while being placed in the cart), and payment can be effected at any location—using the consumer's smartphone.

Although the specification discusses various technologies in connection with decoding watermark data from product packaging in retail settings, it will be recognized that such techniques are useful for the other identification technologies and other applications as well.

Off-the-shelf photogrammetry software can be used to perform many of the operations detailed herein. These include PhotoModeler by Eos Systems, Inc., and ImageModeler by AutoDesk. Similarly, certain implementations of the present technology make use of existing libraries of image processing functions (software). These include CMVision (from Carnegie Mellon University), ImageJ (a freely distributable package of Java routines developed by the National Institutes of Health; see, e.g., en<dot>Wikipedia<dot>org/wiki/ImageJ; the <dot>convention is used so that this text is not rendered in hyperlink form by browsers, etc.), and OpenCV (a package developed by Intel; see, e.g., en<dot>Wikipedia<dot>org/wiki/OpenCV, and the book Bradski, Learning OpenCV, O'Reilly, 2008). Well-regarded commercial vision library packages include Vision Pro, by Cognex, and the Matrox Imaging Library. Edge detection, ellipse-finding, and image segmentation are a few of the many operations that such software packages perform.

Some embodiments advantageously employ compressed sensing techniques. As is familiar to artisans, compressed sensing allows representation and processing of imagery with greatly-reduced data sets. See, e.g., Candes et al, An Introduction to Compressive Sampling, IEEE Signal Processing Magazine, March, 2008, 10 pp. Similarly, known computational photography techniques are widely useful in processing imagery for object identification.

Data captured by cameras and other sensors (and information derived from such sensor data), may be referred to the cloud for analysis, or processing may be distributed between local and cloud resources. In some arrangements, cloud processing is performed in lieu of local processing (or after certain local processing has been done). Sometimes, however, such data is passed to the cloud and processed both there and in the local device simultaneously. The cloud resource may be configured to undertake a more detailed analysis of the information than is practical with the time and resource constraints of a checkout system. More particularly, the cloud resource can be configured to learn from the sensor data, e.g., discerning correlations between certain barcodes, watermarks, histograms, image features, product weights, product temperatures, etc. This knowledge is occasionally downloaded to the other devices, and used to optimize their operations. (Additionally, a cloud service provider such as Google or Amazon may glean other benefits from access to the sensor data, e.g., gaining insights into consumer shopping behavior, etc. (subject to appropriate privacy safeguards). For this privilege, they may be willing to pay the retailer—providing a new source of income.)

Figure 7:
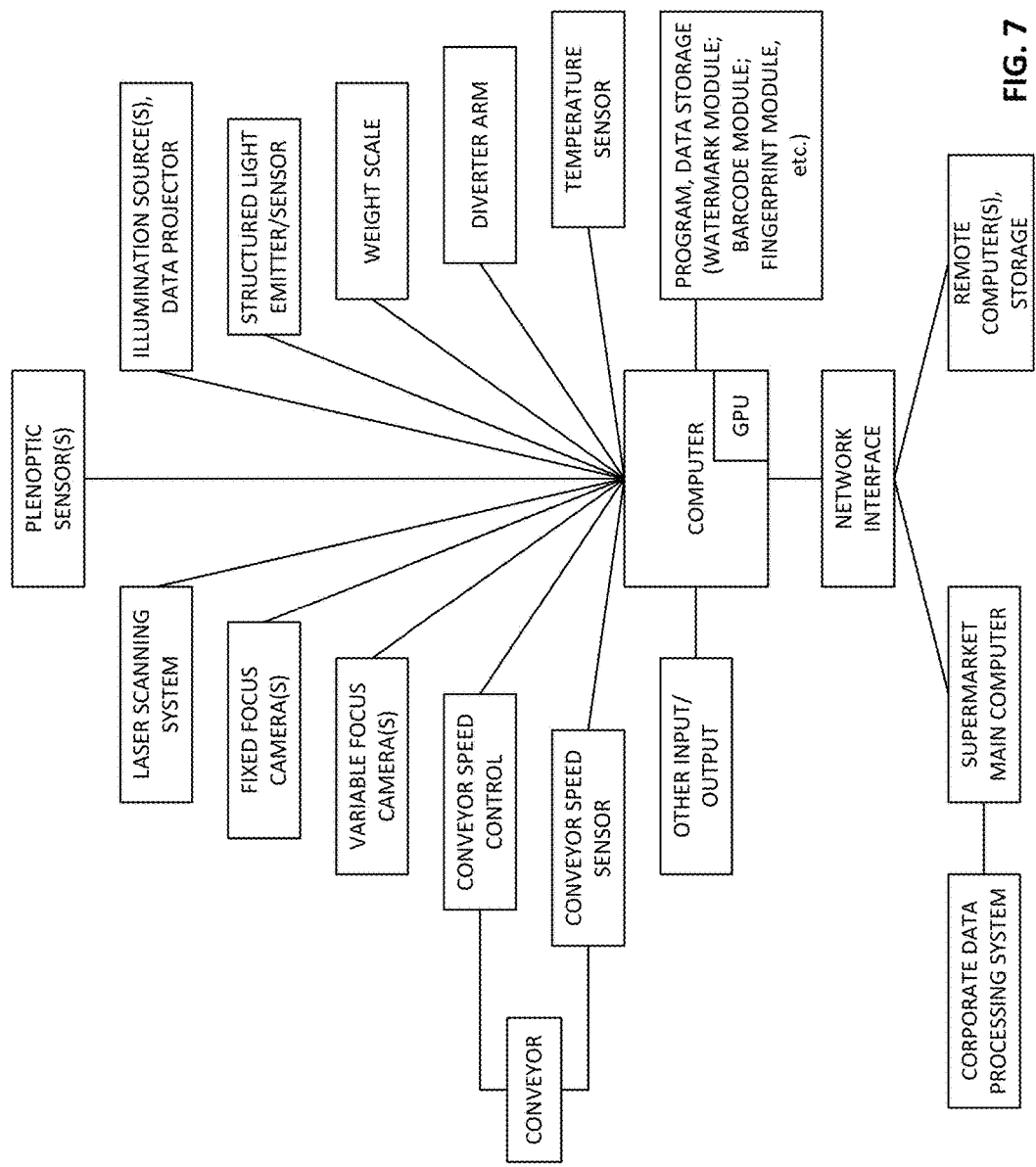
FIG. 7 shows a schematic illustration of a hardware arrangement of a particular embodiment.

Although the specification does not dwell on the point, the artisan will understand that aspects of the detailed technology can form part of a point-of-sale (POS) station, which typically includes a keyboard, a display, a cash drawer, a credit/debit card station, etc. The station, in turn, is networked with a main store computer system, which commonly includes a database system accessible by the POS stations. In turn, the main store computer system is typically networked across the internet, or otherwise, with a corporate data processing system. (A block diagram showing some of the system components is provided in FIG. 7.)

Known supermarket checkout systems, such as those by Datalogic, NCR, Fujitsu, etc., can be adapted to incorporate some or all of the technology detailed herein.

Reference was made to image segmentation. Techniques in addition to those detailed above are familiar to the artisan, including thresholding, clustering methods, histogram-based methods, region-growing methods, edge detection, etc.

Technology for encoding/decoding watermarks is detailed, e.g., in Digimarc's patent publications U.S. Pat. Nos. 6,912,295, 6,721,440, 6,614,914, 6,590,996, 6,122,403, and 20100150434, as well as in pending application Ser. No. 13/664,165, filed Oct. 30, 2012, and 61/749,767, filed Jan. 7, 2013.

Laser scanners used in supermarket checkouts are specialized, expensive devices. In contrast, certain embodiments of the present technology use mass-produced, low-cost cameras—of the sort popular in HD video chat applications. (The Logitech HD Webcam C615 captures 1080p video, and retails for less than $100.) Such cameras commonly include sensors that respond down into the infrared spectrum, but such response is typically blocked by IR-reflective films. Such sensors can be used without the IR-blocking film to sense IR as well as visible light. As detailed in various of the cited watermarking patents (e.g., U.S. Pat. Nos. 6,912,295 and 6,721,440), use of IR sensing allows watermark and barcode information to be encoded in regions that—to a human—appear uniformly colored.

Although reference was made to GPUs, this term is meant to include any device that includes plural hardware cores operable simultaneously. Intel, for example, uses the term "Many Integrated Core," or Intel MIC, to indicate such class of device. Most contemporary GPUs have instruction sets that are optimized for graphics processing. The Apple iPhone 4 device uses a PowerVR SGX 535 GPU (included in a system-on-a-chip configuration, with other devices).

While detailed in the context of a supermarket implementation, it will be recognized that the present technologies can be used in other applications, including postal and courier package sorting, manufacturing lines, etc.

In some embodiments, a wireless PDA-like device is used in conjunction with one or more fixed cameras to gather imagery from a checkout station. Typically, the wireless device is operated by a store clerk, but alternatively a smartphone owned and operated by a shopper can be used in this role. Some newer smartphones (e.g., the HTC PD29100) include multiple cameras, which can be used advantageously in the detailed arrangements.

In addition to the cited HTC model, particularly contemplated smartphones include the Apple iPhone 4s, and smartphones following Google's Android specification (e.g., the Verizon Droid Eris phone, manufactured by HTC Corp., and the Motorola Droid 4 phone).

(Details of the iPhone, including its touch interface, are provided in Apple's published patent application 20080174570.)

The design of computer systems used in implementing the present technology is familiar to the artisan. In general terms, each includes one or more processors, one or more memories (e.g. RAM), storage (e.g., a disk or flash memory), a user interface (which may include, e.g., a keypad or keyboard, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and one or more interfaces for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc.).

The processes and system components detailed in this specification may be implemented as instructions for computing devices, including general purpose processor instructions for a variety of programmable processors, including microprocessors (e.g., the Atom and A4), graphics processing units (GPUs, such as the nVidia Tegra APX 2600), and digital signal processors (e.g., the Texas Instruments TMS320 series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. As noted, "cloud" computing resources can be used as well. References to "processors," "modules" or "components" should be understood to refer to functionality, rather than requiring a particular form of software and/or hardware implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Certain implementations of the present technology can use different software modules for performing the different functions and acts.

Software and hardware configuration data/instructions are commonly stored as instructions in one or more data structures conveyed by tangible media, such as magnetic or optical discs, memory cards, ROM, etc., which may be accessed across a network. Some aspects of the technology may be implemented as embedded systems—a type of special purpose computer system in which the operating system software and the application software is indistinguishable to the user (e.g., as is commonly the case in basic cell phones). The functionality detailed in this specification can be implemented in operating system software, application software and/or as embedded system software, etc.

As indicated, different of the functionality can be implemented on different devices. For example, certain of the image processing operations can be performed by a computer system at a checkout counter, and other of the image processing operations can be performed by computers in "the cloud."

(In like fashion, data can be stored anywhere: in a local device, in a networked, remote device, in the cloud, distributed between such devices, etc.)

From the present disclosure—including the noted sources, an artisan can implement embodiments of the present technology without undue experimentation.

While certain aspects of the technology have been described by reference to illustrative methods, it will be recognized that apparatus configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

Plenoptic cameras are available, e.g., from Lytro, Inc., Pelican Imaging Corp., and Raytrix, GmbH. Some of their work is detailed in patent publications 20110122308, 20110080487, 20110069189, 20070252074, 20080266655, 20100026852, 20100265385, 20080131019 and WO/2010/121637. The major consumer camera manufacturers are also understood to have prototyped such products, as has Adobe Systems, Inc. Some of Adobe's work in this field is detailed in U.S. Pat. Nos. 7,620,309, 7,949,252, 7,962,033.

Artisans sometimes draw certain distinctions between plenoptic sensors, light field sensors, radiance cameras, and multi-aperture sensors. The present specification uses these terms interchangeably; each should be construed so as to encompass the others.

Technology for supermarket checkout stations, incorporating imagers, is shown in U.S. patent documents 20040199427, 20040223663, 20090206161, 20090090583, 20100001075, U.S. Pat. Nos. 4,654,872, 7,398,927 and 7,954,719. Additional technologies for supermarket checkout, and object identification, are detailed in the following patent publications owned by Datalogic, a leader in the field: 20070084918, 20060147087, 20060249581, 20070267584, 20070284447, 20090152348, 20100059589, 20100213259, 20100217678, 20100158310, 20100123005, 20100163628, and 20100013934.

A survey of semiconductor chemical sensors is provided in Chang, et al, Electronic Noses Sniff Success, IEEE Spectrum, Vol. 45, No. 3, 2008, pp. 50-56. Illustrative implementations are detailed in Chang et al, Printable Polythiophene Gas Sensor Array for Low-cost Electronic Noses, Journal of Applied Physics 100, 014506 (2006) and in U.S. Pat. Nos. 5,140,393, 7,550,310, and 8,030,100. Semiconductor chemical sensors are available from a variety of vendors, including Owlstone Nanotech, Inc.

Head-mounted display systems, and related technology, are detailed, e.g., in published patent documents U.S. Pat.

Nos. 8,235,529, 8,223,088, 8,203,605, 8,183,997, 8,217,856, 8,190,749 and 8,184,070 (Google); 20080088936, 20080088529, 20080088937 and 20100079356 (Apple); and 20120229909, 20120113092, 20050027515 and 20120068913 (Microsoft).

Electronic displays in which optical detectors see-through the display panel to sense optical data are known, e.g., from patent publication 20120169669, and from Hirsch, et al, BiDi Screen: A Thin, Depth-Sensing LCD for 3D Interaction using Light Fields, ACM Transactions on Graphics, Vol. 28, No. 5, December 2009, and from Izadi et al, ThinSight: Integrated Optical Multi-touch Sensing through Thin Form-factor Displays, Proc. of the 2007 ACM Workshop on Emerging Displays Technologies, Paper No. 6.

The present disclosure details a variety of technologies. For purposes of clarity, they are often described separately. However, it will be recognized that they can be used together. While each such combination is not literally detailed, it is applicant's intent that they be so-combined.

Similarly, while this disclosure has detailed particular ordering of acts and particular combinations of elements, it will be recognized that other contemplated methods may re-order acts (possibly omitting some and adding others).

Although disclosed as complete systems, sub-combinations of the detailed arrangements are also separately contemplated.

The artisan will be familiar with other writings useful in various implementations of the present technology, e.g., concerning construction of 3D models using imagery captured from different viewpoints. Examples include the PhD thesis of Snavely, "Scene Reconstruction and Visualization from Internet Photo Collections," University of Washington, 2008, and his published patent application 20070110338. These writings teach, e.g., "structure through motion" methods, and how corresponding image features in different images can be identified and how the geometries of the two images can thereby be spatially related.

The Wikipedia article "Structure from Motion" provides additional information on such technology, and includes links to several such software packages. These include the Structure from Motion toolbox by Vincent Rabaud, Matlab Functions for Multiple View Geometry by Andrew Zissermann, the Structure and Motion Toolkit by Phil Torr, and the Voodoo Camera Tracker (a tool for integrating real and virtual scenes, developed at the University of Hannover).

Such methods are also known from work in simultaneous location and mapping, or SLAM. A treatise on SLAM is provided in Durrant-Whyte, et al, Simultaneous Localisation and Mapping (SLAM): Part I The Essential Algorithms, and Part II State of the Art, IEEE Robotics and Automation, Vol. 13, No. 2 (pp. 99-110) and No. 3 (pp. 108-117), 2006. One implementation of SLAM adapted to operate even on mobile device CPUs/GPSs is available from 13$^{th}$ Lab, AB.

OpenSource implementations of SLAM are widely available; many are collected at OpenSLAM<dot>org. Others include the CAS Robot Navigation Toolbox (at www<dot>cas<dot>kth<dot>se/toolbox/index<dot>html), Matlab simulators for EKF-SLAM, UKF-SLAM, and Fast-SLAM 1.0 and 2.0 at www<dot>acfr<dot>usyd<dot>edu<dot>au/homepages/academic/tbailey/software/index<dot>html; Scene, at www<dot>doc<dot>ic <dot>ac<dot>uk/~ajd/Scene/index<dot>html; and a C language grid-based version of FastSLAM at www<dot>informatik<dot>uni-freiburg<dot>de/~haehnel/old/download<dot>html.

SLAM is well suited for use with uncalibrated environments, as it defines its own frame of reference. Embodiments of the technology that employ handheld scanning devices (e.g., tethered hand-scanners, or wireless smartphones) are thus particularly suited for use with SLAM methods.

Other arrangements for generating 3D information from plural images are detailed in patent publications 20040258309, 20050238200, 20100182406, 20100319100, U.S. Pat. Nos. 6,137,491, 6,278,460, 6,760,488 and 7,352,386. Related information is detailed in applicant's pending application Ser. No. 13/088,259, filed Apr. 15, 2011 (now published as 20120218444).

For a review of perspective, the reader is referred to the Wikipedia article "3D Projection." Wikipedia articles concerning "Plenoptic Cameras" and Light Field" provide additional information on those technologies.

(Copies of many of the above-cited non-patent publications are attached as appendices to application Ser. No. 13/231,893, published as 20130048722.)

CONCLUDING REMARKS

This specification details a variety of embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. However, implementation of all such combinations is straightforward to the artisan from the provided teachings.

Although features and arrangements are described, in some cases, individually, the inventors intend that they will also be used together. Conversely, while certain methods and systems are detailed as including multiple features, the inventors conceive that—in other embodiments—the individual features thereof are usable independently.

The present specification should be read in the context of the cited references (with which the reader is presumed to be familiar) Those references disclose technologies and teachings that applicant intends be incorporated into the certain embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.)

In view of the wide variety of embodiments to which the principles and features discussed above can be applied, it should be apparent that the detailed embodiments are illustrative only, and should not be taken as limiting the scope of the invention. Rather, we claim as our invention all such modifications as may come within the scope and spirit of the following claims and equivalents thereof.

We claim:

1. An image processing method to identify a canned, barcoded item selected for purchase by a first shopper at a retail store, the store having a shopping portion where items are stocked for sale, and a checkout portion, the method including using information from a first sensor, and then using information from second sensor different than the first sensor, in a data fusion manner to narrow a universe of possible item identifications, the method more particularly comprising the acts:

based on information from the first sensor, developing a set of plural item identification hypotheses about the canned barcoded item selected by the shopper for purchase, each of said item identification hypotheses having an associated confidence score that respectively indicates certainty about said hypothesis;

refining the set of plural identification hypotheses about the selected barcoded item, by applying data fusion based on other information, the other information including information from the second sensor, said refining including revising at least certain of said associated confidence scores;

if need be, successively repeating said refining act, until one of said revised confidence scores has a value exceeding a particular, predetermined threshold value, said threshold value having been established prior to said refining act, and serving as a basis for comparison in judging the revised confidence scores; and adding, to a purchase tally for said shopper, an item associated with said one revised confidence score that has a value exceeding the threshold value, said item being the canned barcoded item selected for purchase by the shopper;

wherein one of said sensors is a fixed sensor in an aisle of the shopping portion of the store, the information from said fixed sensor that is used in said data fusion manner more particularly comprising (a) information indicating locations visited by the shopper during a track of the shopper through the store, or (b) information indicating both removal of an object from a store shelf location and a time of such removal; and the other of said sensors is a camera at the checkout portion of the retail store, the information from said camera that is used in said data fusion manner more particularly-comprising imagery depicting the canned, barcoded item, or a person's interaction with said item.

2. The method of claim 1 in which the information from the fixed sensor comprises information indicating locations visited by the shopper during a track of the shopper through the store.

3. The method of claim 2 in which the data fusion includes revising at least certain of said confidence scores based on information about a layout of the store, indicating locations of different items in the store.

4. The method of claim 1 in which the information from the fixed sensor comprises information from a ceiling-, floor- or shelf-mounted camera.

5. The method of claim 1 in which the data fusion includes revising at least certain of said confidence scores based on information identifying a store aisle through which the shopper did not pass.

6. The method of claim 1 in which the data fusion includes revising at least certain of said confidence scores based on information about store locations at which the shopper, or the shopper's cart, paused during the shopper's track through the store.

7. The method of claim 1 in which the data fusion includes revising at least certain of said confidence scores based on information about a store location at which an item was placed into the shopper's cart.

8. The method of claim 1 in which the information from the camera at the checkout portion of the store comprises information from a camera at an item bagging area of the store.

9. The method of claim 1 in which the information from the fixed sensor comprises information indicating both removal of an object from the store shelf location, and a time of such removal.

10. The method of claim 9 that includes sensing removal of stock from the store shelf location with a weight transducer or a camera.

11. The method of claim 10 that includes sensing removal of stock from the store shelf location with a camera, and sensing information about locations visited by the shopper with a camera.

12. The method of claim 9 wherein a weight given to the information from the fixed sensor in determining a confidence score depends, at least in part, on the time data.

13. The method of claim 1 in which the data fusion includes revising at least certain of said confidence scores based on information derived from one of the following: sensing disruption of air blown through a pile of items, sensing temperature, sensing vibration, sensing sound, ultrasonic or millimeter wave scanning, sensing ultraviolet or infrared radiation, weight sensing, haptic sensing, 3D shape sensing, chemical or olfactory sensing, inertial modeling, statistical item correlations, or crowdsourced human assessment of item imagery.

14. The method of claim 1 that further includes:
determining an item of information relating to the shopper from the list consisting of: sensed shopper demographic, sensed shopper gaze, sensed pose of a shopper hand grasping an item, shopper purchasing history, and shopper shopping list; and
revising at least one of said confidence scores based on said determined item of information.

15. The method of claim 1 that further includes:
determining one of the following types of information: volumetric product shape information, color histogram data, incomplete or ambiguous barcode data, digital watermark data, NFC/RFID information, image fingerprint data, recognized text data, weight information, temperature information, and information about relative placement of different items in a bag; and
revising at least one of said confidence scores based on said determined item of information.

16. The method of claim 1 wherein both said first shopper and a further shopper both select a second item for purchase, the method including:
attempting to identify the second item selected for purchase by the first shopper, but failing to do so because the continued refinement of the set of plural identification hypotheses does not yield any revised confidence score having a value exceeding the threshold value;
flagging the second item, selected for purchase by the first shopper, to a human operator for follow-up;
attempting to identify the second item selected for purchase by the second shopper, but failing to do so because the continued refinement of the set of plural identification hypotheses does not yield any revised confidence score having a value exceeding the threshold value; and
enabling the second shopper to self-identify the second item;
wherein the second shopper, but not the first shopper, is permitted to self-identify the second item, because the second shopper is determined to have a heightened level of trust with the store.

17. The method of claim 1 that includes sensing, from imagery captured by the camera at the checkout portion of the retail store: image fingerprint data for the item, color histogram data for the item, optical character recognition data for the item, volumetric product configuration data for the item, incomplete or ambiguous barcode or watermark data for the item, barcode position information for the item, barcode aspect ratio for the item, information indicating an order in which items are placed into a bag, information indicating a person's hand pose as the item is grasped, or information indicating a person's gaze towards the item; and
employing said sensed information in determining at least one of said confidence scores.

18. The method of claim 1 that further includes identifying the shopper by a smartphone app that exchanges data with a store computer, and using shopper identification information produced thereby in determining at least one of said confidence scores.

19. A system, configured to identify a packaged, barcoded item selected for purchase by a shopper in a retail store, the store having a shopping portion where items are stocked for sale, and a checkout portion, the system employing information from a first sensor, and then information from second sensor different than the first sensor, in a data fusion manner to narrow a universe of possible item identifications, the system including:
- a first, fixed, sensor in an aisle of the shopping portion of the store, the first sensor being adapted to produce (a) information indicating locations visited by the shopper during a track of the shopper through the store, or (b) information indicating both removal of an object from a store shelf location and a time of such removal;
- a second, camera, sensor, at the checkout portion of the retail store, the second sensor being adapted to produce imagery depicting the packaged, barcoded item, or a person's interaction with said item;
- a memory; and
- one or more processors operating in accordance with instructions stored in the memory;
- wherein said instructions stored in the memory configure the system to perform acts including:
  - based on information from one of said sensors, developing a set of plural item identification hypotheses about the packaged barcoded item selected by the shopper for purchase, each of said item identification hypotheses having an-associated confidence score that respectively indicates certainty about said hypothesis;
  - refining the set of plural identification hypotheses about the selected barcoded item, by applying data fusion based on other information, the other information including information from the other of said sensors, said refining including revising at least certain of said associated confidence scores;
  - if need be, successively repeating said refining act until one of said revised confidence scores has a value exceeding a particular, predetermined threshold value, said threshold value having been established prior to said refining act, and serving as a basis for comparison in judging the revised confidence scores; and
  - adding, to a purchase tally for said shopper, an item associated with said one revised confidence score that has a value exceeding the threshold value, said item being the packaged barcoded item selected for purchase by the shopper.

20. A tangible, non-transitory computer readable medium containing instructions for configuring a system, including one or more processors, to identify a packaged, barcoded item selected for purchase by a shopper in a retail store, the store having a shopping portion where items are stocked for sale, and a checkout portion, the system including first and second sensors, one of said sensors comprising a fixed sensor in an aisle of the shopping portion of the store that is adapted to produce (a) information indicating locations visited by the shopper during a track of the shopper through the store, or (b) information indicating both removal of an object from a store shelf location and a time of such removal, the other of said sensors comprising a camera at the checkout portion of the retail store that is adapted to produce imagery depicting the packaged, barcoded item, or a person's interaction with said item, said instructions configuring the system to perform acts including:
- based on information from one of said sensors, developing a set of plural item identification hypotheses about the packaged barcoded item selected by the shopper for purchase, each of said item identification hypotheses having an associated confidence score that respectively indicates certainty about said hypothesis;
- refining the set of plural identification hypotheses about the selected barcoded item, by applying data fusion based on other information, the other information-including information from the other of said sensors, said refining including revising at least certain of said associated confidence scores;
- if need be, successively repeating said refining act, until one of said revised confidence scores has a value exceeding a particular, predetermined threshold value, said threshold value having been established prior to said refining act, and serving as a basis for comparison in judging the revised confidence scores; and
- adding, to a purchase tally for said shopper, an item associated with said one revised confidence score that has a value exceeding the threshold value, said item being the packaged, barcoded item selected for purchase by the shopper.

* * * * *